United States Patent
Miyake et al.

(10) Patent No.: US 9,055,158 B2
(45) Date of Patent: Jun. 9, 2015

(54) VEHICULAR APPARATUS, MOBILE PHONE, AND INSTRUMENT COORDINATION SYSTEM

(75) Inventors: Kenji Miyake, Anjo (JP); Koichi Masuda, Obu (JP)

(73) Assignee: DENSO CORPORATION, Kariya (JP)

( * ) Notice: Subject to any disclaimer, the term of this patent is extended or adjusted under 35 U.S.C. 154(b) by 25 days.

(21) Appl. No.: 14/004,484

(22) PCT Filed: Mar. 1, 2012

(86) PCT No.: PCT/JP2012/001394
§ 371 (c)(1),
(2), (4) Date: Sep. 11, 2013

(87) PCT Pub. No.: WO2012/127791
PCT Pub. Date: Sep. 27, 2012

(65) Prior Publication Data
US 2014/0018056 A1 Jan. 16, 2014

(30) Foreign Application Priority Data

Mar. 23, 2011 (JP) ................................. 2011-064733
Feb. 6, 2012 (JP) ................................. 2012-023313

(51) Int. Cl.
*H04M 3/00* (2006.01)
*H04M 1/60* (2006.01)
*H04M 1/725* (2006.01)

(52) U.S. Cl.
CPC .......... *H04M 1/6075* (2013.01); *H04M 1/6091* (2013.01); *H04M 2250/22* (2013.01); *H04M 1/7253* (2013.01); *H04M 2250/02* (2013.01)

(58) Field of Classification Search
CPC .......... H04M 1/6075; H04M 2250/22; H04M 1/6091; H04M 2250/02; H04M 1/7253

USPC .................................................. 455/418, 419
See application file for complete search history.

(56) References Cited

U.S. PATENT DOCUMENTS

| 2003/0156097 A1 | 8/2003 | Kakihara et al. |
| 2004/0151285 A1* | 8/2004 | Sychta ........................ 379/88.16 |

(Continued)

FOREIGN PATENT DOCUMENTS

| JP | 2001-339504 A | 12/2001 |
| JP | 2002-247183 A | 8/2002 |

(Continued)

OTHER PUBLICATIONS

Office Action dated Jul. 28, 2014 in the corresponding EP Application No. 12760346.2.

(Continued)

*Primary Examiner* — Vladimir Magloire
*Assistant Examiner* — Sayed T Zewari
(74) *Attorney, Agent, or Firm* — Harness, Dickey & Pierce, PLC

(57) ABSTRACT

A vehicular apparatus includes a communication portion and a vehicular display portion to communicate with a mobile phone having a touch panel. The vehicular apparatus acquires pixel information about a screen of the touch panel and displays the pixel information on the vehicular display portion. When a user performs a press manipulation onto the vehicular display portion, the vehicular apparatus transmits a signal indicating a manipulation target area to the mobile phone via the communication portion. The vehicular apparatus performs changeover to handsfree phone call when detecting that the mobile phone enters a phone call state within a specified time since detection of the press manipulation onto the vehicular display portion.

76 Claims, 18 Drawing Sheets

(56) References Cited

U.S. PATENT DOCUMENTS

| | | |
|---|---|---|
| 2005/0180556 A1 | 8/2005 | Satoh |
| 2007/0026904 A1 | 2/2007 | Matsuda |
| 2007/0099674 A1 | 5/2007 | Saito |
| 2008/0125186 A1* | 5/2008 | Chen et al. .................. 455/569.1 |
| 2009/0209298 A1 | 8/2009 | Abeta et al. |
| 2010/0102941 A1 | 4/2010 | Richter et al. |
| 2010/0117810 A1 | 5/2010 | Hagiwara et al. |
| 2010/0144400 A1 | 6/2010 | Azuma |
| 2010/0151833 A1 | 6/2010 | Azuma et al. |
| 2010/0261506 A1 | 10/2010 | Rajamani et al. |

FOREIGN PATENT DOCUMENTS

| | | |
|---|---|---|
| JP | 2004-134977 A | 4/2004 |
| JP | 2004-140666 A | 5/2004 |
| JP | 2004-282380 A | 10/2004 |
| JP | 2005-203930 | 7/2005 |
| JP | 2006-303585 A | 11/2006 |
| JP | 2007-036678 | 2/2007 |
| JP | 2007-096572 A | 4/2007 |
| JP | 2009-017331 A | 1/2009 |
| JP | 2009-224984 A | 10/2009 |
| JP | 2010-127781 A | 6/2010 |
| JP | 2010-130553 A | 6/2010 |
| JP | 2010-136075 | 6/2010 |
| JP | 2010-250376 A | 11/2010 |
| JP | 2011-254299 | 12/2011 |

OTHER PUBLICATIONS

Office Action dated May 27, 2014 in the corresponding JP application No. 2013-219500, which is the divisional application of JP No. 2012-23313.

International Search Report and Written Opinion of the ISA for PCT/JP2012/001394, ISA/JP, mailed Jun. 19, 2012.

Office Action mailed Mar. 19, 2013 in a corresponding JP application No. 2012-23313.

Office Action mailed Jul. 23, 2013 in a corresponding JP application No. 2012-23313.

* cited by examiner (a)

(b)

(c)

(a)

(b)

(a)

(b)

VEHICULAR APPARATUS, MOBILE PHONE, AND INSTRUMENT COORDINATION SYSTEM

CROSS REFERENCE TO RELATED APPLICATIONS

This application is a 371 U.S. National Stage of International Application No. PCT/JP2012/001394, filed Mar. 1, 2012, which claims priority from Japanese patent application No. 2011-64733 filed on Mar. 23, 2011, and Japanese Patent Application No. 2011-23313 filed on Feb. 6, 2012, the content of which is hereby incorporated by reference into this disclosure.

TECHNICAL FIELD

The present disclosure relates to a vehicular apparatus to display information displayed on a screen of a mobile phone, the mobile phone, and an instrument coordination system including the mobile phone and the vehicular apparatus.

BACKGROUND ART

Conventionally, a known technology connects a mobile phone (hereinafter referred to as a touch-panel mobile phone) using a touch panel for manipulatory input with a vehicular apparatus having a touch panel and displays a screen image of the touch-panel mobile phone on a touch panel (hereinafter referred to as a vehicular touch panel) of the vehicular apparatus. As disclosed in Patent Literature 1, for example, a vehicular apparatus receives image data displayed on the screen of the touch-panel mobile phone. Based on the received image data, the screen of the vehicular touch panel displays an image similar to that displayed on the touch-panel mobile phone. Furthermore, as disclosed in Patent Literature 1, a user may manipulate information displayed on the vehicular touch panel. In such a case, coordinates corresponding to the manipulated position on the vehicular touch panel are converted into coordinates on the touch panel of the touch-panel mobile phone. The converted coordinates are transmitted to the touch-panel mobile phone.

As another example, the terminal mode standard, later renamed as MirrorLink (registered trademark), is known as a technology that allows the screen image of the touch-panel mobile phone to be displayed on the vehicular touch panel without installing an application program (hereinafter referred to as an application) for the touch-panel mobile phone and enables manipulation onto the vehicular touch panel to control manipulation onto the touch-panel mobile phone. The terminal mode is an example of the technology concerned and is used as a generic name of the technology in this specification.

The terminal mode allows the vehicular apparatus to be used only as a screen display portion and a manipulation portion for the touch-panel mobile phone. Therefore, an application for the touch-panel mobile phone need not be installed on the vehicular apparatus. Basically, the touch-panel mobile phone transmits only pixel-based color information (hereinafter referred to as pixel information) to the vehicular apparatus. The terminal mode enables the vehicular apparatus to use touch-panel mobile phone functions without installing touch-panel mobile phone applications on the vehicular apparatus. This can reduce processing loads on the vehicular apparatus.

A conventionally known onboard handsfree system connects a mobile phone with a vehicular apparatus such as an onboard navigation system having a handsfree function and enables mobile phone call using a speaker and a microphone of the vehicular apparatus. If a phone call start button is manipulated on the mobile phone, the onboard handsfree system starts the phone call using a speaker and a microphone of the mobile phone. For example, the vehicular touch panel may be manipulated to manipulate the phone call start button on the vehicular apparatus. In such a case, the speaker and the microphone of the vehicular apparatus are generally used to start a handsfree phone call.

However, conventional technologies make it difficult to provide an onboard handsfree system of the related art while using the terminal mode. The reason is described in detail below. Suppose that the terminal mode is used to display a screen image of the touch-panel mobile phone on a screen of the vehicular touch panel. In such a case, the screen of the vehicular touch panel just displays a phone call start button simulating a phone call start button on the screen of the touch-panel mobile phone. Manipulating the phone call start button displayed on the screen of the vehicular touch panel performs a process to start a mobile phone call on the assumption that the phone call start button is manipulated on the touch-panel mobile phone. The handsfree phone call cannot start.

It is also difficult to start a handsfree phone call according as the vehicular apparatus detects manipulation of the phone call start button displayed on the screen of the vehicular touch panel. More specifically, the terminal mode basically allows the touch-panel mobile phone to transmit only pixel information to the vehicular apparatus. It is difficult for the vehicular apparatus to determine whether the phone call start button is displayed on the screen. This makes it difficult to detect manipulation of the phone call start button.

PRIOR ART LITERATURES

Patent Literature

Patent Literature 1: JP 2010-130553 A

SUMMARY OF INVENTION

This disclosure aims at providing a vehicular apparatus, a mobile phone, and an instrument coordination system capable of determining availability of a handsfree phone call and enabling the handsfree phone call while a vehicular apparatus having a vehicular touch panel connects with a touch-panel mobile phone and the vehicular touch panel displays a screen image of the touch-panel mobile phone.

A vehicular apparatus according to a first aspect of the disclosure is provided to include: a communication portion to communicate with a mobile phone having a touch panel; a vehicular display portion used in a vehicle; a control circuit; a phone call state detection section; and a vehicular phone call changeover section. The control circuit performs a process which acquires pixel information about a screen of the touch panel of the mobile phone via the communication portion to thereby permit the vehicular display portion to display a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel on the screen of the touch panel of the mobile phone corresponding to the pixel area on the screen of the vehicular display portion receiving the press manipulation, and transmits a signal indicating the manipulation target area to the mobile phone via the communication portion. The phone call state detection section detects that the mobile phone enters a phone call state. The vehicular phone call changeover section performs changeover to a handsfree phone call that performs a phone call using a speaker and a microphone provided for the vehicular apparatus itself in cases that the phone call state detection section detects a phone call state of the mobile phone within a specified time after (since when) the press manipulation onto the screen of the vehicular display portion is detected.

A mobile phone may enter a phone call state in a short period of time after detection of press manipulation onto the vehicular display portion. In such a case, a user is highly likely to have manipulated a phone call start display area on the screen of the vehicular touch panel in order to start the phone call on the mobile phone, regardless of whether an incoming call or an outgoing call on the mobile phone started the phone call. The user is highly likely to require handsfree phone call because the vehicular touch panel is pressed. Consequently, the above-mentioned configuration enables handsfree phone call based on a fact that the mobile phone entered a phone call state within a specified time after detection of the press manipulation onto the vehicular touch panel. Therefore, the vehicular apparatus can determine the need for changeover to handsfree phone call and enables (performs changeover to) the handsfree phone call.

As a result, the vehicular apparatus can more highly precisely determine the need for changeover to handsfree phone call and enable handsfree phone call if the vehicular apparatus having the vehicular touch panel connects with a touch-panel mobile phone and the vehicular touch panel displays a screen image of the touch-panel mobile phone.

The handsfree phone call signifies a phone call using a speaker or a microphone of the vehicular apparatus. Changeover to the handsfree phone call is done by: (A) outputting the sound supplied from the mobile phone to the speaker of the vehicular apparatus and changing an input/output path for the speaker or the microphone of the vehicular apparatus to output the sound supplied from the microphone of the vehicular apparatus to the mobile phone (e.g., changing the use of the speaker or the microphone of the vehicular apparatus to the use for the handsfree phone call from the use not for the handsfree phone call such as navigation, audio, or voice recognition); and (B) requesting of the mobile phone to start the handsfree phone call.

A vehicular apparatus according to a second aspect of the disclosure is provided to include: a communication portion to communicate with a mobile phone having a touch panel; a vehicular display portion used in a vehicle; a control circuit; a touch manipulation detection section; a phone call area image feature storage portion; a phone call manipulation determination section; and a vehicular phone call changeover section. The control circuit performs a process which acquires pixel information about a screen of the touch panel of the mobile phone via the communication portion to thereby permit the vehicular display portion to display a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The touch manipulation detection section detects a press manipulation onto the screen of the vehicular display portion and specifies a pixel area on the screen of the vehicular display portion receiving the press manipulation. The phone call area image feature storage portion stores an image feature about a phone call start display area on the screen of the touch panel to start a phone call on the mobile phone. The phone call manipulation determination section determines whether a press manipulation is performed onto a pixel area displaying an image of the phone call start display area on the screen of the vehicular display portion, based on (i) the pixel information acquired from the mobile phone, (ii) the image feature stored in the phone call area image feature storage portion, and (iii) the pixel area specified by the touch manipulation detection section. The vehicular phone call changeover section performs changeover to a handsfree phone call that performs a phone call using a speaker and a microphone provided for the vehicular apparatus itself when the phone call manipulation determination section determines that the press manipulation is performed onto the pixel area displaying the image of the phone call start display area.

The above-mentioned vehicular apparatus determines an occurrence of press manipulation at a pixel area on a screen of the vehicular touch panel displaying an image of the phone call start display area, based on (i) the pixel information acquired from the mobile phone, (ii) the image feature about the phone call start display area on a touch panel screen of the mobile phone to start phone call on the mobile phone, and (iii) the pixel area specified by the touch manipulation detection section. If the determination result is affirmative, the vehicular apparatus enables handsfree phone call. Therefore, the above-mentioned configuration can also allow the vehicular apparatus to determine the need for changeover to handsfree phone call and enable handsfree phone call.

As a result, the above-mentioned configuration can also allow the vehicular apparatus to determine the need for changeover to handsfree phone call and enable handsfree phone call if the vehicular apparatus having the vehicular touch panel connects with a touch-panel mobile phone and the vehicular touch panel displays a screen image of the touch-panel mobile phone.

A vehicular apparatus according to a third aspect of the disclosure is provided to include: a communication portion to communicate with a mobile phone having a touch panel; a vehicular display portion used in a vehicle; a control circuit; a changeover instruction acceptance portion; and a vehicular phone call changeover section. The control circuit performs a process which acquires pixel information about a screen of the touch panel of the mobile phone via the communication portion to thereby permit the vehicular display portion to display, as a mobile screen image, a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The changeover instruction acceptance portion accepts an input manipulation by a user to instruct either changing to a handsfree phone call or starting a phone call. The vehicular phone call changeover section performs changeover to a handsfree phone call that performs a phone call using a speaker and a microphone provided for the vehicular apparatus itself when the changeover instruction acceptance portion accepts the input manipulation. Herein, the changeover instruction acceptance portion includes either a touch switch or a manipulation input apparatus that is different from the touch switch, the touch switch being generated from an image on a unique screen image area that is included in a display area of the vehicular display portion, the unique screen image area being different from a mobile screen image area displaying the mobile screen image, the unique screen image area displaying an image uniquely generated in the vehicular apparatus itself.

The above-mentioned vehicular apparatus enables handsfree phone call (i) when a user enables handsfree phone call using a procedure other than press manipulation onto the touch panel of the mobile phone or onto the mobile screen image of the vehicular display portion or (ii) when the changeover instruction acceptance portion accepts user's input manipulation to instruct the start of phone call. Therefore, the vehicular apparatus determines whether the changeover instruction acceptance portion accepts the input manipulation. Based on the determination result, the vehicular apparatus can determine the need for changeover to the handsfree phone call and enable the handsfree phone call.

As a result, the above-mentioned configuration can also allow the vehicular apparatus to determine the need for changeover to handsfree phone call and enable handsfree phone call if the vehicular apparatus having the vehicular touch panel connects with a touch-panel mobile phone and the vehicular touch panel displays a screen image of the touch-panel mobile phone.

A vehicular apparatus according to a fourth aspect of the disclosure is provided to include: a communication portion to communicate with a mobile phone having a touch panel; a vehicular display portion used in a vehicle; a control circuit; an incoming call state detection section; a vehicle-generated screen display section; a handsfree changeover manipulation detection section; and a vehicular phone call changeover section. The control circuit a process that acquires pixel information about a screen of the touch panel via the communication portion to thereby permit the vehicular display portion to display, as a mobile screen image, a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The incoming call state detection section detects an incoming call state of the mobile phone. The vehicle-generated screen display section uniquely generates and displays a handsfree changeover screen image independently of the mobile screen image so that the handsfree changeover screen image includes a handsfree changeover button image to permit a handsfree phone call using a speaker and a microphone of the vehicular apparatus itself for phone call when the incoming call state detection section detects the incoming call state of the mobile phone. The handsfree changeover manipulation detection section detects an input manipulation by a user onto an area for the handsfree changeover button image in the handsfree changeover screen image. The vehicular phone call changeover section performs changeover to a handsfree phone call when the handsfree changeover manipulation detection section detects the input manipulation.

The above-mentioned vehicular apparatus generates and displays the handsfree changeover screen image including a handsfree changeover button image to enable the handsfree phone call when the incoming call state detection section detects an incoming call state of the mobile phone. The vehicular apparatus enables the handsfree phone call when the handsfree changeover manipulation detection section detects user's input manipulation onto the area of the handsfree changeover button image in the handsfree changeover screen image. The handsfree changeover screen image is generated and displayed independently of the mobile screen image. The vehicular apparatus can determine the need for changeover to handsfree phone call and enable handsfree phone call.

As a result, the above-mentioned configuration can also allow the vehicular apparatus to determine the need for changeover to handsfree phone call and enable handsfree phone call if the vehicular apparatus having the vehicular touch panel connects with a touch-panel mobile phone and the vehicular touch panel displays a screen image of the touch-panel mobile phone.

A vehicular apparatus according to a fifth aspect of the disclosure is provided to include: a communication portion to communicate with a mobile phone having a touch panel; a vehicular display portion used in a vehicle; a control circuit; a phone call state detection section; a vehicle-generated screen display section; a handsfree changeover manipulation detection section; and a vehicular phone call changeover section. The control circuit performs a process that acquires pixel information about a screen of the touch panel via the communication portion and to permit the vehicular display portion to display, as a mobile screen image, a screen image that is displayed on the touch panel of the mobile phone, based on the pixel information. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The phone call state detection section detects that the mobile phone enters a phone call state. The vehicle-generated screen display section uniquely generates and displays a handsfree changeover screen image independently of the mobile screen image so that the handsfree changeover screen image includes a handsfree changeover button image to enable a handsfree phone call using a speaker and a microphone of the vehicular apparatus itself for phone call when the phone call state detection section detects the phone call state of the mobile phone. The handsfree changeover manipulation detection section detects user's input manipulation onto an area for the handsfree changeover button image in the handsfree changeover screen image. The vehicular phone call changeover section performs changeover to a handsfree phone call when the handsfree changeover manipulation detection section detects the input manipulation.

When the phone call state detection section detects that the mobile phone entered a phone call state, the above-mentioned vehicular apparatus generates and displays the handsfree changeover screen image in at least part of the area displaying the mobile screen image on the vehicular display portion. The handsfree changeover screen image includes the handsfree changeover button image to instruct changeover to the handsfree phone call. The vehicular apparatus enables the handsfree phone call when the handsfree changeover manipulation detection section detects user's input manipulation onto the area of the handsfree changeover button image in the handsfree changeover screen image. The handsfree changeover screen image is generated and displayed independently of the mobile screen image. The vehicular apparatus can determine the need for changeover to handsfree phone call and enable handsfree phone call.

A vehicular apparatus according to a sixth aspect of the disclosure is provided to include: a communication portion to communicate with a mobile phone having a touch panel; a vehicular display portion used in a vehicle; a control circuit; a phone call state detection section; and a vehicular phone call changeover section. The control circuit performs a process that acquires pixel information about a screen of the touch panel via the communication portion to thereby permit the vehicular display portion to display a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The phone call state detection section detects that the mobile phone enters a phone call state. The vehicular phone call changeover section performs changeover to a handsfree phone call using a speaker and a microphone of the vehicular apparatus itself for phone call when the phone call state detection section detects a phone call state of the mobile phone.

The above-mentioned vehicular apparatus enables handsfree phone call when the phone call state detection section detects a phone call state of the mobile phone. The mobile phone may connect with the vehicular apparatus having a vehicular touch panel and the vehicular touch panel may display a mobile phone screen image. In such a case, a user is highly unlikely to manipulate or be able to manipulate the mobile phone. As described above, the mobile phone may enter the phone call state while the vehicular touch panel displays the mobile phone screen image. Changeover to handsfree phone call is highly likely needed. Therefore, the vehicular apparatus can determine the need for handsfree phone call and enable the handsfree phone call.

As a result, the above-mentioned configuration can allow the vehicular apparatus to determine whether to perform the handsfree phone call and, when needed, enable the handsfree phone call if the vehicular apparatus having the vehicular touch panel connects with a touch-panel mobile phone and the vehicular touch panel displays a screen image of the touch-panel mobile phone.

A vehicular apparatus according to a seventh aspect of the disclosure is provided to include: a communication portion to communicate with a mobile phone having a touch panel; a vehicular display portion used in a vehicle; a control circuit; and a vehicular phone call changeover section. The control circuit performs a process that acquires pixel information about a screen of the touch panel via the communication portion to thereby permit the vehicular display portion to display a screen image that is displayed on the touch panel. The control circuit performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. When phone call sound data is received from the mobile phone, the vehicular phone call changeover section performs changeover to a handsfree phone call using a speaker and a microphone of the vehicular apparatus itself for phone call. When no phone call sound data is received from the mobile phone, the vehicular phone call changeover section performs changeover to a handsfree phone call when the mobile phone enters a phone call state.

When phone call sound data is received from the mobile phone, the vehicular apparatus may connect with the touch-panel mobile phone and the vehicular touch panel may display the screen image of the touch-panel mobile phone. In such a case, changeover to handsfree phone call is highly likely needed. According to the above-mentioned configuration, the handsfree phone call is enabled if phone call sound data is received from the mobile phone. The vehicular apparatus can determine the need for changeover to handsfree phone call and enable the handsfree phone call. The phone call state can enable the handsfree phone call even if no phone call sound data is received from the mobile phone.

A vehicular apparatus according to an eighth aspect of the disclosure is provided to include: a communication portion to communicate with a mobile phone having a touch panel; a vehicular display portion used in a vehicle; a control circuit; a phone call state detection section; and a vehicular phone call changeover section. The control circuit performs a process that acquires pixel information about a screen of the touch panel via the communication portion to thereby permit the vehicular display portion to display, as a mobile screen image, a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The phone call state detection section detects that the mobile phone enters a phone call state. When phone call sound data is received from the mobile phone, the vehicular phone call changeover section performs changeover to a handsfree phone call using a speaker and a microphone of the vehicular apparatus itself for phone call. When no phone call sound data is received from the mobile phone, the vehicular phone call changeover section performs changeover to the handsfree phone call based on either a first detection or a second detection. The first detection is detection of a press manipulation onto a phone call start display area in the mobile screen image displayed on the vehicular display portion in order to start a phone call on the mobile phone. The second detection is detection of a press manipulation onto a changeover button image area in a unique screen image area in order to instruct changeover to the handsfree phone call or start of phone call, the unique screen image area being provided for a display area of the vehicular display portion to display screen images uniquely generated in the vehicular apparatus itself.

The above-mentioned vehicular apparatus enables the handsfree phone call if phone call sound data is received from the mobile phone. The vehicular apparatus can determine the need for changeover to handsfree phone call and enable the handsfree phone call. The vehicular apparatus can enable the handsfree phone call based on detection of mobile screen image manipulation or unique screen image manipulation even if no phone call sound data is received from the mobile phone.

The mobile screen image manipulation signifies press manipulation onto a pixel area, which is included in the mobile screen image displayed in the vehicular display portion and corresponds to the phone call start display area to start phone call on the mobile phone. The unique screen image manipulation signifies press manipulation onto a changeover button image area, which is included in a unique screen image area and is used to instruct changeover to the handsfree phone call or the start of phone call. The unique screen image area is included in the display area of the vehicular display portion, differs from the mobile screen image area to display the mobile screen image, and displays a screen image uniquely generated in the vehicular apparatus itself.

A vehicular apparatus according to a ninth aspect of the disclosure is provided to include: a communication portion to communicate with a mobile phone having a touch panel; a vehicular display portion used in a vehicle; a control circuit; an active incoming call detection section; a phone call state detection section; and a vehicular phone call changeover section. The control circuit performs a process that acquires pixel information about a screen of the touch panel via the communication portion to thereby permit the vehicular display portion to display a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The active incoming call detection section detects an incoming call state of the mobile phone. The phone call state detection section detects a phone call state of the mobile phone. The vehicular phone call changeover section performs an incoming call process to perform changeover to a handsfree phone call using a speaker and a microphone of the vehicular apparatus itself for phone call when the phone call state detection section detects a phone call state of the mobile phone within a specified time since detection of the press manipulation onto the vehicular display portion while the active incoming call detection section detects an incoming call state of the mobile phone.

While there is an incoming call on the mobile phone (incoming call state), the above-mentioned vehicular apparatus can enable handsfree phone call if the phone call state of the mobile phone is detected within a specified time from detection of the press manipulation onto the vehicular display portion. Therefore, the vehicular apparatus can determine the need for changeover to handsfree phone call and enable the handsfree phone call while there is an incoming call on the mobile phone.

A user may not always be able to start the phone call quickly at the time of receiving an incoming call on the mobile phone. However, the above-mentioned configuration enables the handsfree phone call under the condition that the phone call state takes effect within a specified time after detection of the press manipulation onto the vehicular display portion. Therefore, changeover to the handsfree phone call can be determined according to features at the time of receiving an incoming call.

A vehicular apparatus according to a tenth aspect of the disclosure is provided to include: a communication portion to communicate with a mobile phone having a touch panel; a vehicular display portion used in a vehicle; a control circuit; an outgoing call state detection section; a phone call state detection section; and a vehicular phone call changeover section. The control circuit performs a process that acquires pixel information about a screen of the touch panel via the communication portion to thereby permit the vehicular display portion to display a screen image that is displayed on the touch panel of the mobile phone. The control circuit performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The outgoing call state detection section detects that the mobile phone enters either an outgoing call state or a calling state. The phone call state detection section detects a phone call state of the mobile phone. The vehicular phone call changeover section performs an outgoing call process to perform changeover to a handsfree phone call using a speaker and a microphone of the vehicular apparatus itself for phone call when the phone call state detection section detects a phone call state of the mobile phone after the outgoing call state detection section detects either an outgoing call state or a calling state of the mobile phone within a specified time since detection of the press manipulation onto the vehicular display portion.

The above-mentioned vehicular apparatus can enable handsfree phone call when detecting a phone call state of the mobile phone after detection of one of an outgoing call state and a calling state within a specified time after detection of press manipulation onto the vehicular display portion. Therefore, the vehicular apparatus can determine the need for changeover to handsfree phone call and enable the handsfree phone call while the mobile phone enters an active outgoing call state or an active calling state.

A called party may not promptly answer a call that is based on the outgoing call or calling from the mobile phone. However, the above-mentioned configuration enables handsfree phone call under the condition that the phone call state follows one of the outgoing call state and the calling state. Therefore, changeover to the handsfree phone call can be determined according to features of the outgoing call or calling.

A vehicular apparatus according to an eleventh aspect of the disclosure is provided to include: a communication portion to communicate with a mobile phone having a touch panel; a vehicular display portion used in a vehicle; a control circuit; a call state detection section; a most recent press manipulation recording section; and a vehicular phone call changeover section. The control circuit performs a process that acquires pixel information about a screen of the touch panel via the communication portion to permit the vehicular display portion to display a screen image that is displayed on the touch panel of the mobile phone. The control circuit further performs a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion. The call state detection section detects any of a plurality of predetermined call states indicating states of call control provided by the mobile phone. The most recent press manipulation recording section records time of most recent press manipulation onto the vehicular touch panel. The vehicular phone call changeover section performs changeover to a handsfree phone call using a speaker and a microphone of the vehicular apparatus itself for phone call based on the time of most recent press manipulation recorded by the most recent press manipulation recording section and the mobile phone call state detected by the call state detection section. Herein, the vehicular phone call changeover section performs changeover to a handsfree phone call when a call state of the mobile phone detected by the call state detection section enters a specific call state and a difference between the time of most recent press manipulation recorded by the most recent press manipulation recording section and a current time is within a specified time.

The above-mentioned configuration enables handsfree phone call only in a specific call state and can suppress processing loads compared to an aspect that determines the need for changeover to the handsfree phone call regardless of call states.

A mobile phone according to a twelfth aspect of the disclosure is provided to include: a touch panel; an identification section; and a mobile phone call changeover section. The mobile phone having a touch panel connects with a vehicular apparatus through communication. The vehicular apparatus communicates with the mobile phone to acquire pixel information about a screen of the touch panel and thereby permit a vehicular display portion used in the vehicle to display a screen image, which is displayed on the touch panel. The vehicular apparatus specifies, as a manipulation target area, a pixel area on the screen of the touch panel when a user performs a press manipulation onto a pixel area on a screen of the vehicular display portion, the pixel area on the screen of the touch panel corresponding to the pixel area on the screen of the vehicular display portion receiving the press manipulation, and transmits a signal indicating the manipulation target area to the mobile phone via the communication portion. The identification section identifies whether the mobile phone enters a phone call state due to user's input manipulation onto the mobile phone or due to user's press manipulation onto the vehicular display portion of the vehicular apparatus. The mobile phone call changeover section performs changeover to a handsfree phone call using a speaker and a microphone of the vehicular apparatus for phone call when the identification section identifies that the mobile phone entered a phone call state based on the user's press manipulation onto the vehicular display portion of the vehicular apparatus.

The above-mentioned mobile phone enables handsfree phone call when the identification section identifies the phone call state of the mobile phone itself based on user's press manipulation onto the vehicular display portion of the vehicular apparatus. The identification section is provided for the mobile phone. Therefore, the mobile phone can determine the need for changeover to handsfree phone call and enable the handsfree phone call.

As a result, the mobile phone can determine the need for changeover to handsfree phone call and enable the handsfree phone call if the vehicular apparatus having the vehicular touch panel connects with a touch-panel mobile phone and the vehicular touch panel displays a screen image of the touch-panel mobile phone.

An instrument coordination system according to a thirteenth aspect of the disclosure is provided to include: a mobile phone having a touch panel; and the vehicular apparatus according to any one of the first through eleventh aspects. The vehicular apparatus transmits a request signal requesting changeover to handsfree phone call, if needed, to the mobile phone. When receiving the request signal transmitted from the vehicular apparatus, the mobile phone transmits a sound signal received from a public line to the vehicular apparatus.

The above-mentioned instrument coordination system includes the mobile phone having a touch panel and any one of the above-mentioned vehicular apparatuses. The vehicular apparatus can determine the need for changeover to handsfree phone call and enable handsfree phone call if the vehicular apparatus having the vehicular touch panel connects with a touch-panel mobile phone and the vehicular touch panel displays a screen image of the touch-panel mobile phone. The vehicular apparatus transmits a request signal requesting changeover to the handsfree phone call, if needed, to the mobile phone. The mobile phone may receive a request signal from the vehicular apparatus. In this case, the mobile phone receives a sound signal from the public line and transmits the sound signal to the vehicular apparatus. Therefore, the vehicular apparatus can automatically enable the handsfree phone call on the mobile phone without requiring the user to enable the handsfree phone call on the mobile phone.

An instrument coordination system according to a fourteenth aspect of the disclosure is provided to include: a mobile phone having a touch panel; and the vehicular apparatus according to the first aspect. When receiving a sound signal from the mobile phone, the vehicular apparatus enables handsfree phone call.

The above-mentioned instrument coordination system includes the mobile phone having a touch panel and the vehicular apparatus according to the first aspect. The vehicular apparatus can determine the need for changeover to handsfree phone call and enable handsfree phone call if the vehicular apparatus having the vehicular touch panel connects with a touch-panel mobile phone and the vehicular touch panel displays a screen image of the touch-panel mobile phone. The handsfree phone call is enabled when the vehicular apparatus receives a sound signal from the mobile phone. The handsfree phone call does not start if no sound signal is received from the mobile phone. Therefore, the vehicular apparatus can automatically enable the handsfree phone call without requiring the user to enable the handsfree phone call if the mobile phone is configured to always enable handsfree phone call during communication with the vehicular apparatus and a sound signal is transmitted.

An instrument coordination system according to a fifteenth aspect of the disclosure is provided to include: a mobile phone having a touch panel; and the vehicular apparatus according to any one of the first through eleventh aspects. When receiving a signal indicating the manipulation target area from the vehicular apparatus, the mobile phone is enabled to receive an input similar to an input that is made when an input manipulation is performed onto the manipulation target area on the screen of the touch panel.

The above-mentioned instrument coordination system includes the mobile phone having a touch panel and any one of the above-mentioned vehicular apparatuses. The vehicular apparatus can determine the need for changeover to handsfree phone call and enable handsfree phone call if the vehicular apparatus having the vehicular touch panel connects with a touch-panel mobile phone and the vehicular touch panel displays a screen image of the touch-panel mobile phone.

BRIEF DESCRIPTION OF DRAWINGS

The above and other objects, features, and advantages of the disclosure will be more apparent from the following detailed description with reference to the accompanying drawings in which.

EMBODIMENTS FOR CARRYING OUT INVENTION

Embodiments of the present disclosure will be described with reference to the accompanying drawings.

First Embodiment

Figure 1:
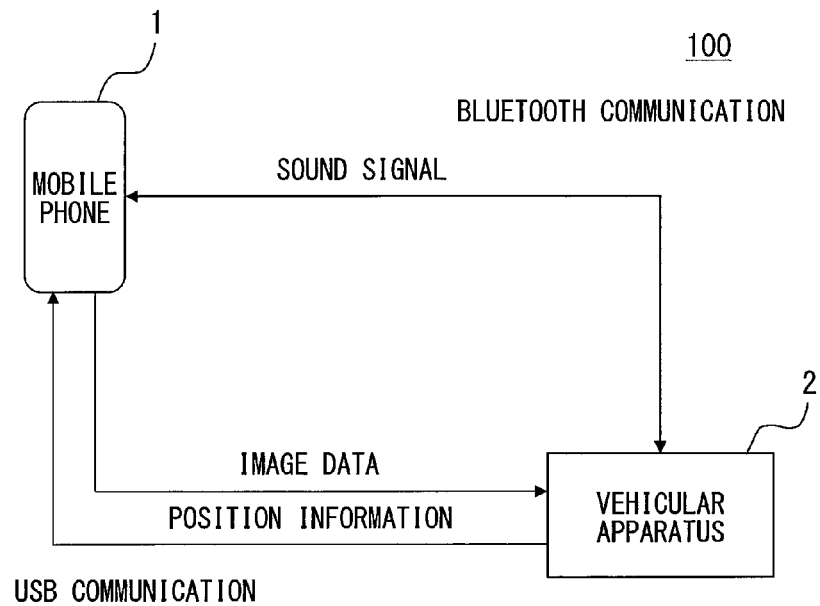
FIG. 1 is a block diagram illustrating a schematic configuration of an instrument coordination system.

FIG. 1 is a block diagram illustrating a schematic configuration of an instrument coordination system 100 according to a first embodiment. As illustrated in FIG. 1, the instrument coordination system 100 includes a mobile phone 1 and a vehicular apparatus 2.

The instrument coordination system 100 may connect the mobile phone 1 with the vehicular apparatus 2 in terminal mode. In this case, the mobile phone 1 may generate image data to be displayed on a screen of the mobile phone 1. The instrument coordination system 100 transmits the generated image data to the vehicular apparatus 2. The vehicular apparatus 2 displays a screen image (window) corresponding to the image data. The instrument coordination system 100 allows a manipulatory input to the vehicular apparatus 2 to manipulate the mobile phone 1.

As described above, the terminal mode allows the screen of the vehicular apparatus 2 to display screen contents (mobile screen image) equivalent to those on the mobile phone 1. Suppose a case that one of procedures is performed onto the displayed screen contents (mobile screen image, mobile window) on the screen of the vehicular apparatus 2 or a press manipulation is performed onto one of buttons of the displayed screen contents (mobile screen image) on the screen of the vehicular apparatus 2. Even in such a case, however, the vehicular apparatus 2 cannot determine which type of procedure is performed on the mobile screen image on the screen of the vehicular apparatus 2 or cannot determine which type of button on the mobile screen image on the screen of the vehicular apparatus 2 receives the press manipulation performed by the user.

The terminal mode only uses the vehicular apparatus 2 as a screen display portion and a manipulation portion of the touch-panel mobile phone. Therefore, a touch-panel mobile phone application need not be installed on the vehicular apparatus 2. Basically, the touch-panel mobile phone transmits only pixel-based color information (hereinafter referred to as pixel information) to the vehicular apparatus 2. The terminal mode enables the vehicular apparatus 2 to use touch-panel mobile phone functions without installing touch-panel mobile phone applications on the vehicular apparatus. This can reduce processing loads on the vehicular apparatus 2.

The vehicular apparatus 2 enlarges an image of the screen of the mobile phone 1 by maintaining or changing the aspect ratio corresponding to the screen of the vehicular apparatus 2. At this time, the vehicular apparatus 2 receives pixel information generated in the mobile phone 1 or screen size information about the mobile phone 1.

On the other hand, the vehicular apparatus 2 does not receive detailed information about the screen image displayed on the mobile phone 1. The detailed information includes the type of application performed on the mobile phone 1, text information in the screen, an attribute of data in the screen, availability, type, or display position of a manipulation button, and the contents of a process performed when the manipulation button is pressed.

Receiving the detailed information other than image data increases data traffic between the vehicular apparatus 2 and the mobile phone 1. The vehicular apparatus 2 requires an application to analyze the detailed information. This hinders decrease in processing loads on the vehicular apparatus 2.

To that end, the vehicular apparatus 2 according to the present disclosure receives pixel information from the mobile phone 1. The disclosure assumes that the vehicular apparatus 2 does not receive detailed information about screen display contents. This does not exclude reception of information other than image data. The vehicular apparatus 2 may receive other information such as an application type according to circumstances.

The mobile phone 1 represents a so-called touch-panel mobile phone using a touch panel for manipulatory input (i.e., a multifunctional mobile phone mounted with a touch panel whose screen contains manipulation portions). Similarly to ordinary touch-panel mobile phones, the mobile phone 1 includes various functions such as the communication function with external instruments, the mail function, the Internet connection function (Web connection function), the music player function, the picture viewer function, the video reproduction function, and the navigation function.

Figure 2:
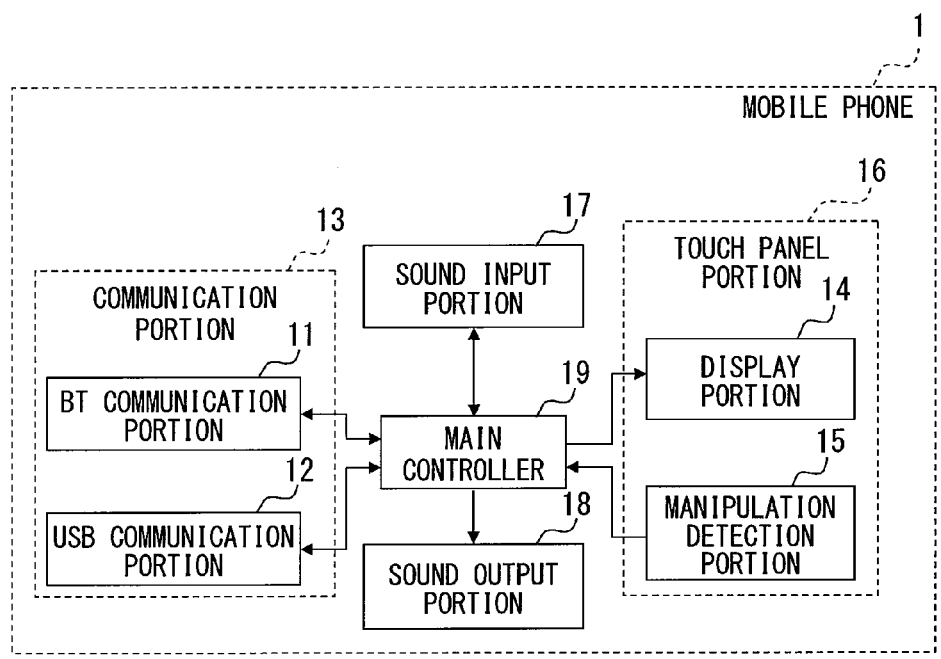
FIG. 2 is a block diagram illustrating a schematic configuration of a mobile phone.

The following describes a schematic configuration of the mobile phone 1 with reference to FIG. 2. For convenience sake, the description is omitted for configurations of the functions that are provided for ordinary touch-panel mobile phones and are unnecessary for description of the disclosure. FIG. 2 is a block diagram illustrating a schematic configuration of the mobile phone 1. As illustrated in FIG. 2, the mobile phone 1 includes a mobile communication portion 13 including a BT communication portion 11 and a USB communication portion 12, a touch panel portion 16 including a mobile display portion 14 and a manipulation detection portion 15, a mobile sound input portion 17, a mobile sound output portion 18, and a main controller 19.

The mobile communication portion 13 communicates with the vehicular apparatus 2. More specifically, the BT communication portion 11 performs communication (hereinafter referred to as BT communication) with the vehicular apparatus 2 according to Bluetooth (registered trademark). The USB communication portion 12 performs wired communication (hereinafter referred to as USB communication) with the vehicular apparatus 2 according to USB connection. According to the embodiment, the BT communication portion 11 is used to transmit and receive information about control on changeover to handsfree phone call (handsfree conversation). The USB communication portion 12 is used to transmit and receive image data and position information during connection in the terminal mode. The image data is available as pixel information (e.g., pixel-based color information) about pixels in the screen of the touch panel portion 16. The position information is available on the screen of the mobile phone 1. The image data contains information about pixel coordinates for pixels needed for drawing.

According to the embodiment, the BT communication and the USB communication are used between the mobile phone 1 and the vehicular apparatus 2. However, the configuration is not limited thereto. The configuration may use wireless communication according to the short-range wireless communication standard such as ZigBee (registered trademark) or the wireless LAN standard such as IEEE802.11. The configuration may use wired communication other than the USB communication.

According to the embodiment, two types of communications (BT communication and USB communication) are used for transmitting and receiving information about control on the changeover to handsfree phone call and transmitting and receiving image data and position information during connection in the terminal mode. However, the configuration is not limited thereto. For example, the configuration may use one type of communication for transmitting and receiving information about control on the changeover to handsfree phone call and transmitting and receiving image data and position information during connection in the terminal mode.

The mobile display portion 14 displays screen images corresponding to various application programs (hereinafter referred to as applications) for the mobile phone 1. For example, the mobile display portion 14 is capable of full-color display and may use a liquid crystal display, an organic EL display, or a plasma display.

The manipulation detection portion 15 uses a touch switch integrated with the mobile display portion 14. The manipulation detection portion 15 detects manipulation of a switch corresponding to the touched position and inputs the position information to the main controller 19. In other words, the manipulation detection portion 15 detects a position manipulated on the screen image displayed on the mobile display portion 14 and inputs the position information to the main controller 19. The embodiment assumes the position information to be coordinates on the screen of the mobile display portion 14, for example. The touch panel portion 16 integrates the mobile display portion 14 with the manipulation detection portion 15. The touch panel portion 16 displays an image containing a button representation (button sign, button display, button image) on the mobile display portion 14 according to an instruction from the main controller 19, for example.

The touch switch may be available as a capacitance touch switch, a resistance touch switch, or otherwise. The position information may represent an identifier or ID to specify each of areas if the screen is divided into a specified number of areas.

The mobile sound input portion 17 includes a microphone. The mobile sound input portion 17 converts the sound like the voice uttered from a user during phone call (phone conversation) into a sound signal and outputs it to the main controller 19. The mobile sound output portion 18 includes a speaker. The mobile sound output portion 18 outputs the phone call party's voice and various guidance sounds based on instructions from the main controller 19. The main controller 19 is configured as an ordinary computer. The main controller 19 contains known components such as a CPU, ROM, EEPROM, RAM, I/O, and a bus line connecting these components (none illustrated). The main controller 19 performs various processes based on various types of information supplied from the mobile communication portion 13, the touch panel portion 16, and the mobile sound input portion 17.

For example, the main controller 19 performs an application program (hereinafter referred to as an application). The main controller 19 generates image data to display a screen image according to the application on the touch panel portion 16. The main controller 19 allows the touch panel portion 16 to display the screen image according to the image data. The application may be previously stored in the ROM or may be downloaded by a communication portion (not shown) from a server via a communications system such as a network.

Based on the position information supplied from the touch panel portion 16, the main controller 19 determines which button representation (button sign, button display, button image) is manipulated on the screen image displayed in the touch panel portion 16. The main controller 19 performs a process corresponding to the manipulated button representation. For example, the main controller 19 may detect manipulation of a button representation (hereinafter referred to as a phone call start button) to start phone call (phone conversation) using the mobile phone 1. In such a case, the main controller 19 performs a process that starts phone call using the mobile phone 1.

During phone call, the main controller 19 transmits a sound signal supplied from the mobile sound input portion 17 to a public line. In addition, the main controller 19 converts a sound signal received from the public line into the sound and outputs it from the mobile sound output portion 18.

During connection in the terminal mode, the main controller 19 allows the USB communication portion 12 to transmit image data, which is generated to be displayed on the touch panel portion 16, to the vehicular apparatus 2. In this case, the main controller 19 allows the USB communication portion 12 to transmit display area information (e.g., resolution or a screen size found by multiplying the width (W pixels) and the height (H pixels) together) about the mobile display portion 14 to the vehicular apparatus 2, for example. The embodiment assumes that the terminal mode is used for USB connection between the mobile phone 1 and the vehicular apparatus 2 via the USB communication portion 12. The embodiment may be configured so that user's manipulatory input to the touch panel portion 16 selects whether to use the terminal mode for connection.

During connection in the terminal mode, the main controller 19 uses the position information supplied from the vehicular apparatus 2 via the USB communication portion 12 to determine which button representation is manipulated on the screen image displayed in the touch panel portion 16. The main controller 19 performs a process corresponding to the manipulated button representation. This will be described in more detail later.

Moreover, the main controller 19 allows the BT communication portion 11 to transmit incoming call state notification or phone call state notification to the vehicular apparatus 2. The incoming call state notification indicates that an incoming call has been received. The phone call state notification indicates that a phone call state (busy state) has started.

The main controller 19 enables (performs changeover to change to) the handsfree phone call if the BT communication portion 11 receives a handsfree changeover request (to be described) transmitted from the vehicular apparatus 2. After changeover to the handsfree phone call, the main controller 19 allows the BT communication portion 11 to transmit a sound signal received from the public line to the vehicular apparatus 2. The BT communication portion 11 receives a sound signal transmitted from the vehicular apparatus 2. The main controller 19 then transmits the sound signal to the public line.

Returning to FIG. 1, the vehicular apparatus 2 is mounted on vehicles such as automobiles and displays images or inputs and outputs sounds. The vehicular apparatus 2 may be available as an onboard navigation system, an onboard display apparatus, or a so-called display audio system, for example. The display audio system represents a vehicular apparatus that includes only basic functions such as the display function, the audio reproduction function, and the communication function with the mobile phone 1 and is capable of being multifunctional in cooperation with the mobile phone 1.

The vehicular apparatus 2 may be available as an onboard navigation system integrated with a display. Alternatively, the vehicular apparatus 2 may be available as a combination of a display and an onboard navigation system with no display. According to the embodiment, for example, the following description assumes the vehicular apparatus 2 to be an onboard navigation system integrated with a display.

Figure 3:
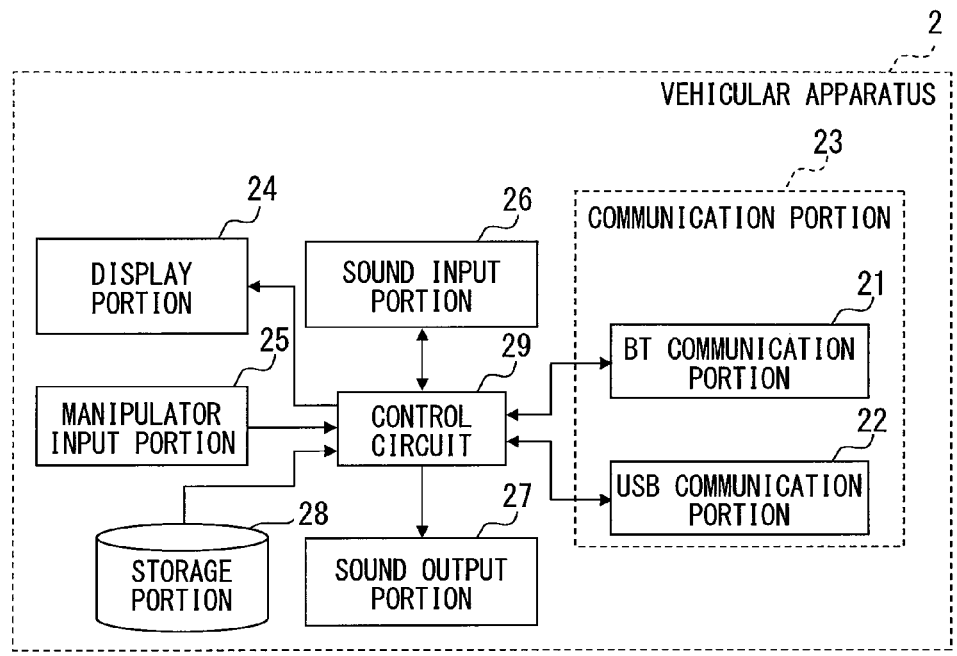
FIG. 3 is a block diagram illustrating a schematic configuration of a vehicular apparatus.

The following describes a schematic configuration of the vehicular apparatus 2 with reference to FIG. 3. For convenience sake, the description is omitted for configurations of the functions that are provided for the vehicular apparatus 2 and are unnecessary for description of the disclosure. FIG. 3 is a block diagram illustrating a schematic configuration of the vehicular apparatus 2. As illustrated in FIG. 3, the vehicular apparatus 2 includes a vehicular communication portion 23 including a BT communication portion 21 and a USB communication portion 22, a vehicular display portion 24, a manipulatory input portion 25, a vehicular sound input portion 26, a vehicular sound output portion 27, a storage portion 28, and a control circuit 29.

The vehicular communication portion 23 communicates with the mobile phone 1. Therefore, the vehicular communication portion 23 is also referred to as a communication means or device. More specifically, the BT communication portion 21 performs BT communication with the mobile phone 1. The USB communication portion 22 performs USB communication with the mobile phone 1. According to the embodiment, the BT communication portion 21 is used to transmit and receive information about control on changeover to handsfree phone call. The USB communication portion 22 is used to transmit and receive image data and position information during connection in the terminal mode. As described above, communication between the vehicular apparatus 2 and the mobile phone 1 may be wireless or wired.

The USB communication portion 22 receives display area information or image data transmitted from the mobile phone 1 and inputs it to the control circuit 29. The USB communication portion 22 follows an instruction from the control circuit 29 to transmit the position information output from the control circuit 29 to the mobile phone 1.

The vehicular display portion 24 displays images in accordance with instructions from the control circuit 29. For example, the vehicular display portion 24 is capable of full-color display and may use a liquid crystal display, an organic EL display, or a plasma display. The manipulatory input portion 25 may be available as a touch switch integrated with the vehicular display portion 24 or a remote control switch, for example. The switch manipulation provides the control circuit 29 with manipulatory instructions on various functions. A touch switch of the manipulatory input portion 25 may be integrated with the vehicular display portion 24 and is also referred to as a vehicular touch panel. Similarly to the above-mentioned manipulation detection portion 15, the manipulatory input portion 25 detects a position where press manipulation was performed on the screen image displayed in the vehicular display portion 24. The manipulatory input portion 25 inputs the position information to the control circuit 29.

The vehicular sound input portion 26 includes a microphone. The vehicular sound input portion 26 converts a sound uttered from the user into a sound signal and outputs it to the control circuit 29. The vehicular sound output portion 27 includes a speaker. The vehicular sound output portion 27 outputs the phone call party's voice and various guidance sounds during handsfree phone call based on instructions from the control circuit 29.

The storage portion 28 stores an image feature about a phone call start display area for starting phone call using the mobile phone 1 on the screen of the mobile phone 1. Therefore, the storage portion 28 is also referred to as a phone call area image feature storage portion. The phone call start display area for starting phone call using the mobile phone 1 corresponds to a button representation (hereinafter referred as a phone call start button), which starts phone call, on the screen of the mobile phone 1. The image feature is provided using indexes such as a color, a shape, and a chronological change cycle of the pixel information about the same pixel.

If the color is used as an index for the image feature about the phone call start button, the storage portion 28 stores inside colors and frame colors of the phone call start button as a graphic. If the shape is used as an index for the same, the storage portion 28 stores shapes of the phone call start button as a graphic and shapes of letters and symbols used for the phone call start button. If the chronological change cycle of the pixel information (e.g., color information) about the same pixel is used as an index for the same, the storage portion 28 stores chronological change cycles of phone call start button elements capable of animation such as blinking or changing colors and shapes.

Figure 4:
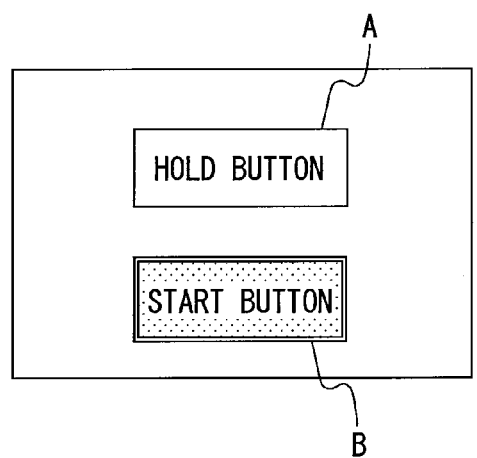
FIG. 4 is a schematic diagram illustrating an image feature of a phone call start button.

The image feature of the phone call start button needs to distinguish the phone call start button from the other button representations (e.g., a hold button). As illustrated in FIG. 4, for example, an outer frame of the hold button (A in FIG. 4) is shaped into a single-line rectangle. In such a case, an outer frame of the phone call start button (B in FIG. 4) is shaped into a double-line rectangle. The inside of the phone call start button enclosed in the outer frame is colored differently from the hold button. Also as illustrated in FIG. 4, the text "start button" used for the phone call start button differs from the text "hold button" used for the hold button.

The control circuit 29 is configured as an ordinary computer. The control circuit 29 contains known components such as a CPU, ROM, EEPROM, RAM, I/O, and a bus line connecting these components (none illustrated). The control circuit 29 performs various processes based on various types of information supplied from the vehicular communication portion 23, the manipulatory input portion 25, and the vehicular sound input portion 26.

The vehicular communication portion 23 receives image data (hereinafter referred to as mobile-generated image data) from the mobile phone 1. When supplied with the mobile-generated image data, the control circuit 29 generates an image according to the mobile-generated image data and outputs the image to the vehicular display portion 24. The control circuit 29 allows the vehicular display portion 24 to display a screen image (hereinafter referred to as a mobile screen image) according to the mobile-generated image data.

To display the mobile screen image, the control circuit 29 generates an image by converting the size and the resolution of the mobile-generated image data into the size and the resolution of the screen for the vehicular display portion 24 based on the display area information transmitted from the mobile phone 1, for example.

According to the embodiment, the size and the resolution of the mobile-generated image data are converted into the size and the resolution of the screen for the vehicular display portion 24 based on the display area information transmitted from the mobile phone 1. However, the configuration is not limited thereto. For example, the control circuit 29 may previously maintain a fixed value for a ratio of converting the size and the resolution of the mobile-generated image data and perform the conversion based on the fixed value. In this case, the mobile phone 1 need not transmit the display area information.

The position information indicates a position corresponding to the press manipulation onto the screen image displayed in the vehicular display portion 24. The control circuit 29 is supplied with the position information from the manipulatory input portion 25. Coordinates (i.e., a pixel area) corresponding to the position information are contained in the screen of the touch panel portion 16 (specifically, a mobile display portion 14) of the mobile phone 1. The control circuit 29 specifies the pixel area as a manipulation target area. The control circuit 29 may specify the manipulation target area corresponding to the position information by reversing the conversion used to generate an image, that is, reversely converting the size of the mobile-generated image data.

The USB communication portion 22 transmits a signal indicating the coordinates specified as the manipulation target area to the mobile phone 1. The control circuit 29 thereby allows the mobile phone 1 to perform input similar to that used to manipulate the manipulation target area on the screen in the touch panel portion 16 of the mobile phone 1. Therefore, the control circuit 29 is also referred to as a control means or device.

The BT communication portion 21 receives information about control on changeover to the handsfree phone call from the mobile phone 1. The USB communication portion 22 receives image data from the mobile phone 1. The control circuit 29 accepts input of the information and the image data and performs a process (hereinafter referred to as a handsfree phone call changeover process) related to the control on changeover to the handsfree phone call.

Figure 5:
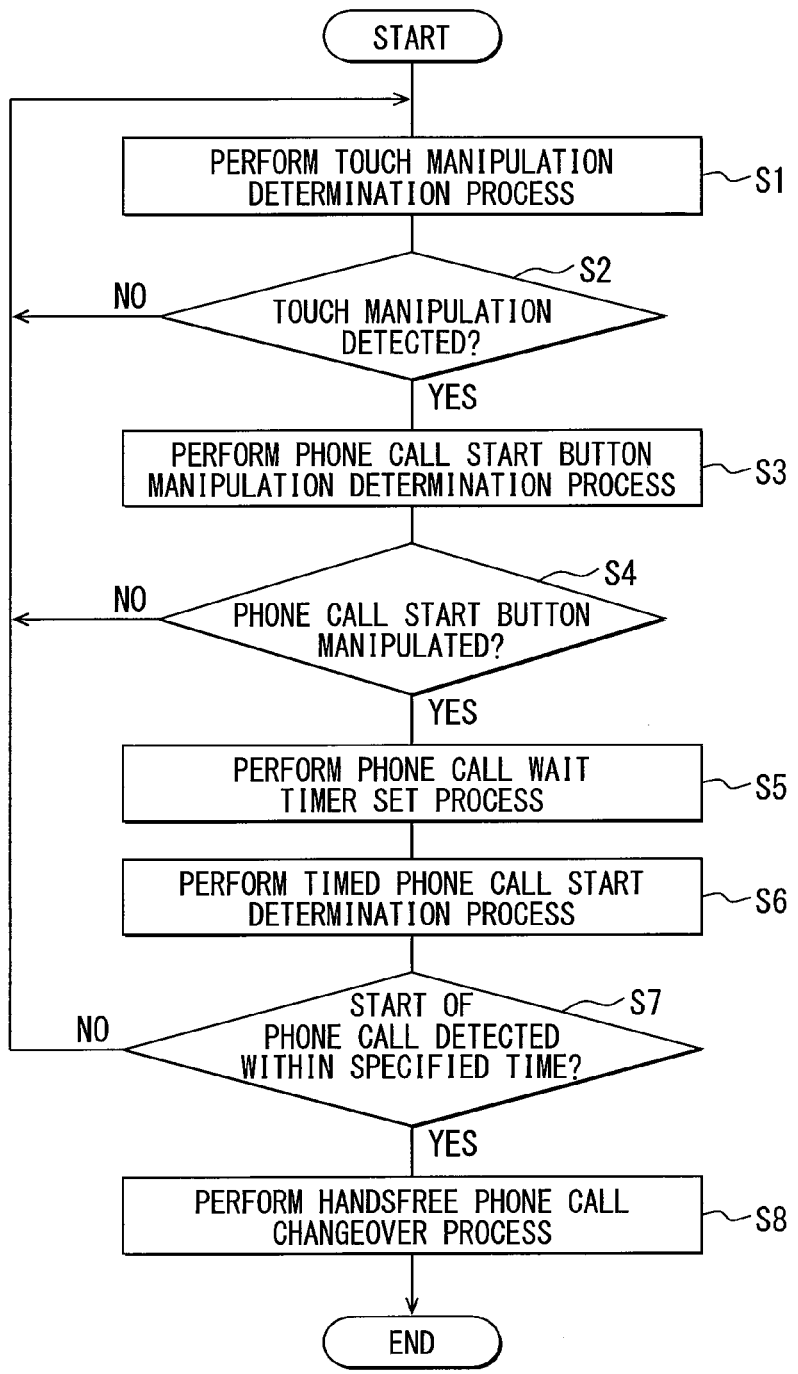
FIG. 5 is a flowchart illustrating a flow of a handsfree phone call changeover process in a control circuit.

The following describes a flow of the handsfree phone call changeover process in the control circuit 29 with reference to FIG. 5. FIG. 5 is a flowchart illustrating a flow of the handsfree phone call changeover process by the control circuit 29. The process flow starts when the vehicular apparatus 2 connects with the mobile phone 1 in the terminal mode.

A handsfree phone call protocol (handsfree phone call profile or HFP in the BT communication) is used for handsfree phone call and is connected prior to connection in the terminal mode. While the power is turned on, the vehicular apparatus 2 transmits a search signal that searches for the mobile phone 1 capable of the BT communication. The mobile phone 1 receives the search signal and transmits a search response signal to the vehicular apparatus 2. The vehicular apparatus 2 receives the search response signal and enables BT communication line connection to the mobile phone 1. If the connection to the BT communication line terminates normally, the vehicular apparatus 2 then enables HFP connection to the mobile phone 1. If the HFP connection terminates normally, the vehicular apparatus 2 continues the HFP connection. In this state, the handsfree phone call is performed so that sound data is exchanged between the vehicular apparatus 2 and the mobile phone 1 and the sound data is output from a speaker of the vehicular apparatus 2.

The process is described on the following assumptions. The HFP need not be connected anew as long as the HFP is not disconnected. The handsfree phone call is enabled by changing a sound input path for the microphone or the speaker so as to be available for the handsfree phone call.

A flowchart described in this application or a process corresponding to the flowchart includes multiple sections (or referred to as steps). Each section is represented as step S1, for example. Each section may be divided into multiple subsections. Multiple sections may be unified into one section. Each section configured in this manner may be referred to as a device, a module, or a means.

Each of or a combination of the above-mentioned sections is available as not only (i) a section of software combined with a hardware unit (e.g., a computer), but (ii) a hardware section, with or without functions of related apparatuses. The hardware section can be configured inside a microcomputer.

The software section can be included in a software program. The software program can be included in a non-transition computer-readable storage medium as a program product.

At step S1, the control circuit 29 performs a touch manipulation determination process and proceeds to step S2. The touch manipulation determination process determines whether the vehicular touch panel is pressed (whether the vehicular touch panel receives press manipulation). Whether the vehicular touch panel is pressed may be determined by determining whether the manipulatory input portion 25 detects manipulation.

At step S2, the touch manipulation determination process may determine that the vehicular touch panel is pressed, that is, the touch manipulation is detected (YES at step S2). In this case, the control circuit 29 proceeds to step S3. The touch manipulation determination process may determine that the vehicular touch panel is not pressed, that is, no touch manipulation is detected (NO at step S2). In this case, the control circuit 29 returns to step S1 and repeats the process flow.

At step S3, the control circuit 29 performs a phone call start button manipulation determination process and proceeds to step S4. The phone call start button manipulation determination process specifies a pixel area based on the image data acquired from the mobile phone 1 and the image feature of the phone call start button stored in the storage portion 28. The pixel area displays an image for the phone call start button on the screen of the vehicular touch panel.

If the color is used as an index for the image feature, the control circuit 29 recognizes one graphic corresponding to a portion of the screen image where the same color is used continuously. The recognized graphic may be provided as a closed line. In such a case, the control circuit 29 recognizes the graphic as a graphic frame and recognizes the frame and its inside as one graphic. A graphic may often use multiple colors. In such a case, the graphic color is assumed if the color has the ratio greater than or equal to a specified value in the graphic. The recognized graphic frame or its inside may correspond to the color stored as the image feature of the phone call start button. In such a case, the control circuit 29 specifies the area positioned to the graphic as an area to display the phone call start button image on the screen of the vehicular touch panel.

If the shape is used as an index for the image feature, the control circuit 29 performs pattern matching with shapes stored as the image feature of the phone call start button. If a matching target (character, symbol, or graphic) is found, the control circuit 29 specifies the area positioned to the target as an area to display the phone call start button image on the screen of the vehicular touch panel. The control circuit 29 may specify a character as the image feature based on character information read from the screen image using a character recognition process and previously stored character information. Specifically, character information is read from image information displayed on the screen and may match the previously stored character information. In such a case, the control circuit 29 specifies a given area around the area to draw the character information on the screen or the area inside a surrounding frame, if any, as an area to display the phone call start button image on the screen of the vehicular touch panel.

The chronological change cycle of the pixel information about the same pixel may be used as an index for the image feature. In this case, similarly to the color used as an index for the image feature, the control circuit 29 recognizes one graphic corresponding to a portion of the screen where the same color is used continuously. The chronological change cycle of the pixel information about the same pixel of the recognized graphic frame or its inside may match the change cycle stored as the image feature of the phone call start button. In such a case, the control circuit 29 specifies the area positioned to the graphic as an area to display the phone call start button image on the screen of the vehicular touch panel.

The phone call start button manipulation determination process uses the position information supplied from the manipulatory input portion 25 to specify an area (hereinafter referred to as a manipulation area) manipulated by a user on the screen of the vehicular touch panel. Therefore, the control circuit 29 is also referred to as a touch manipulation detection section or means. If the position information indicates coordinates for one point, the manipulation area may correspond to the one point indicated by the coordinates or may correspond to a specified range around the coordinates. If the position information contains coordinates for multiple points, the manipulation area may correspond to a range of coordinates for the points.

Suppose that the control circuit 29 can specify an area to display the phone call start button image on the screen of the vehicular display portion 24. In such a case, the control circuit 29 determines whether the area to display the phone call start button matches the manipulation area. If a match is found, the control circuit 29 determines manipulation of the phone call start button displayed on the screen of the vehicular touch panel. Therefore, the control circuit 29 is also referred to as a phone call manipulation determination section or means. Whether the area to display the phone call start button matches the manipulation area may be determined by determining whether the area to display the phone call start button and the manipulation area at least partially overlap with each other. Suppose that the control circuit 29 cannot specify an area to display the phone call start button image on the screen of the vehicular display portion 24. In such a case, the control circuit 29 does not determine manipulation of the phone call start button displayed on the screen of the vehicular touch panel.

According to the embodiment, an area to display the phone call start button is specified. Then, determining whether the area matches the manipulation area determines manipulation of the phone call start button displayed on the screen of the vehicular touch panel. However, the configuration is not limited thereto. For example, the control circuit 29 may determine whether the image feature for the manipulation area matches the image feature stored in the storage portion 28 for the phone call start button to determine manipulation of the phone call start button displayed on the screen of the vehicular touch panel (first modification). In such a case, the phone call start button manipulation determination process may be configured as follows.

The control circuit 29 uses the position information supplied from the manipulatory input portion 25 to specify an area (i.e., manipulation area) manipulated by a user on the screen of the vehicular touch panel. If the position information indicates coordinates for one point, for example, the manipulation area may correspond to a range of graphic that is partially or entirely included in a specified range around the coordinates. If the position information contains coordinates for multiple points, the manipulation area may correspond to a range of graphic that is partially or entirely included in a specified range indicated by the coordinates for multiple points. As described above, the control circuit 29 recognizes one graphic corresponding to a portion of the screen image where the same color is used continuously. Alternatively, the control circuit 29 recognizes a closed line as a graphic frame and recognizes the frame and its inside as one graphic.

The control circuit 29 uses image data acquired from the mobile phone and the manipulation area to determine the image feature for the manipulation area. If the color is used as an index for the image feature, for example, the control circuit 29 determines the image feature for the manipulation area according to the frame or the inside color of a graphic partially or entirely included in the manipulation area. If the shape is used as an index for the image feature, the control circuit 29 determines the image feature for the manipulation area according to the shape of a graphic partially or entirely included in the manipulation area or characters or symbols included in the graphic. If the chronological change cycle of the pixel information about the same pixel is used as an index for the image feature, the control circuit 29 determines the image feature for the manipulation area according to the frame of a graphic partially or entirely included in the manipulation area or the chronological change cycle of the pixel information about the same inside pixel.

The control circuit 29 determines whether the determined image feature matches the image feature for the phone call start button stored in the storage portion 28. If a match is found, the control circuit 29 determines manipulation of the phone call start button displayed on the screen of the vehicular touch panel. If the shape is used as an index for the image feature, the control circuit 29 performs pattern matching, for example. A match may be found if the pattern matching succeeds. This can narrow down areas requiring the image features to the manipulation area on the screen of the vehicular touch panel. The control circuit 29 can determine manipulation of the phone call start button displayed on the screen of the vehicular touch panel without finding all image features for all areas in the screen of the vehicular touch panel. It is possible to reduce arithmetic processing loads on the control circuit 29.

At step S4, the control circuit 29 may determine that the phone call start button is pressed during the phone call start button manipulation determination process (YES at step S4). In this case, the control circuit 29 proceeds to step S5. The control circuit 29 may not determine that the phone call start button is pressed during the phone call start button manipulation determination process (NO at step S4). In this case, the control circuit 29 returns to step S1 and repeats the process flow.

At step S5, the control circuit 29 performs a phone call wait timer set process and proceeds to step S6. The phone call wait timer set process starts counting the timer. A timer circuit (not shown) may be used for the timer.

At step S6, the control circuit 29 performs a timed phone call start determination process and proceeds to step S7. The timed phone call start determination process determines whether a phone call state of the mobile phone 1 is detected within a specified time after (since when) the phone call wait timer set process starts counting the timer. Specifically, a phone call state of the mobile phone 1 may be detected when the control circuit 29 is supplied with the phone call state notification received by the BT communication portion 21 from the mobile phone 1. Therefore, the control circuit 29 is also referred to as a phone call state detection section or means. The specified time can be set to any duration longer than a time difference that may result from manipulation onto the mobile phone 1 according to manipulation input to the vehicular apparatus 2 during connection in the terminal mode. The specified time may be set to one to several seconds, for example.

The phone call state of the mobile phone 1 may be detected when the control circuit 29 is supplied with the sound signal received by the BT communication portion 21 from the mobile phone 1, that is, when the sound signal is received.

The storage portion 28 may previously store the image feature about a screen image (hereinafter referred to as a phone call screen image) displayed on the touch panel portion 16 while the mobile phone 1 is during a phone call state. Image data acquired from the mobile phone 1 may be compared to the image feature for the phone call screen image stored in the storage portion 28. A phone call state of the mobile phone 1 may be detected when a match is found between the image feature indicated by the image data acquired from the mobile phone 1 and the image feature for the phone call screen image. Therefore, the storage portion 28 is also referred to as a phone call screen image feature storage portion. The image feature for the phone call screen image includes colors, shapes, characters (e.g., "phone call"), symbols, and graphics (e.g., graphic of a icon used for a phone call button) of buttons characteristic of the phone call screen image.

At step S7, the control circuit 29 may determine that a phone call state of the mobile phone 1 is detected within the specified time after the phone call wait timer set process started counting the timer (i.e., detection of phone call started within the specified time) (YES at step S7). In this case, the control circuit 29 proceeds to step S8. The control circuit 29 may not determine the detection of phone call started within the specified time (NO at step S7). In this case, the control circuit 29 returns to step S1 and repeats the process flow.

At step S8, the control circuit 29 performs a handsfree phone call changeover process and terminates the process flow. The handsfree phone call changeover process allows the BT communication portion 21 to transmit a handsfree changeover request to the mobile phone 1 to request changeover to the handsfree phone call and allows the vehicular apparatus 2 to start the handsfree phone call. Therefore, the control circuit 29 is also referred to as a vehicular phone call changeover section or means. The handsfree changeover request is also referred to as a request signal.

When the vehicular sound input portion 26 inputs a sound signal for the phone call sound data, the handsfree phone call allows the BT communication portion 21 to transmit the sound signal to the mobile phone 1. When the BT communication portion 21 receives a sound signal transmitted from the mobile phone 1, the handsfree phone call outputs the sound signal to the vehicular sound output portion 27 to output the phone call party's sound. In other words, the handsfree phone call transmits the sound uttered from the user to the public line via the mobile phone 1 and outputs the sound received by the mobile phone from the public line. This process flow also terminates when the terminal mode connection is disabled between the vehicular apparatus 2 and the mobile phone 1.

Figure 6:
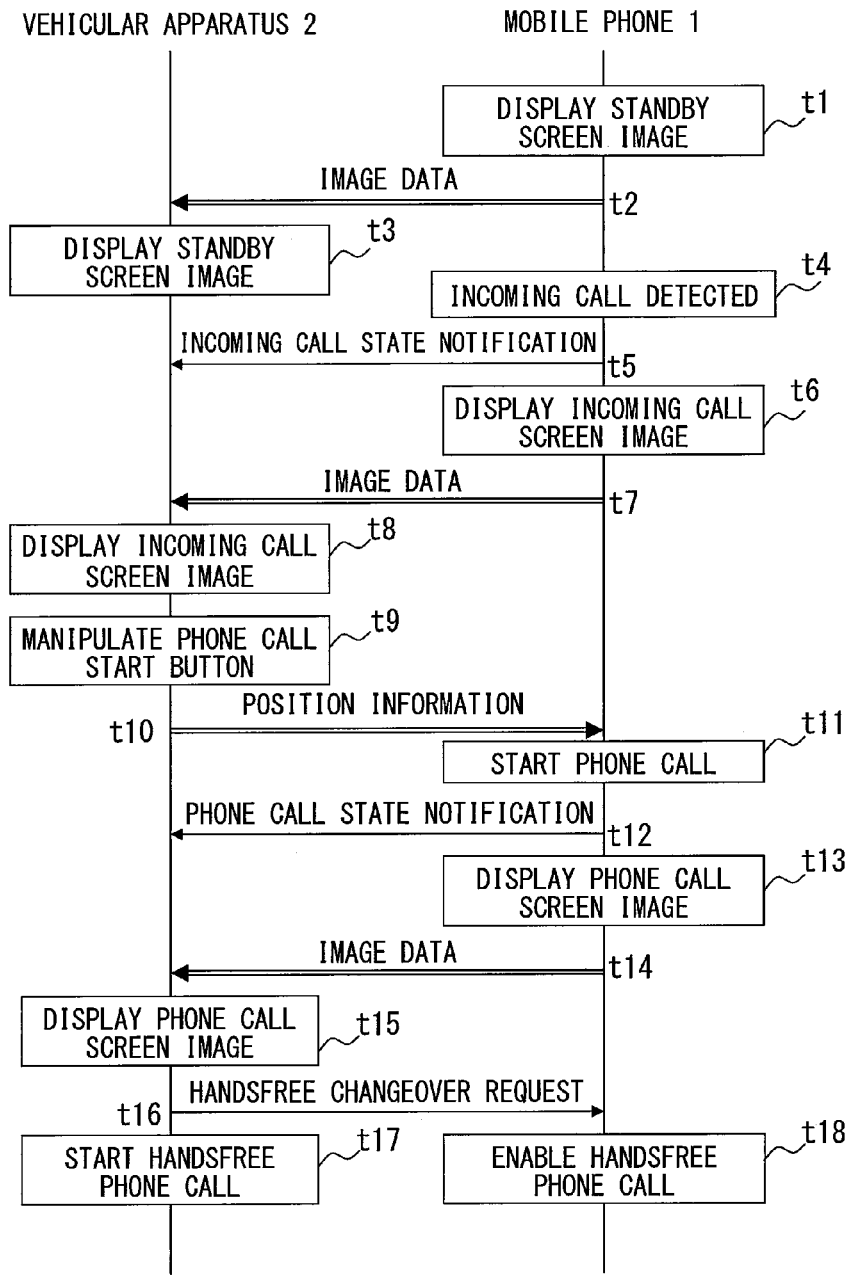
FIG. 6 is a sequence diagram according to a first embodiment illustrating information exchange between a mobile phone and a vehicular apparatus at the time of receiving an incoming call on the mobile phone before changeover to a handsfree phone call.

With reference to FIG. 6, the following describes information exchange between the mobile phone 1 and the vehicular apparatus 2 until changeover to the handsfree phone call at the time of receiving an incoming call on the mobile phone 1. The description below assumes that the mobile phone 1 is ready for phone call within a specified time after the phone call start button displayed on the screen of the vehicular touch panel is manipulated. In FIG. 6, an arrow illustrates an information flow during the BT communication. A double arrow illustrates an information flow during the USB communication.

The touch panel portion 16 of the mobile phone 1 displays a standby screen image (t1). In this case, the mobile phone 1 transmits image data for the standby screen image to the vehicular apparatus 2 according to the USB communication (t2). Based on the image data, the vehicular apparatus 2 allows the vehicular touch panel to display a standby screen image corresponding to that displayed on the touch panel portion 16 of the mobile phone 1 (t3). The standby screen image may be replaced by a screen image according to applications other than an application related to the phone call function.

There is an incoming call on the mobile phone 1 (t4). The mobile phone 1 transmits an incoming call state notification to the vehicular apparatus 2 according to BT communication (t5). When there is an incoming call on the mobile phone 1, the touch panel portion 16 of the mobile phone 1 displays an incoming call screen image (t6). The mobile phone 1 transmits image data for the incoming call screen image to the vehicular apparatus 2 according to the USB communication (t7). Based on the image data, the vehicular apparatus 2 displays an incoming call screen image on the vehicular touch panel (t8). This incoming call screen image is similar to that displayed on the touch panel portion 16 of the mobile phone 1. The incoming call screen image is assumed to include the above-mentioned phone call start button.

A user manipulates the phone call start button in the incoming call screen image displayed on the vehicular touch panel (t9). The vehicular apparatus 2 transmits position information about the manipulation area to the mobile phone 1 according to the USB communication (t10). Based on the position information, the mobile phone 1 manipulates the phone call start button on the mobile phone 1 and starts the phone call (t11).

When the phone call starts, the mobile phone 1 transmits the phone call state notification to the vehicular apparatus 2 according to the BT communication (t12). When the phone call starts, the touch panel portion 16 of the mobile phone 1 displays the phone call screen image (t13). The mobile phone 1 transmits image data for the phone call screen image to the vehicular apparatus according to the USB communication (t14). Based on the image data, the vehicular apparatus 2 displays a phone call screen image on the vehicular touch panel (t15). This phone call screen image is similar to that displayed on the touch panel portion 16 of the mobile phone 1.

The vehicular apparatus 2 determines that the mobile phone 1 is ready for phone call within a specified time after the phone call start button displayed on the screen of the vehicular touch panel is manipulated. The vehicular apparatus 2 then transmits a handsfree changeover request to the mobile phone 1 according to the BT communication (t16). The vehicular apparatus 2 is changed to the handsfree phone call (t17). The mobile phone 1 receives the handsfree phone call request and is changed to the handsfree phone call (t18).

An outgoing call from the mobile phone 1 enables the handsfree phone call as follows. The vehicular apparatus 2 receives the phone call state notification from the mobile phone 1 within a specified time after the phone call start button displayed on an outgoing call screen image on the vehicular touch panel is manipulated. The vehicular apparatus 2 then transmits the handsfree phone call request to the mobile phone 1 to enable the handsfree phone call (to perform changeover to the handsfree phone call).

The embodiment enables the handsfree phone call when a phone call state notification is received from the mobile phone 1 within a specified time after the screen of the vehicular touch panel is manipulated. The mobile phone 1 may enter a phone call state in a short period of time after the screen of the vehicular touch panel is manipulated. In such a case, the user highly likely started the phone call by manipulating the phone call start button on the screen of the vehicular touch panel regardless of whether the phone call starts after an incoming call to the mobile phone 1 or due to an outgoing call from the mobile phone 1. The user highly likely needs the handsfree phone call because the user manipulated the vehicular touch panel. The above-mentioned configuration allows the vehicular apparatus 2 to determine the need for changeover to the handsfree phone call and enable the handsfree phone call.

The embodiment determines manipulation of the phone call start button on the vehicular apparatus 2 based on image data acquired from the mobile phone 1, the image feature about the phone call start button, and the manipulation area specified by the control circuit 29. The affirmative determination enables the handsfree phone call. The above-mentioned configuration allows the vehicular apparatus 2 to more accurately determine the need for changeover to the handsfree phone call and enable the handsfree phone call.

According to the embodiment, the handsfree phone call is enabled when satisfying two conditions, that is, (i) receiving a phone call state notification from the mobile phone 1 within a specified time after manipulation of the screen of the vehicular touch panel and (ii) manipulating the phone call start button on the vehicular apparatus 2. However, the configuration is not limited thereto. For example, the handsfree phone call may be enabled when one of the two conditions is satisfied.

For example, suppose that the handsfree phone call is enabled when a phone call state notification is received from the mobile phone 1 within a specified time after the screen of the vehicular touch panel is manipulated. In such a case, step S3 and step S4 may be omitted from the process flow in FIG. 5 and step S2 may be followed by step S5. Suppose that the handsfree phone call is enabled when the phone call start button is manipulated on the vehicular apparatus 2. In such a case, step S5 to step S7 may be omitted and control may proceed to step S8 if step S4 results in YES.

Moreover, the above-mentioned embodiment allows the vehicular apparatus 2 to transmit a handsfree changeover request to the mobile phone 1 when a phone call state notification is received from the mobile phone 1 within a specified time after manipulation of the screen of the vehicular touch panel is detected. For example, the vehicular apparatus 2 may transmit a handsfree phone call request to the mobile phone 1 when an incoming call state notification, an outgoing call state notification, or a calling state notification other than the phone call state is received from the mobile phone 1 within a specified time after manipulation of the screen of the vehicular touch panel is detected. In this case, the mobile phone 1 temporarily stores reception of the handsfree phone call request and performs the handsfree phone call later when the mobile phone 1 enters the phone call state.

Second Embodiment

The present disclosure is not limited to the first embodiment. A second embodiment described below is also included in the technical scope of the disclosure. The following describes the second embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the second embodiment includes the mobile phone 1 and the vehicular apparatus 2. The second embodiment equals the first embodiment except differences in the processes of the control circuit 29 in the vehicular apparatus 2.

Specifically, the control circuit 29 (hereinafter referred to as a control circuit 29*a* for convenience sake) according to the second embodiment may be supplied with mobile-generated image data received from the mobile phone 1 via the vehicular communication portion 23. In such a case, the control circuit 29a generates an image according to the mobile-generated image data, outputs the image to the vehicular display portion 24, and displays a mobile screen image according to the mobile-generated image data on part of an area in the vehicular display portion 24.

Further, the control circuit 29a allows the vehicular apparatus 2 itself to generate a uniquely generated screen image in addition to the mobile screen image. The control circuit 29a displays the uniquely generated screen image on an area other than the area to display the mobile screen image of the vehicular display portion 24. The control circuit 29a allows the uniquely generated screen image to display also a button icon (hereinafter referred to as an H/F changeover button) that specifies switching between a handsfree phone call and a handset phone call. The H/F changeover button is also referred to as a changeover button image. Therefore, the control circuit 29a is also referred to as a changeover button image display section or means.

The handset phone call is performed on the mobile phone 1 alone. Changeover to the handset phone call for the vehicular apparatus 2 signifies terminating the handsfree phone call protocol or changing the sound input/output path (sound path) to a path that does not use a speaker or a microphone of the vehicular apparatus 2 itself, for example.

Figure 7:
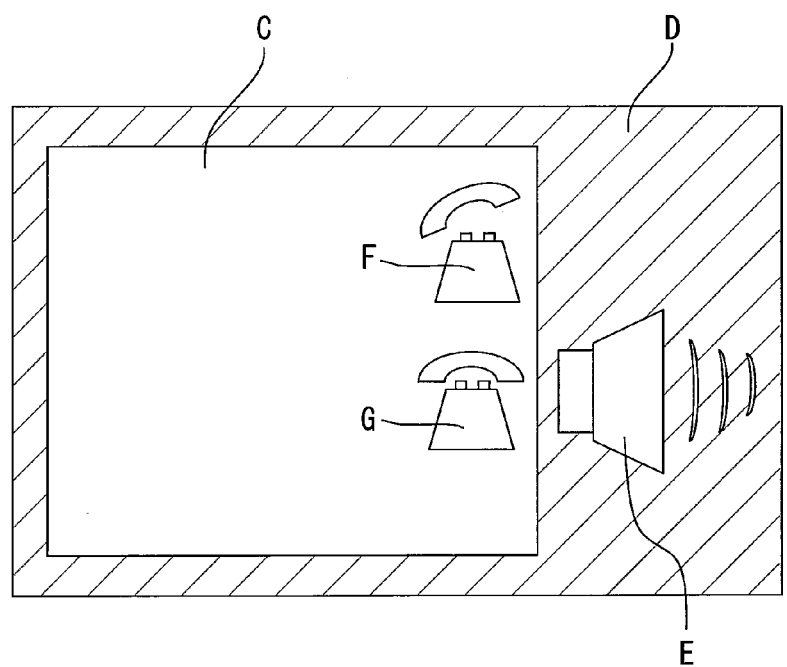
FIG. 7 is a schematic diagram illustrating display of an H/F changeover button.

With reference to FIG. 7, the following describes a display example of the H/F changeover button. In FIG. 7, reference symbol C denotes the mobile screen image. Reference symbol D denotes the uniquely generated screen image. Reference symbol E denotes the H/F changeover button. Reference symbol F denotes the phone call start button in the mobile screen image. Reference symbol G denotes a phone call end button. As illustrated in FIG. 7, the uniquely generated screen image is displayed around the mobile screen image. The H/F changeover button is included in the uniquely generated screen image.

The H/F changeover button is designed differently from the phone call start button on the mobile screen image. For example, there may be previously provided a button image containing text such as "handsfree" not used for the phone call start button on the mobile screen image. This button image may be used as an image for the H/F changeover button.

Alternatively, there may be provided multiple candidates for the H/F changeover button image. The H/F changeover button image may be selected from the candidates so as to be designed differently from the phone call start button on the mobile screen image. The phone call start button on the mobile screen image may be designed by analyzing the image feature for graphics on the mobile screen image, for example. The storage portion 28 may previously store information about button designs according to models of the mobile phone 1. The design of the phone call start button for the mobile phone 1 may be estimated based on the information about the model of the mobile phone 1 acquired from the connected mobile phone 1 and the information about the button design according to the models.

This helps the user to easily distinguish between the phone call start button displayed on the mobile screen image and the H/F changeover button. In this case, the phone call start button specifies the start of handset phone call.

Moreover, the H/F changeover button may be manipulated according to a procedure different from the procedure of manipulating the phone call start button on the mobile screen image, for example. That is, the manipulatory input portion 25 corresponding to the H/F changeover button accepts a manipulation input different from that accepted by the manipulatory input portion 25 corresponding to the phone call start button on the mobile screen image. For example, a single-touch manipulation detects manipulation onto the phone call start button. A two-touch manipulation detects manipulation onto the H/F changeover button. This helps the user to more easily distinguish between the phone call start button displayed on the mobile screen image and the H/F changeover button. In this case, the phone call start button specifies the start of handset phone call.

The H/F changeover button may be designed similarly to the phone call start button on the mobile screen image. Even if similar designs are used, different procedures may be used to distinguish the H/F changeover button from the phone call start button on the mobile screen image, for example. One example is to divide the display area of the vehicular touch panel to easily distinguish the H/F changeover button from the phone call start button on the mobile screen image so that the user can easily distinguish between the buttons.

It may be favorable to preset responsive action against a manipulation instruction corresponding to the H/F changeover button (i.e., the touch switch). The responsive action may be preset according to user's manipulation input from the manipulatory input portion 25, for example.

For example, manipulating the H/F changeover button may automatically enable the handsfree phone call so that the control circuit 29a need not allow the vehicular display to display a screen image prompting the user to determine whether to start the handsfree phone call.

Alternatively, manipulating the H/F changeover button may cause the control circuit 29a to allow the vehicular display to display a screen image prompting the user to determine whether to start the handsfree phone call. The handsfree phone call may be enabled automatically when accepting manipulation input from the user requesting changeover to the handsfree phone call. A control circuit 29c may accept manipulation input from the user requesting changeover to the handsfree phone call via the manipulatory input portion 25, for example.

Figure 8:
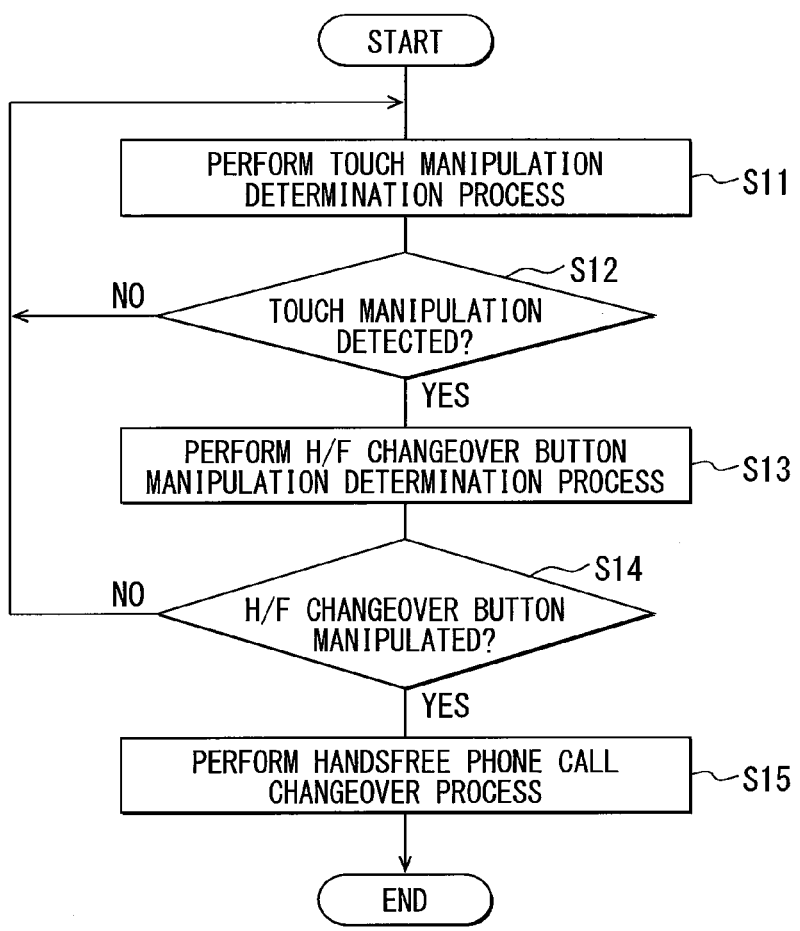
FIG. 8 is a flowchart illustrating a flow of the handsfree phone call changeover process in a control circuit.

The control circuit 29a performs a process (hereinafter referred to as a handsfree phone call changeover process) related to control on changeover to the handsfree phone call. The following describes a flow of the handsfree phone call changeover process in the control circuit 29a with reference to FIG. 8. FIG. 8 is a flowchart illustrating a flow of the handsfree phone call changeover process in the control circuit 29a. The process flow starts when the vehicular apparatus 2 connects with the mobile phone 1 in the terminal mode.

At step S11 similarly to step S1, the control circuit 29a performs the touch manipulation determination process and proceeds to step S12. At step S12, the touch manipulation determination process may determine that the vehicular touch panel is pressed, that is, the touch manipulation is detected (YES at step S12). In this case, the control circuit 29a returns to step S13. The touch manipulation determination process may determine that the vehicular touch panel is not pressed, that is, no touch manipulation is detected (NO at step S12). In this case, the control circuit 29a returns to step S11 and repeats the process flow.

At step S13, the control circuit 29a performs a H/F changeover button manipulation determination process and proceeds to step S14. The H/F changeover button manipulation determination process uses the position information supplied from the manipulatory input portion 25 to specify an area (hereinafter referred to as a manipulation area) manipulated by a user on the screen of the vehicular touch panel. If the position information indicates coordinates for one point, the manipulation area may correspond to the one point indicated by the coordinates or may correspond to a specified range around the coordinates. If the position information contains coordinates for multiple points, the manipulation area may correspond to a range of coordinates for the points.

The H/F changeover button manipulation determination process determines whether an area to display an image for the H/F changeover button on the display area of the vehicular touch panel (specifically the vehicular display portion 24) matches the manipulation area. If a match is found, the control circuit 29a determines that the H/F changeover button displayed on the screen of the vehicular touch panel is manipulated. If a match is not found, the control circuit 29a determines that the H/F changeover button is not manipulated. Therefore, the manipulatory input portion 25 is also referred to as a changeover instruction acceptance portion.

Whether the area to display the H/F changeover button matches the manipulation area may be determined by determining whether the area to display the H/F changeover button and the manipulation area at least partially overlap with each other.

At step S14, the control circuit 29a may determine that the H/F changeover button is manipulated (YES at step S14). In this case, the control circuit 29a returns to step S15. The control circuit 29a may determine that the H/F changeover button is not manipulated (NO at step S14). In this case, the control circuit 29a returns to step S11 and repeats the process flow.

At step S15, the control circuit 29a performs the handsfree phone call changeover process and terminates the process flow. The handsfree phone call changeover process allows the BT communication portion 21 to transmit a handsfree changeover request to the mobile phone 1 to request changeover to the handsfree phone call and allows the vehicular apparatus 2 to start the handsfree phone call. Therefore, the control circuit 29a is also referred to as the vehicular phone call changeover section or means.

Figure 9:
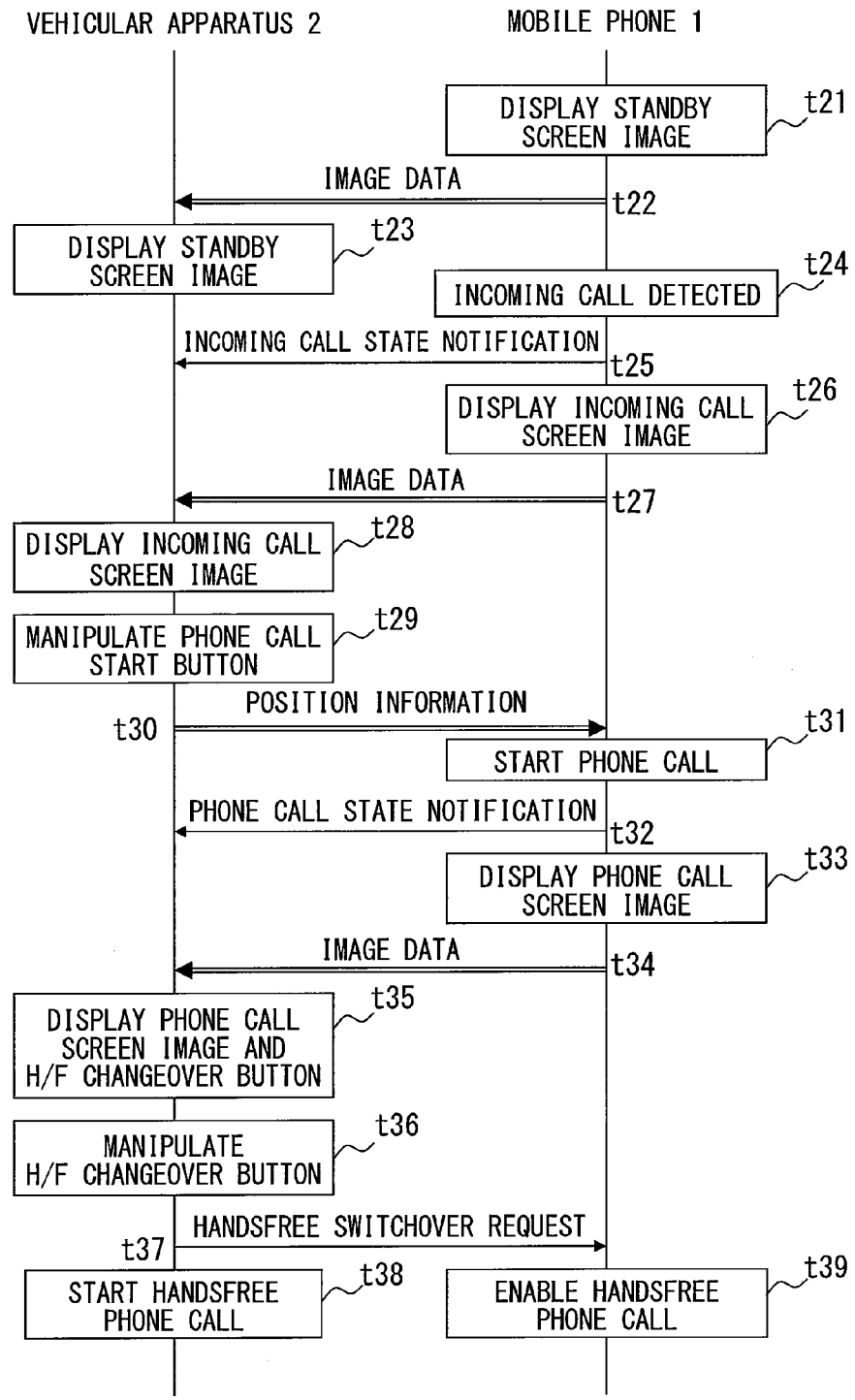
FIG. 9 is a sequence diagram according to a second embodiment illustrating information exchange between a mobile phone and a vehicular apparatus at the time of receiving an incoming call on the mobile phone before changeover to a handsfree phone call.

With reference to FIG. 9, the following describes information exchange between the mobile phone 1 and the vehicular apparatus 2 at the time of receiving an incoming call on the mobile phone 1 before changeover to a handsfree phone call. The description below assumes that the phone call start button and the H/F changeover button displayed on the screen of the vehicular touch panel are manipulated. In FIG. 9, an arrow illustrates an information flow during the BT communication. A double arrow illustrates an information flow during the USB communication.

The process from t21 to t34 equals the process from t1 to t14 in FIG. 6 except that the vehicular apparatus 2 displays the uniquely generated screen image outside the area for (i) the standby screen image and/or (ii) the incoming call screen image, in the display area of the vehicular touch panel. The standby screen image may be replaced by a screen image according to applications other than an application related to the phone call function.

After the process at t34, the vehicular apparatus 2 uses image data transmitted from the mobile phone 1 to display a phone call screen image on the vehicular touch panel. This phone call screen image is similar to that displayed on the touch panel portion 16 of the mobile phone 1. In addition, the vehicular apparatus 2 starts displaying the uniquely generated screen image containing the H/F changeover button (t35).

The user manipulates the H/F changeover button in the uniquely generated screen image on the vehicular apparatus 2 (t36). The mobile phone 1 transmits a handsfree phone call request to the vehicular apparatus 2 according to the BT communication (t37). The vehicular apparatus 2 connects with the mobile phone 1 using the handsfree phone call profile and changes to the handsfree phone call (t38). The mobile phone 1 receives the handsfree phone call request and changes to the handsfree phone call (t39).

According to the example in FIG. 9, the start of phone call starts displaying the H/F changeover button. However, the configuration is not limited thereto. For example, an incoming call on the mobile phone 1 may start displaying the H/F changeover button. In this case, manipulating the H/F changeover button may start the phone call and change to the handsfree phone call even if a phone call button in the mobile screen image is not manipulated.

An outgoing call from the mobile phone 1 may start displaying the H/F changeover button. The H/F changeover button may be always displayed while the uniquely generated screen image is displayed.

The H/F changeover button in the uniquely generated screen image is not contained in the mobile screen image and is unique to the vehicular apparatus 2. Therefore, the need for changeover to the handsfree phone call can be easily determined if the manipulatory input portion 25 detects touch manipulation onto the area that displays the H/F changeover button in the uniquely generated screen image. The configuration according to the embodiment also allows the vehicular apparatus 2 to determine the need for changeover to the handsfree phone call and enable the handsfree phone call.

The control circuit 29a identifies whether the handsfree phone call or the handset phone call is in progress. The control circuit 29a changes the handsfree phone call to the handset phone call when determining that the H/F changeover button is manipulated during the handsfree phone call. The control circuit 29a changes the handset phone call to the handsfree phone call when determining that the H/F changeover button is manipulated during the handset phone call. The control circuit 29a alternates the handsfree phone call and the handset phone call each time the manipulatory input portion 25 accepts touch manipulation onto the area that displays the H/F changeover button.

Whether the H/F changeover button is manipulated is performed similarly to the H/F changeover button manipulation determination process. Manipulating the H/F changeover button can easily cancel the handsfree phone call even if the handsfree phone call is enabled despite the user's intention.

The control circuit 29a is favorably requested to continue to display the H/F changeover button in the uniquely generated screen image during the phone call regardless of the handsfree phone call or the handset phone call. The control circuit 29a may detect a phone call state from reception of a phone call state notification from the mobile phone 1 to reception of a signal indicating the end of phone call from the mobile phone 1. Therefore, the control circuit 29a is also referred to as a phone call state detection section or means.

The changeover button image can be displayed continuously in the phone call state even if (i) the screen image displayed on the touch panel portion 16 of the mobile phone 1 changes from the phone call screen image to a screen image other than the phone call screen image such as the one for displaying a map and (ii) the mobile screen image of the vehicular display portion 24 also changes. In this case, the end of the phone call may also end the display of the H/F changeover button. The control circuit 29a may detect the end of the phone call when receiving a signal indicating the end of the phone call from the mobile phone 1.

The control circuit 29a may display the H/F changeover button even if the connected mobile phone 1 does not have the function that alternates the handsfree phone call and the handset phone call, in the phone call state. The mobile phone not having the function of alternating the handsfree phone call and the handset phone call in the phone call state may only change the handset phone call to the handsfree phone call in the phone call state, for example. The H/F changeover button can be displayed regardless of the type of the mobile phone 1.

Without providing the mobile screen image with the function of changing the phone calls, some types of mobile phones 1 allow mechanical switch manipulation (e.g., holding a phone call key) to change the phone calls. Even if such mobile phones are connected, the H/F changeover button can be displayed regardless of types of the mobile phones 1.

The vehicular apparatus 2 may connect with multiple mobile phones 1 through communication and may be ready for connection with the multiple mobile phones 1. That is, the vehicular apparatus 2 may be connected to the mobile phones 1 according to a handsfree communication procedure for handsfree phone call. In such a case, the following configuration may be available. Examples in the description below assume that the mobile phones 1 and the vehicular apparatus 2 use the BT communication to exchange information about control on changeover to the handsfree phone call as well as image data and the position information during the terminal mode connection.

The vehicular apparatus 2 and the multiple mobile phones 1 are assumed to establish multipoint connection that simultaneously enables connection to multiple instruments using the same profile. The control circuit 29a is assumed to register information (e.g., instrument ID) for identifying each mobile phone 1 and model information about each mobile phone 1 during pairing process between the vehicular apparatus 2 and each of the mobile phones 1. The control circuit 29a may register a user name of the mobile phone 1 instead of the model information.

For example, the control circuit 29a may display the H/F changeover button for only a mobile phone 1 whose mobile screen image is displayed on the vehicular display portion 24 (i.e., this mobile phone 1 is connected in the terminal mode). The control circuit 29a may not display the H/F changeover button for the other mobile phone(s) 1 that is not connected in the terminal mode. The control circuit 29a may specify the mobile phones 1 based on instrument IDs registered during the pairing process.

Generally, the mobile phone 1 connected in the terminal mode is highly likely used for a vehicle driver. The above-mentioned configuration can preferentially display the H/F changeover button for the driver's mobile phone 1. Just a touch manipulation onto the area for the H/F changeover button on the vehicular display portion 24 can easily start handsfree phone call on the driver's mobile phone 1. There is no need to provide a special means to determine the driver's mobile phone 1 by checking instrument IDs of the mobile phones 1.

The vehicular display portion 24 may display the H/F changeover button for the mobile phone 1 connected in the terminal mode as well as the model name or the user name of the mobile phone 1. The model name or the user name of the mobile phone 1 may correspond to that registered during the pairing process.

The sound communication with the mobile phone 1 connected in the terminal mode may be disconnected or muted during handsfree phone call on the mobile phone 1 not connected in the terminal mode. This can prevent the sound for the handsfree phone call from mixing with sounds (in music and video) for applications used in the terminal mode other than the handsfree phone call.

The control circuit 29a may display the H/F changeover button for the multipoint-connected mobile phones 1 whose mobile screen images are not displayed on the vehicular display portion 24 (not connected in the terminal mode). The control circuit 29a may specify the mobile phones 1 based on instrument IDs registered during the pairing process.

In this case, the instrument ID of the mobile phone 1 may be linked to the position information about the area that displays the H/F changeover button for each mobile phone 1. The control circuit 29a can determine for which mobile phone 1 the H/F changeover button is manipulated. The control circuit 29a may alternate the handsfree phone call and the handset phone call on the mobile phone 1 corresponding to the H/F changeover button determined to be manipulated each time the H/F changeover button is manipulated. The control circuit 29a may determine the manipulated H/F changeover button similarly to the H/F changeover button manipulation determination process.

Figure 10:
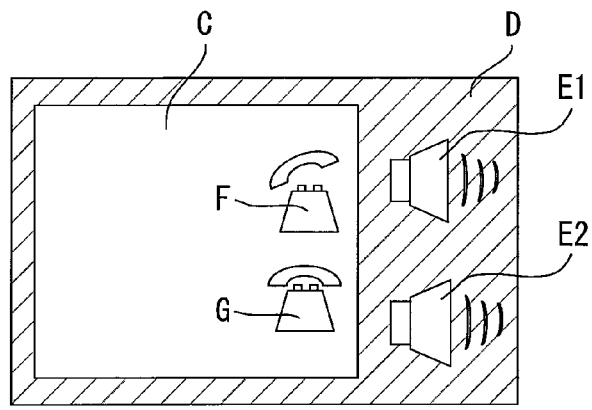
FIGS. 10(a), 10(b) and 10(c) are schematic diagrams illustrating display of H/F changeover buttons during multipoint connection.
Figure 10:
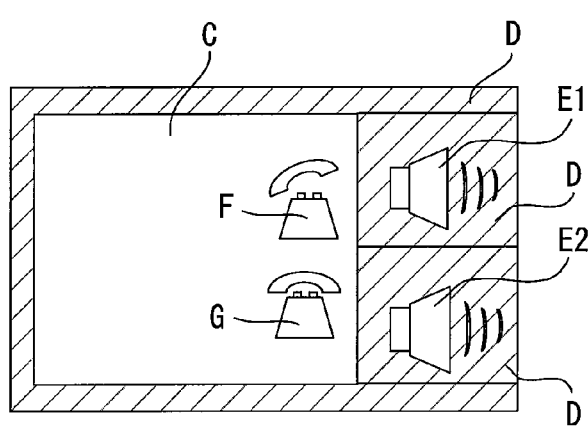
Figure 10:
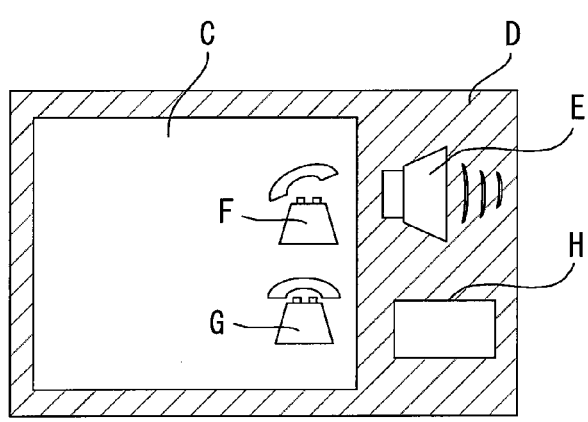

The H/F changeover buttons for the multipoint-connected mobile phones 1 may be displayed as follows. As illustrated in FIG. 10(a), the uniquely generated screen image simultaneously displays H/F changeover buttons for the mobile phones 1. In FIG. 10(a), reference symbol C denotes the mobile screen image. Reference symbol D denotes the uniquely generated screen image. Reference symbols E1 and E2 denote the H/F changeover buttons. Reference symbol F denotes the phone call start button in the mobile screen image. Reference symbol G denotes the phone call end button in the mobile screen image. Two mobile phones 1a and 1b are multipoint-connected with the vehicular apparatus 2. The H/F changeover button E1 corresponds to the mobile phone 1a. The H/F changeover button E2 corresponds to the mobile phone 1b.

The uniquely generated screen image may display the H/F changeover button for each mobile phone 1 as well as the model name or the user name of the mobile phone 1 similarly to the above-mentioned procedure. If one of the H/F changeover buttons for the mobile phones 1 is manipulated, the icons for the H/F changeover buttons other than the manipulated one may be changed to an icon representing that changeover to the handsfree phone call is inhibited. It may be favorable to prevent manipulation of the H/F changeover buttons other than the manipulated one.

As described above, the uniquely generated screen image simultaneously displays the H/F changeover buttons for the mobile phones 1. However, the configuration is not limited thereto. The uniquely generated screen image may be divided into the H/F changeover buttons corresponding to the mobile phones 1 (see FIG. 10(b)). FIG. 10(b) equals FIG. 10(a) except that the uniquely generated screen image is divided into the H/F changeover buttons corresponding to the mobile phones 1.

Moreover, the uniquely generated screen image may sequentially display the H/F changeover buttons one by one corresponding to the multipoint-connected mobile phones 1.

In this case, the uniquely generated screen image may display a button (hereinafter referred to as a mobile changeover button) to change the H/F changeover buttons for the mobile phones 1 (see FIG. 10(c)). In FIG. 10(c), reference symbol C denotes the mobile screen image. Reference symbol D denotes the uniquely generated screen image. Reference symbol E denotes the H/F changeover button. Reference symbol H denotes the mobile changeover button. Reference symbol F denotes the phone call start button in the mobile screen image. Reference symbol G denotes the phone call end button in the mobile screen image. The uniquely generated screen image may sequentially display the H/F changeover buttons one after another corresponding to the mobile phones 1 each time manipulation onto the area for the mobile changeover button is detected.

According to the embodiment, the manipulatory input portion 25 accepts user's manipulation input to control changeover between the handsfree phone call and the handset phone call. The manipulatory input portion 25 is available as the touch switch (generated from an H/F changeover button image) that is integrated with an image displayed on the vehicular display portion 24. However, the configuration is not limited thereto.

For example, the manipulatory input portion 25 to accept the manipulation input may be available as a mechanical switch. Moreover, the manipulatory input portion 25 to accept the manipulation input may be available as a known voice recognition apparatus that accepts manipulation input by recognizing voice commands uttered from a user. Furthermore, the manipulatory input portion 25 to accept the manipulation input may be available as a known apparatus such as a proximity switch or a camera using a capacitance panel that detects user's specific gesture manipulation. The mechanical switch, the voice recognition apparatus, the proximity switch, or the camera described above is also referred to as a manipulation input apparatus.

The above-mentioned configuration can accept user's manipulation input to enable the handsfree phone call without displaying the H/F changeover button on the vehicular display portion 24. The display area of the vehicular display portion 24 can be allocated to display of the mobile screen image to the maximum.

According to the embodiment, the handsfree phone call and the handset phone call can alternate each time the H/F changeover button is manipulated. However, the configuration is not limited thereto. For example, manipulating the H/F changeover button may enable only changeover to the handsfree phone call from the handset phone call. In this case, ending the phone call may terminate the handsfree phone call protocol.

The uniquely generated screen image may display a phone call start button whose icon is designed differently from the H/F changeover button. The phone call start button may just enable changeover to the handsfree phone call from the handset phone call. The phone call start button may be displayed instead of the H/F changeover button that alternates the handsfree phone call and the handset phone call. The phone call start button may be displayed simultaneously with the H/F changeover button. Moreover, the phone call start button may have the same function as the H/F changeover button may only use a differently designed icon.

Third Embodiment

The following describes a third embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the third embodiment includes the mobile phone 1 and the vehicular apparatus 2. The third embodiment equals the first embodiment except differences in the processes of the control circuit 29 in the vehicular apparatus 2.

Specifically, the control circuit 29 (hereinafter referred to as a control circuit 29b for convenience sake) according to the third embodiment may be supplied with mobile-generated image data received from the mobile phone 1 via the vehicular communication portion 23. In such a case, the control circuit 29b generates an image according to the mobile-generated image data, outputs the image to the vehicular display portion 24, and displays a mobile screen image according to the mobile-generated image data on at least part of an area in the vehicular display portion 24.

When the connected mobile phone 1 enters an incoming call state, the control circuit 29b changes the display to the mobile screen image and allows the vehicular display portion 24 to display a uniquely generated screen image uniquely generated in the vehicular apparatus 2 itself. The control circuit 29b allows the uniquely generated screen image to display also a button icon (hereinafter referred to as an H/F changeover button) that enables changeover to the handsfree phone call.

Figure 15:
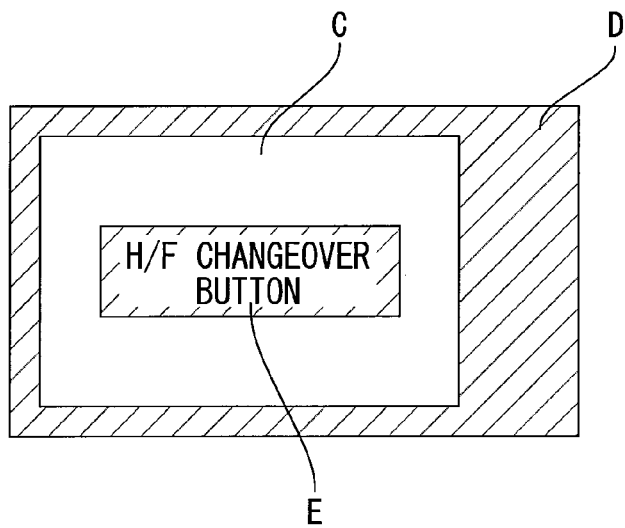
FIG. 15 is a schematic diagram illustrating display of an H/F changeover button.

As illustrated in FIG. 15, the uniquely generated screen image may transparently display the mobile screen image other than the area that displays the H/F changeover button. In FIG. 15, reference symbol C denotes the mobile screen image. Reference symbol D denotes the uniquely generated screen image. Reference symbol E denotes the H/F changeover button. Similarly to the first embodiment, the H/F changeover button may be designed differently from or similarly to the phone call start button on the mobile screen image.

The control circuit 29b may detect an incoming call state of the mobile phone 1 when receiving the above-mentioned incoming call state notification from the mobile phone 1. Therefore, the control circuit 29b is also referred to as a vehicle-generated screen display section or means and an incoming call state detection section or means.

Similarly to the handsfree phone call changeover process according to the first and second embodiments, the control circuit 29b determines whether the H/F changeover button on the uniquely generated screen image is manipulated. The control circuit 29b starts the handsfree phone call when determining that the H/F changeover button is manipulated. Therefore, the control circuit 29b is also referred to as a handsfree changeover manipulation detection section or means. The uniquely generated screen image containing the H/F changeover button is also referred to as a handsfree changeover screen image.

Figure 11:
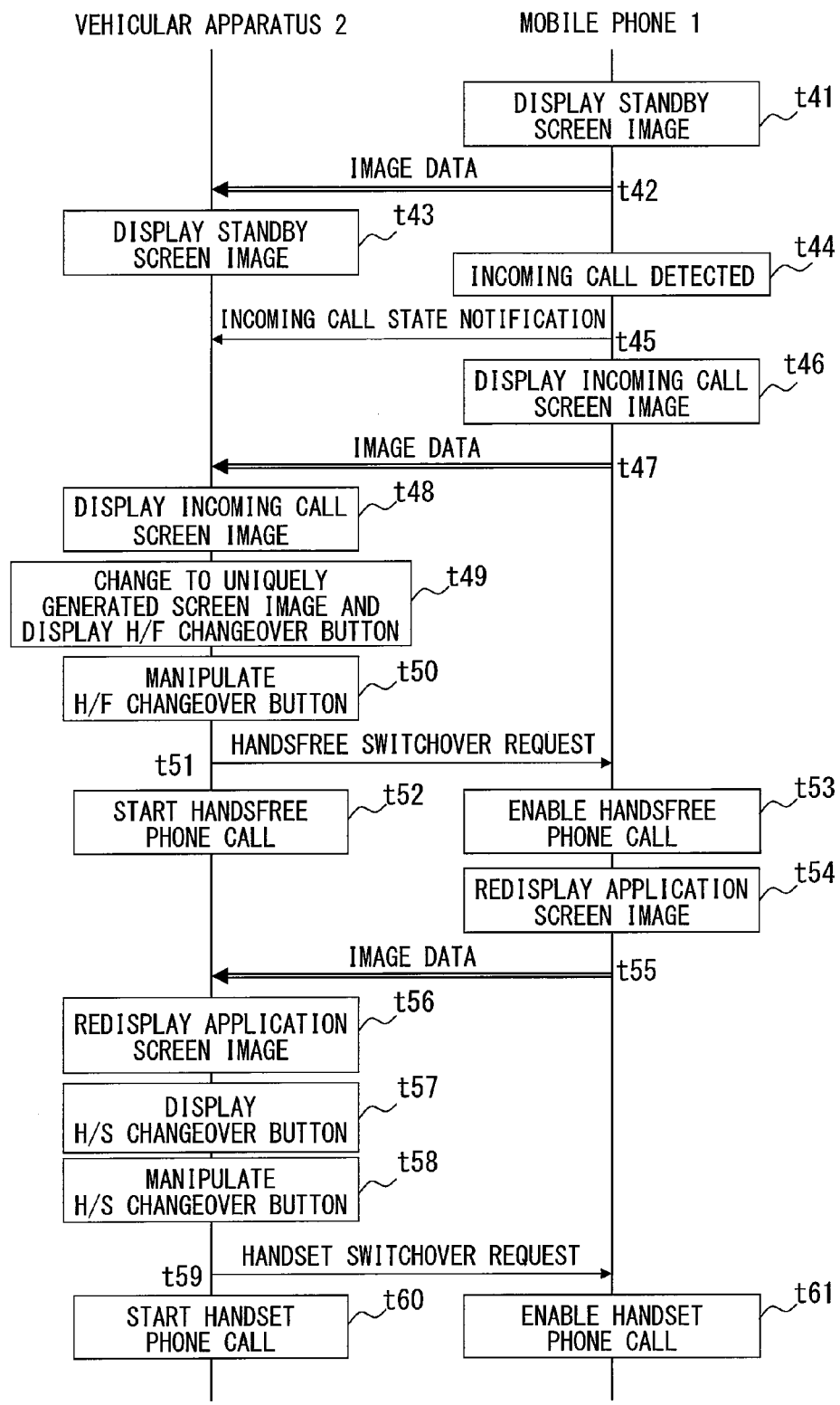
FIG. 11 is a sequence diagram according to a third embodiment illustrating information exchange between a mobile phone and a vehicular apparatus at the time of receiving an incoming call on the mobile phone from changeover to handsfree phone call to changeover to handset phone call.

With reference to FIG. 11, the following describes information exchange between the mobile phone 1 and the vehicular apparatus 2 from changeover to handsfree phone call at the time of receiving an incoming call on the mobile phone 1 to changeover to handset phone call. In FIG. 11, an arrow illustrates an information flow during the BT communication. A double arrow illustrates an information flow during the USB communication.

The description below assumes that the H/F changeover button and an H/S changeover button (to be described) displayed on the vehicular touch panel are manipulated. The description below also assumes that in cases that the mobile phone 1 is displaying a screen image (hereinafter referred to as an application screen image) according to applications other than an application related to the phone call function at the time of receiving an incoming call, the incoming call screen image returns to the application screen image after the phone call starts. The application screen image may represent a map screen image used for the navigation function, for example.

The touch panel portion 16 of the mobile phone 1 displays the application screen image (t41). The mobile phone 1 transmits image data for the application screen image to the vehicular apparatus 2 according to the USB communication (t42). Based on the image data, the vehicular apparatus 2 uses the vehicular touch panel to display an application screen image similar to that displayed on the touch panel portion 16 of the mobile phone 1 (t43).

There is an incoming call on the mobile phone 1 (t44). The mobile phone 1 transmits an incoming call state notification to the vehicular apparatus 2 according to the BT communication (t45). When there is an incoming call on the mobile phone 1, the touch panel portion 16 of the mobile phone 1 displays the incoming call screen image (t46). The mobile phone 1 transmits image data for the incoming call screen image to the vehicular apparatus 2 according to the USB communication (t47).

Based on the image data, the vehicular apparatus 2 uses the vehicular touch panel to display an incoming call screen image similar to that displayed on the touch panel portion 16 of the mobile phone 1 (t48). Further, when receiving the incoming call state notification, the vehicular apparatus 2 changes the incoming call screen image (i.e., the mobile screen image) to the uniquely generated screen image containing the H/F changeover button (t49).

Figure 12:
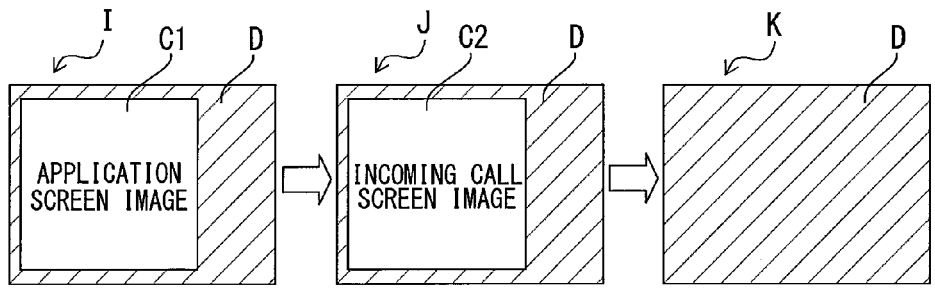
FIG. 12 is a schematic diagram illustrating changing displays on the vehicular touch panel.

With reference to FIG. 12, the following describes examples of changing displays on the vehicular touch panel. In FIG. 12, reference symbol C1 denotes an application screen image as the mobile screen image. Reference symbol C2 denotes an incoming call screen image as the mobile screen image. Reference symbol D denotes the uniquely generated screen image. Reference symbols I, J, and K denote display areas of the vehicular touch panel. The following description assumes an example of displaying the uniquely generated screen image around the mobile screen image while the mobile screen image is displayed.

The mobile phone 1 may not receive an incoming call and display the application screen image. In this case, as illustrated by I in FIG. 12, the vehicular touch panel of the vehicular apparatus 2 also displays the application screen image. The mobile phone 1 may receive an incoming call and display the incoming call screen image. In this case, as illustrated by 3 in FIG. 12, the vehicular touch panel of the vehicular apparatus 2 also displays the incoming call screen image. When receiving an incoming call state notification, the vehicular apparatus 2 changes the incoming call screen image to the uniquely generated screen image (hereinafter referred to as a handsfree changeover screen image) containing the H/F changeover button to display the handsfree changeover screen image all over the vehicular touch panel (see K in FIG. 12).

Returning to FIG. 11, the user manipulates the H/F changeover button in the handsfree changeover screen image (t50). The mobile phone 1 transmits a handsfree changeover request to the vehicular apparatus 2 according to the BT communication (t51). The handsfree phone call profile is used to connect with the mobile phone 1. The vehicular apparatus 2 changes to the handsfree phone call (t52). The mobile phone 1 receives the handsfree changeover request and changes to the handsfree phone call (t53). Therefore, the control circuit 29b is also referred to as a vehicular phone call changeover section or means.

When the handsfree phone call starts, the mobile phone 1 redisplays the screen image (i.e., the application screen image) for an application that was active at the time of receiving an incoming call (t54). The mobile phone 1 transmits image data for the application screen image to the vehicular apparatus 2 according to the USB communication (t55). Based on the image data, the vehicular apparatus 2 uses the vehicular touch panel to display an application screen image similar to that displayed on the touch panel portion 16 of the mobile phone 1 to redisplay the application screen image (t56). Therefore, the control circuit 29b is also referred to as a mobile screen image changeover section or means.

Returning the display to the application screen image can operate any application other than the phone call even if the handsfree phone call is in progress.

At t54, an automatic or manual procedure allows the mobile phone 1 to close the incoming call screen image and restart the application screen image. According to the automatic procedure, the mobile phone 1 receives a phone call start request or a handsfree changeover request from the vehicular apparatus 2 and thereby automatically closes the incoming call screen image and restarts the application screen image. According to the manual procedure, the user manipulates the touch panel portion 16 of the mobile phone 1 to close the incoming call screen image and restart the application screen image.

The vehicular apparatus 2 displays a button icon (hereinafter referred to as an H/S changeover button) to enable changeover to the handset phone call so as to be superimposed on the redisplayed application screen image. Specifically, the control circuit 29b generates an image for the H/S changeover button and displays it superimposed on the application screen image. Therefore, the control circuit 29b is also referred to as a superimposition display section or means.

As described above, the H/S changeover button is displayed to be superimposed on the redisplayed application screen image. However, the configuration is not limited thereto. The H/S changeover button may be displayed in the uniquely generated screen image displayed around the application screen image. The handsfree changeover screen image may not change to the application screen image when the handsfree phone call starts. In such a case, the H/S changeover button may be displayed in the handsfree changeover screen image.

The displayed H/S changeover button is manipulated on the vehicular apparatus 2 (t58). The vehicular apparatus 2 transmits a handset changeover request to the mobile phone 1 according to the BT communication (t59). The control circuit 29b of the vehicular apparatus 2 determines whether the area to display the H/S changeover button matches the manipulation area specified based on the position information supplied from the manipulatory input portion 25. If a match is determined, the control circuit 29b detects that the H/S changeover button is manipulated. Therefore, the control circuit 29b is also referred to as a handset changeover manipulation detection section or means.

The handsfree phone call profile then terminates. The vehicular apparatus 2 changes to the handset phone call (t60). The mobile phone 1 receives the handset changeover request and changes to the handset phone call (t61).

According to the example in FIG. 11, the handsfree changeover screen image is displayed instead of the mobile screen image when the control circuit 29b detects the incoming call state on the mobile phone. However, the configuration is not limited thereto. The handsfree changeover screen image may be displayed instead of the mobile screen image when the control circuit 29b detects the phone call state, for example. The control circuit 29b may detect the phone call state of the mobile phone 1 based on reception of a phone call state notification from the mobile phone 1. Therefore, the control circuit 29b is also referred to as a phone call state detection section or means.

The mobile screen image changes to the uniquely generated screen image when an incoming call is received or a phone call is started. The uniquely generated screen image contains the H/F changeover button that is unique to the vehicular apparatus 2 and is unavailable for the mobile screen image. The need for changeover to the handsfree phone call can be easily determined when the manipulatory input portion 25 detects touch manipulation onto the area that is contained in the uniquely generated screen image and displays the H/F changeover button. The configuration according to the embodiment also allows the vehicular apparatus 2 to determine the need for changeover to the handsfree phone call and enable the handsfree phone call.

According to the embodiment, manipulating the H/S changeover button displayed on the vehicular display portion 24 can change the handsfree phone call, if enabled, to the handset phone call. The handsfree phone call can be easily canceled even if the handsfree phone call is enabled despite the user's intention.

The vehicular apparatus 2 may be able to communicate with multiple mobile phones 1 using a handsfree communication procedure that enables handsfree phone call with the mobile phones 1. In such a case, the following configuration may be available. Examples in the description below assume that the mobile phone 1 and the vehicular apparatus 2 use the BT communication to exchange information about control on changeover to the handsfree phone call as well as image data and the position information during the terminal mode connection.

The vehicular apparatus 2 and the multiple mobile phones 1 are assumed to establish multipoint connection that simultaneously enables connection to multiple instruments using the same profile. The control circuit 29b is assumed to register information (e.g., instrument ID) for identifying each mobile phone 1 and model information about each mobile phone 1 during pairing process between the vehicular apparatus 2 and each of the mobile phones 1. The control circuit 29b may register a user name of the mobile phone 1 instead of the model information.

For example, the control circuit 29b may detect the incoming call state or the phone call state of the mobile phone 1 (connected in the terminal mode) whose mobile screen image is displayed in the vehicular display portion 24. Only in such a case, the display may change to the handsfree changeover screen image. The control circuit 29b may specify the mobile phones 1 and signals (provided with instrument IDs) transmitted from the mobile phones 1 based on the instrument IDs registered during the pairing process.

As described above, the mobile phone 1 connected in the terminal mode is highly likely used for a vehicle driver. The above-mentioned configuration can restrict the handsfree phone call (i) using the mobile phone 1 other than the mobile phone 1 highly likely used for the vehicle driver or (ii) using the driver's mobile phone 1 not connected in the terminal mode.

The control circuit 29b may detect the incoming call state or the phone call state of the mobile phone 1 not connected in the terminal mode. In such a case, the control circuit 29b may specify the mobile phone 1 and display the model name or the user name of the mobile phone 1 superimposed on the mobile screen image or display them in the uniquely generated screen image.

The control circuit 29b may specify the mobile phones 1 based on instrument IDs registered during the pairing process as described above. Therefore, the control circuit 29b is also referred to as a specification section or means. The model name or the user name of the mobile phone 1 may correspond to that registered during the pairing process. Instead of the visual notification, the control circuit 29b may allow the vehicular sound output portion 27 to generate sound for notification. Therefore, the control circuit 29b is also referred to as a notification section or means.

The control circuit 29b may change the display to the uniquely generated screen image containing the H/F changeover button for the multipoint-connected mobile phones 1 whose mobile screen images are not displayed on the vehicular display portion 24 (not connected in the terminal mode). The control circuit 29a may specify the mobile phones 1 based on instrument IDs registered during the pairing process.

The handsfree phone call is available even for (i) the mobile phone 1 other than the mobile phone 1 highly likely used for the vehicle driver or (ii) the driver's mobile phone 1 whose mobile screen image is not displayed on the vehicular display portion 24.

According to the embodiment, the control circuit 29b changes the display to the handsfree changeover screen image from the mobile screen image when detecting that the connected mobile phone 1 enters the incoming call state or the phone call state. However, the configuration is not limited thereto. For example, the control circuit 29b may display the handsfree changeover screen image superimposed on the mobile screen image (second modification) when detecting that the connected mobile phone 1 enters the incoming call state or the phone call state.

According to the second modification, the control circuit 29b generates the uniquely generated screen image (i.e., the handsfree changeover screen image) containing the H/F changeover button and displays the handsfree changeover screen image superimposed on the mobile screen image when detecting that the connected mobile phone 1 enters the incoming call state or the phone call state. It is favorable to use a so-called pop-up display that displays the handsfree changeover screen image superimposed on part of the mobile screen image. This can simultaneously display the mobile screen image and the handsfree changeover screen image on the vehicular display portion 24.

The second modification is configured similarly to the third embodiment except that the handsfree changeover screen image is displayed superimposed on the mobile screen image instead of changing the display from the mobile screen image to the handsfree changeover screen image.

The control circuit 29b allows the user's manipulation onto the handsfree changeover screen image to move, enlarge, or reduce the handsfree changeover screen image to be displayed superimposed on part of the mobile screen image. For example, the control circuit 29b may detect slide manipulation onto the handsfree changeover screen image. The slide manipulation signifies that the user touches the handsfree changeover screen image and, while keeping the same touched, slides the touched position. In such a case, the control circuit 29b moves the handsfree changeover screen image in the direction of the slide manipulation. The control circuit 29b detects the slide manipulation via the manipulatory input portion 25.

Further, the control circuit 29b reduces the handsfree changeover screen image when detecting pinch-in manipulation onto the handsfree changeover screen image. The pinch-in manipulation signifies that the user touches two positions on the handsfree changeover screen image and, while keeping the positions touched, slides the touched positions to decrease the distance between them. The control circuit 29b enlarges the handsfree changeover screen image when detecting pinch-out manipulation onto the handsfree changeover screen image. The pinch-out manipulation signifies that the user touches two positions on the handsfree changeover screen image and, while keeping the positions touched, slides the touched positions to increase the distance between them.

The control circuit 29b detects the pinch-in manipulation and the pinch-out manipulation via the manipulatory input portion 25.

The handsfree changeover screen image can be moved to any positions on the display area of the vehicular display portion 24 or can be reduced. The mobile screen image visibility can be thereby improved.

Fourth Embodiment

The following describes a fourth embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the fourth embodiment includes the mobile phone 1 and the vehicular apparatus 2. The fourth embodiment equals the first embodiment except differences in the processes of the control circuit 29 in the vehicular apparatus 2.

Specifically, the control circuit 29 (hereinafter referred to as a control circuit 29c for convenience sake) according to the fourth embodiment inquires of the user whether to change to the handsfree phone call when the connected mobile phone 1 enters a phone call state. The control circuit 29b enables the handsfree phone call when the manipulatory input portion 25 accepts manipulation input (hereinafter referred to as changeover instruction manipulation input) that instructs the need for changeover.

The control circuit 29c performs the process regardless of whether the phone call state results from manipulation of the phone call start button displayed in the touch panel portion 16 of the mobile phone 1 or from manipulation of the phone call start button in the vehicular touch panel.

The control circuit 29c may detect the phone call state of the mobile phone 1 when receiving the above-mentioned phone call state notification from the mobile phone 1. Therefore, the control circuit 29c is also referred to as a phone call state detection section or means. The control circuit 29c may inquire the need for changeover to the handsfree phone call using the display on the vehicular touch panel or sound output from the vehicular sound output portion 27.

The manipulatory input portion 25 may be available as a touch switch to accept changeover instruction manipulation input using the touch manipulation or as a voice recognition apparatus to accept changeover instruction manipulation input using a sound command.

Figure 13:
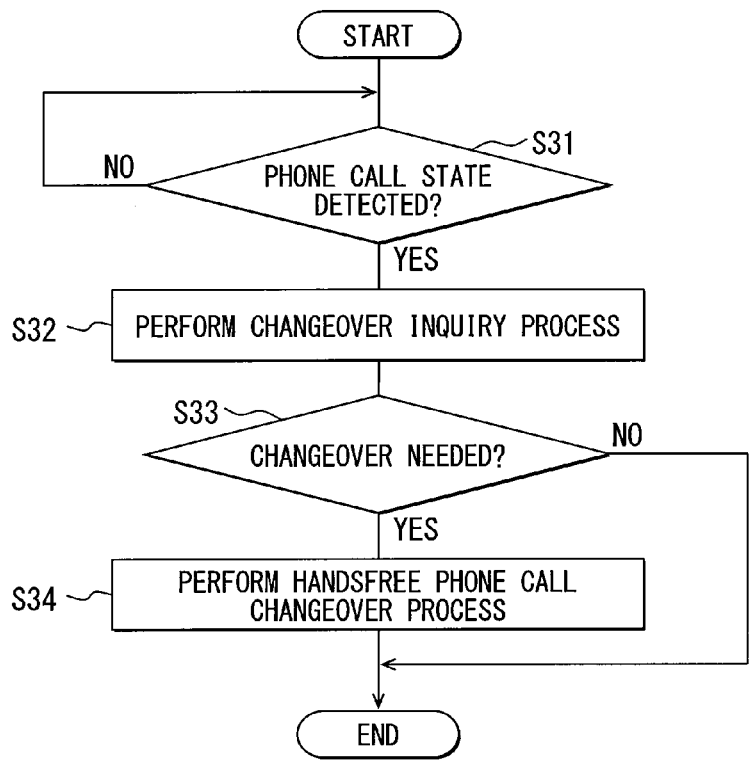
FIG. 13 is a flowchart illustrating a flow of the handsfree phone call changeover process in a control circuit according to a fourth embodiment.

The control circuit 29c performs a process (hereinafter referred to as a handsfree phone call changeover process) related to control on changeover to the handsfree phone call. The following describes a flow of the handsfree phone call changeover process in the control circuit 29c with reference to FIG. 13. FIG. 13 is a flowchart illustrating a flow of the handsfree phone call changeover process in the control circuit 29c. The process flow starts when the vehicular apparatus 2 connects with the mobile phone 1 in the terminal mode.

At step S31, the control circuit 29c may receive a phone call state notification from the mobile phone 1 connected in the terminal mode and may determine that the phone call state is detected (YES at step S31). In this case, the control circuit 29c proceeds to step S32. Alternatively, the control circuit 29c may not receive a phone call state notification from the mobile phone 1 connected in the terminal mode and may determine that the phone call state is not detected (NO at step S31). In this case, the control circuit 29c repeats the process flow at step S31.

At step S32, the control circuit 29c performs a changeover inquiry process and proceeds to step S33. The changeover inquiry process inquires of the user whether to change to the handsfree phone call. For example, two buttons are used to select the need for changeover to the handsfree phone call and are displayed superimposed on the mobile screen image of the vehicular touch panel. The two buttons are represented as "enable button" to enable the changeover and "disable button" to disable the changeover, for example. These buttons may be displayed in the uniquely generated screen image uniquely generated in the vehicular apparatus 2 itself.

At step S33, the control circuit 29c determines whether to change to the handsfree phone call. For example, the control circuit 29c determines that the changeover is needed when the manipulatory input portion 25 detects touch manipulation onto the area to display the "enable button." The control circuit 29c determines that the changeover is unneeded when the manipulatory input portion 25 detects touch manipulation onto the area to display the "disable button." The control circuit 29c may determine that the changeover is needed (YES at step S33). In this case, the control circuit 29c proceeds to step S34. The control circuit 29c may determine that the changeover is unneeded (NO at step S33). In this case, the control circuit 29c terminates the process flow.

At step S34, the control circuit 29c performs a handsfree phone call changeover process and terminates the process flow. The handsfree phone call changeover process allows the BT communication portion 21 to transmit a handsfree changeover request to the mobile phone 1 to request changeover to the handsfree phone call. The handsfree phone call profile is used to connect to the mobile phone 1. The vehicular apparatus 2 starts the handsfree phone call. Therefore, the control circuit 29c is also referred to as a vehicular phone call changeover section or means.

The vehicular apparatus 2 may be able to communicate with multiple mobile phones 1 using a handsfree communication procedure that enables handsfree phone call with the mobile phones 1. In such a case, the following configuration may be available. Examples in the description below assume that the mobile phone 1 and the vehicular apparatus 2 use the BT communication to exchange information about control on changeover to the handsfree phone call as well as image data and the position information during the terminal mode connection.

The vehicular apparatus 2 and the multiple mobile phones 1 are assumed to establish multipoint connection that simultaneously enables connection to multiple instruments using the same profile. The control circuit 29c is assumed to register information (e.g., instrument ID) for identifying each mobile phone 1 and model information about each mobile phone 1 during pairing process between the vehicular apparatus 2 and each of the mobile phones 1. The control circuit 29c may register a user name of the mobile phone 1 instead of the model information.

For example, the control circuit 29c may detect the phone call state of the mobile phone 1 (connected in the terminal mode) whose mobile screen image is displayed in the vehicular display portion 24. Only in such a case, the display may change to the handsfree changeover screen image. The control circuit 29c may specify the mobile phones 1 and signals (provided with instrument IDs) transmitted from the mobile phones 1 based on the instrument IDs registered during the pairing process.

Specifically, the control circuit 29c inquires the need for the handsfree phone call only when detecting that the mobile phone 1 connected in the terminal mode enters a phone call state. The control circuit 29c starts the handsfree phone call on the mobile phone 1 connected in the terminal mode when accepting manipulation input that instructs the need for the changeover. The control circuit 29c may detect that the mobile phone 1 not connected in the terminal mode enters a phone call state. The control circuit 29c disallows handsfree phone call on that mobile phone 1.

As described above, the mobile phone 1 connected in the terminal mode is highly likely used for a vehicle driver. The above-mentioned configuration can restrict the handsfree phone call (i) using the mobile phone 1 other than the mobile phone 1 highly likely used for the vehicle driver or (ii) using the driver's mobile phone 1 not connected in the terminal mode.

The control circuit 29c may enable the handsfree phone call for the multipoint-connected mobile phones 1 whose mobile screen images are not displayed on the vehicular display portion 24 (not connected in the terminal mode). The control circuit 29c may specify the mobile phones 1 based on instrument IDs registered during the pairing process.

Specifically, the control circuit 29c inquires the need for the handsfree phone call also when detecting that the mobile phone 1 not connected in the terminal mode enters a phone call state. The control circuit 29c starts the handsfree phone call on the mobile phone 1 whose phone call state is detected when the manipulatory input portion 25 accepts manipulation input that instructs the need for the changeover.

Similarly to the above-mentioned configuration, the control circuit 29c may inquire the need for handsfree phone call and accepts manipulation input that instructs the need for the changeover. Therefore, the control circuit 29c is also referred to as an inquiry section or means. The manipulatory input portion 25 is also referred to as an instruction acceptance portion.

The handsfree phone call is available even for (i) the mobile phone 1 other than the mobile phone 1 highly likely used for the vehicle driver or (ii) the driver's mobile phone 1 whose mobile screen image is not displayed on the vehicular display portion 24.

If the handsfree phone call starts, the screen of the vehicular touch panel may display a button icon (hereinafter referred to as an H/S changeover button) superimposed to specify the changeover to the handset phone call. Manipulating the H/S changeover button may change the handsfree phone call to the handset phone call.

According to the embodiment, the control circuit 29c inquires of the user whether to change to the handsfree phone call when the connected mobile phone 1 enters a phone call state. However, the configuration is not limited thereto. When the connected mobile phone 1 enters a phone call state, for example, the control circuit 29c may automatically start the handsfree phone call on the mobile phone 1 without inquiring of the user whether to change to the handsfree phone call.

The embodiment may predetermine responsive action to be taken when the connected mobile phone 1 enters a phone call state. Setting of the responsive action may follow manipulation input from the user via the manipulatory input portion 25, for example.

For example, the setting may automatically change to the handsfree phone call without manipulating the H/F changeover button that causes the control circuit 29c to allow the vehicular display to display a screen image prompting the user to determine whether to start the handsfree phone call.

Alternatively, manipulating the H/F changeover button may cause the control circuit 29c to allow the vehicular display to display a screen image prompting the user to determine whether to start the handsfree phone call. The handsfree phone call may be enabled automatically when accepting manipulation input from the user requesting changeover to the handsfree phone call. A control circuit 29c may accept manipulation input from the user requesting changeover to the handsfree phone call via the manipulatory input portion 25, for example.

Fifth Embodiment

According to the first through fourth embodiments, the vehicular apparatus 2 determines the need for changeover to the handsfree phone call and enables the handsfree phone call. However, the configuration is not limited thereto. As will be described in a fifth embodiment, for example, the mobile phone 1 may determine the need for changeover to the handsfree phone call and perform changeover to the handsfree phone call.

The following describes the fifth embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the fifth embodiment includes the mobile phone 1 and the vehicular apparatus 2. The fifth embodiment equals the first embodiment except differences in the processes of the control circuit 29 in the vehicular apparatus 2 and the processes of the main controller 19 in the mobile phone 1.

Specifically, the control circuit 29 (hereinafter referred to as a control circuit 29d for convenience sake) according to the fifth embodiment does not perform the phone call start button manipulation determination process. When the phone call start button on the mobile screen image of the vehicular touch panel is manipulated, the control circuit 29d transmits a signal indicating coordinates of a manipulation target area corresponding to the manipulated position to the mobile phone 1.

Figure 14:
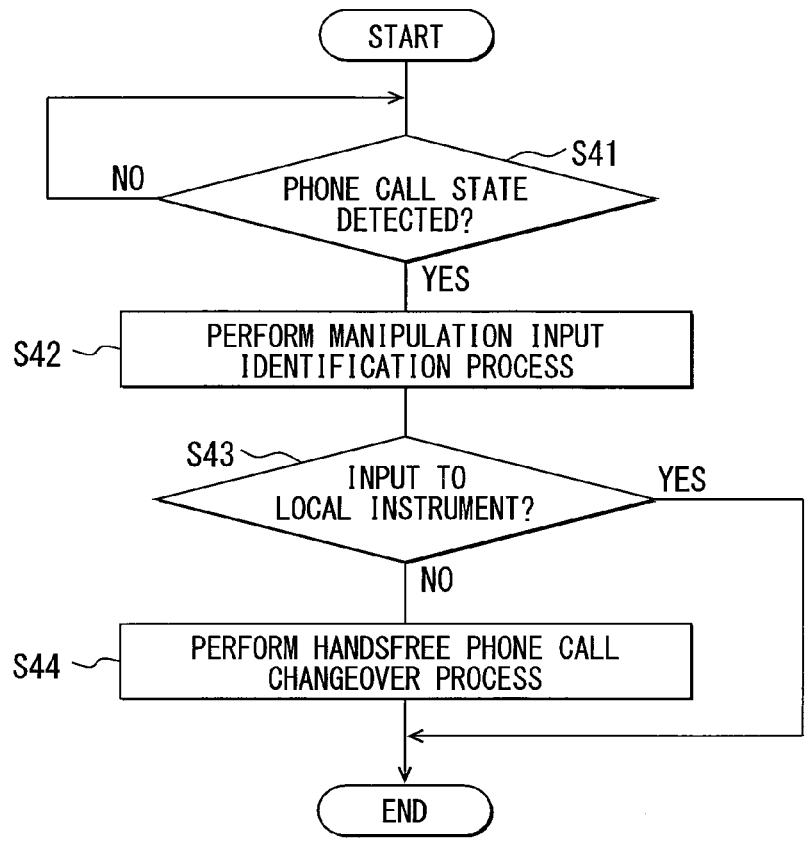
FIG. 14 is a flowchart illustrating a flow of the handsfree phone call changeover process in a main controller according to a fifth embodiment.

The main controller 19 (hereinafter referred to as a main controller 19a for convenience sake) according to the fifth embodiment performs a process (hereinafter referred to as a handsfree phone call changeover process) related to control on changeover to the handsfree phone call. The following describes a flow of the handsfree phone call changeover process in the main controller 19a with reference to FIG. 14. FIG. 14 is a flowchart illustrating a flow of the handsfree phone call changeover process in the main controller 19a. The process flow starts when the mobile phone 1 connects with the vehicular apparatus 2 in the terminal mode.

At step S41, the mobile phone may enter a phone call state (YES at step S41). In this case, the main controller 19a proceeds to step S42. The mobile phone may not enter a phone call state (NO at step S41). In this case, the main controller 19a repeats the process flow at step S41.

At step S42, the main controller 19a performs a manipulation input identification process and proceeds to step S43. The manipulation input identification process identifies whether the phone call state results from user's manipulation input onto the mobile phone 1 itself (local instrument) or user's press manipulation onto the vehicular display portion 24 of the vehicular apparatus 2. Therefore, the main controller 19a is also referred to as an identification section or means.

Specifically, position information (corresponding to the position to detect the manipulation), which is used to determine manipulation of the phone call start button in the screen of the touch panel portion 16, may be input from the manipulation detection portion 15. In this case, the main controller 19a identifies that the phone call state results from the user's manipulation input onto the mobile phone 1 itself. On the other hand, position information (input from the vehicular apparatus 2) may be input from the mobile communication portion 13 (e.g., the USB communication portion 12). In this case, the main controller 19a identifies that the phone call state results from the user's press manipulation onto the vehicular display portion 24 of the vehicular apparatus 2.

At step S43, the main controller 19a may identity that the phone call state results from user's manipulation input (i.e., local instrument input (input in mobile phone itself)) on the mobile phone 1 itself (YES at step S43). In this case, the main controller 19a terminates the process flow. The main controller 19a may identity that the phone call state results from user's press manipulation onto the vehicular display portion 24 of the vehicular apparatus 2 (NO at step S43). In this case, the main controller 19a returns to step S44.

At step S44, the main controller 19a performs the handsfree phone call changeover process and terminates the process flow. During the handsfree phone call changeover process, the BT communication portion 11 transmits a handsfree changeover request for changeover to the handsfree phone call to the vehicular apparatus 2. The mobile phone 1 starts the handsfree phone call. Therefore, the main controller 19a is also referred to as a mobile phone call changeover section or means. The vehicular apparatus 2 receives the handsfree changeover request and starts the handsfree phone call according to the request.

The control circuit 29a, 29b, or 29c may terminate the handsfree phone call protocol and then change the handsfree phone call to the handset phone call. The control circuit 29a, 29b, or 29c may change the handsfree phone call to the handset phone call by changing a sound input/output path (sound path) without terminating the handsfree phone call protocol.

Specifically, sound paths are changed as follows without terminating the handsfree phone call protocol. A physical switch such as a switch circuit changes a path transmitting sound data to a path not transmitting sound data. The path transmitting sound data transmits the sound data supplied to the vehicular sound input portion 26 to the mobile phone 1. A physical switch such as a switch circuit changes a path outputting sound data to a path not outputting sound data. The path outputting sound data allows the vehicular sound output portion 27 to output the sound data received from the mobile phone 1. In this manner, the sound path for exchanging sound data between the public line and the vehicular apparatus 2 via the mobile phone 1 is changed to the sound path for exchanging sound data between the mobile phone 1 and the public line. That is, the changed sound path transmits sound data supplied to the mobile sound input portion 17 to the public line and allows the mobile sound output portion 18 to output the sound data received from the public line.

At step S44, the main controller 19a may transmit a phone call sound data signal without transmitting a handsfree changeover request to the vehicular apparatus 2 from the mobile phone 1. In this case, the vehicular apparatus 2 (specifically the control circuit 29) may start the handsfree phone call based on reception of the phone call sound data signal (phone call sound data).

Sixth Embodiment

The first embodiment assumes the start of phone call within a specified time from touch manipulation onto the vehicular touch panel to be the determination condition to enable the handsfree phone call. The following embodiment (hereinafter referred to as the sixth embodiment) may use a determination condition that determines whether phone call sound data is received from the mobile phone 1.

The following describes a sixth embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the sixth embodiment includes the mobile phone 1 and the vehicular apparatus 2. The sixth embodiment equals the first embodiment except partial differences in the handsfree phone call changeover process of the control circuit 29 in the vehicular apparatus 2.

Figure 16:
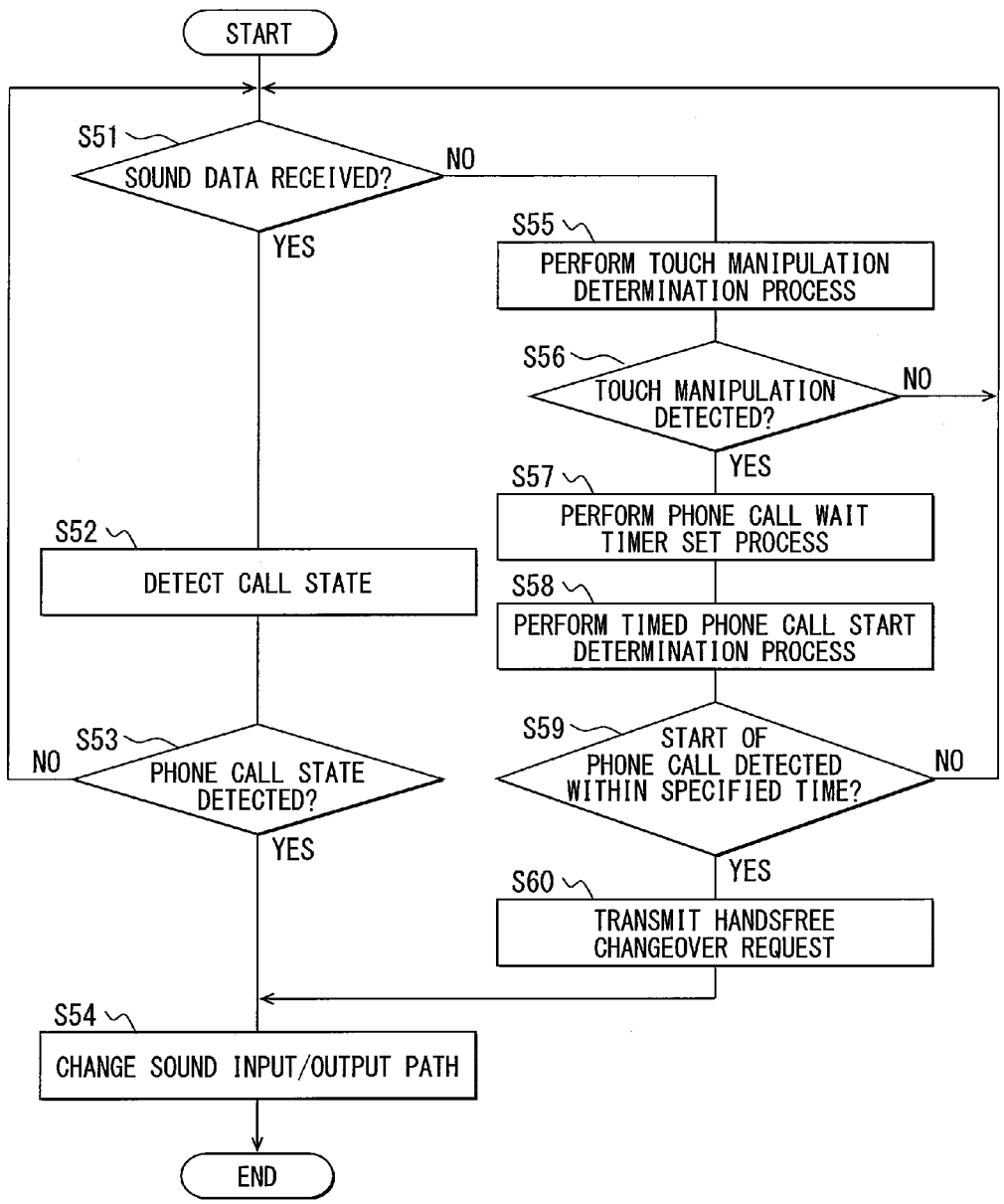
FIG. 16 is a flowchart illustrating a flow of the handsfree phone call changeover process in a control circuit according to a sixth embodiment.

The following describes the handsfree phone call changeover process in the control circuit 29 (hereinafter referred to as the control circuit 29d for convenience sake) according to the sixth embodiment with reference to the flowchart in FIG. 16. The process flow starts when the vehicular apparatus 2 connects with the mobile phone 1 in the terminal mode, for example.

At step S51, the control circuit 29d determines whether sound data is received from the mobile phone 1. Reception of sound data may be determined by determining whether the control circuit 29d is supplied with sound data the vehicular communication portion 23 received from the mobile phone 1. The control circuit 29d proceeds to step S51 when determining that sound data is received (YES at step S51). The control circuit 29d proceeds to step S55 when determining that sound data is not received (NO at step S51).

At step S52, the control circuit 29d detects a call state of the mobile phone 1 to determine whether the sound data received from the mobile phone 1 is equal to phone call sound data. The control circuit 29d then proceeds to step S53. The call state signifies the state of call control provided by the mobile phone.

The control circuit 29d may detect the call state of the mobile phone 1 using the handsfree phone call profile (HFP) for BT communication. Changing the call state of the mobile phone 1 may allow the mobile phone 1 to automatically notify the call state. In such a case, the control circuit 29d may detect the call state of the mobile phone 1 based on the call state notified from the mobile phone 1.

HFP provides AT commands +CIEV to confirm call states of mobile phones. Identifying the commands makes it possible to detect the call states such as call termination (incoming call, incoming call acceptance), call origination (outgoing call acceptance), calling (calling notification, calling in process), phone call in process (busy) (communication in process), line disconnection (disconnection request, disconnection notification), and standby (so-called "idle" state) (see JP 2007-143119 A).

Another example procedure of detecting call states of the mobile phone 1 is to use attribute data concerning image data received from the mobile phone 1. For example, the attribute data includes an application ID, version, screen type, screen title, and image size. The attribute data may be acquired simultaneously with reception of image data. In such a case, call states may be determined based on a screen title that may contain text concerning call states such as call origination, calling, and call termination, for example.

The above-mentioned call states may be used to detect phone call states or incoming call states according to the above-mentioned embodiments and embodiments to be described later.

If the phone call state is detected at step S53 (YES at step S53), the control circuit 29d determines that the sound data received from the mobile phone 1 is phone call sound data.

The control circuit 29d proceeds to step S54. If the phone call state is not detected (NO at step S53), the control circuit 29d determines that the sound data received from the mobile phone 1 is not phone call sound data. The control circuit 29d returns to step S51 and repeats the process flow.

At step S54, the control circuit 29d changes an input/output path (sound input/output path) for the speaker (i.e., vehicular sound output portion 27) or the microphone (i.e., vehicular sound input portion 26) of the vehicular apparatus 2. The control circuit 29d thereby changes the use of the speaker or the microphone of the vehicular apparatus 2 to the use for the handsfree phone call from the use not for the handsfree phone call such as navigation, audio, or voice recognition.

At step S51, the control circuit 29d may receive the sound data from the mobile phone 1 using the handsfree phone call profile (HFP) for BT communication. In this case, it is obvious according to the BT standard that the sound data communicated based on the HFP is phone call sound data. This is because a profile such as A2DP other than the HFP is generally used to communicate sound data such as music data other than the phone call sound data. If the HFP is used to receive sound data from the mobile phone, the control circuit 29d may omit the process at step S52 and step S53 and proceed to the process at step S54 to perform the handsfree phone call.

If the control circuit 29d determines at step S51 that sound data is not received, the process from step S55 to step S59 equals the process at step S1 and step S2 and from step S5 to step S7 according to the first embodiment.

To summarize the process, the control circuit 29d performs the touch manipulation determination process at step S55 and proceeds to step S56. If the touch manipulation is detected at step S56 (YES at step S56), the control circuit 29d proceeds to step S57. If no touch manipulation is detected at step S56 (NO at step S56), the control circuit 29d returns to step S51 and repeats the process flow.

At step S57, the control circuit 29d performs the phone call wait timer set process and proceeds to step S58. At step S58, the control circuit 29d performs the timed phone call start determination process and proceeds to step S59. At step S59, the control circuit 29d may detect the phone call started within the specified time (YES at step S59). In this case, the control circuit 29d proceeds to step S60. The control circuit 29d may not detect the phone call started within the specified time (NO at step S59). In this case, the control circuit 29d returns to step S51 and repeats the process flow.

At step S60, the control circuit 29d allows the BT communication portion 21 to transmit a handsfree changeover request for handsfree phone call to the mobile phone 1, and then proceeds to step S54.

In Europe, the mobile phone 1 often conforms to the specification that opens a sound path simultaneously with the start of phone call during HFP connection and transmits sound data to a vehicular apparatus. The control circuit 29d performs the process from step S51 to step S54 to allow the vehicular apparatus 2 to determine the need for handsfree phone call on the mobile phone 1 according to such specification and enable the handsfree phone call when phone call sound data is received. The mobile phone 1 is already ready for handsfree phone call. Therefore, the vehicular apparatus 2 does not transmit a handsfree changeover request to the mobile phone 1.

In North America and Japan, the mobile phone does not conform to the specification that opens a sound path simultaneously with the start of phone call during HFP connection and transmits sound data to a vehicular apparatus. The control circuit 29d performs the process from step S55 to step S60 to allow the vehicular apparatus to determine the need for handsfree phone call on such a mobile phone and enable the handsfree phone call when the phone call starts within a specified time subsequent to touch manipulation onto the vehicular touch panel.

Figure 17:
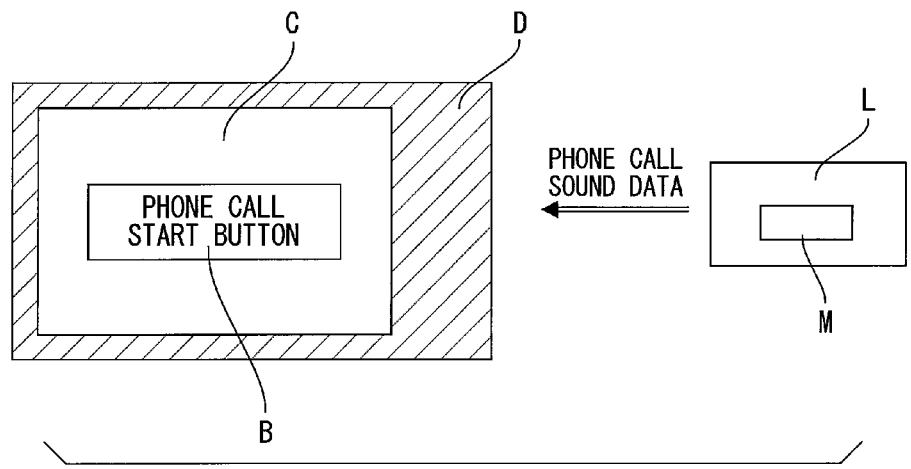
FIGS. 17(a) and 17(b) are schematic diagrams illustrating an overview of the handsfree phone call changeover process according to the six embodiment.
Figure 17:
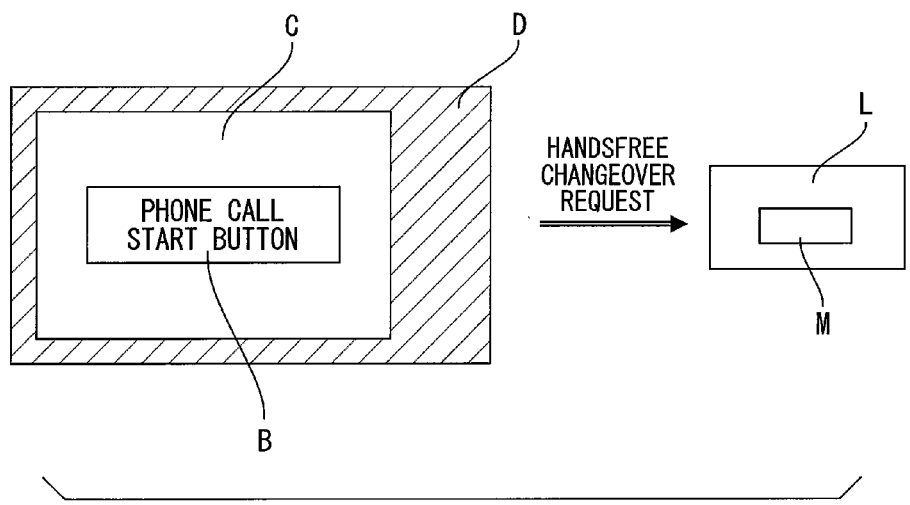

With reference to FIGS. 17(a) and 17(b), the following describes an outline of the handsfree phone call changeover process according to the sixth embodiment. In FIGS. 17(a) and 17(b), reference symbol C denotes the mobile screen image on the vehicular touch panel. Reference symbol D denotes the uniquely generated screen image. Reference symbol B denotes the phone call start button on the mobile screen image. Reference symbol L denotes the mobile screen image of the mobile phone 1. Reference symbol M denotes the phone call start button in the mobile screen image of the mobile phone 1.

FIG. 17(a) illustrates that the mobile phone 1 transmits phone call sound data. In this case, the vehicular apparatus 2 performs handsfree phone call without determining whether the vehicular touch panel is touched.

FIG. 17(b) illustrates that the mobile phone 1 does not transmit phone call sound data. In this case, the vehicular apparatus 2 performs handsfree phone call when the phone call starts within a specified time subsequent to touch manipulation onto the vehicular touch panel. The vehicular apparatus 2 transmits a handsfree changeover request to the mobile phone 1.

If phone call sound data is received from the mobile phone 1, the embodiment performs handsfree phone call without performing the handsfree changeover determination process as described in the first embodiment. If no phone call sound data is received from the mobile phone 1, the embodiment performs the handsfree changeover determination process as described in the first embodiment and performs the handsfree phone call if needed. The embodiment can appropriately perform the handsfree phone call according to types of the mobile phones 1 to be connected.

Seventh Embodiment

The sixth embodiment assumes the start of phone call within a specified time from touch manipulation onto the vehicular touch panel to be the determination condition to enable the handsfree phone call if no phone call sound data is received from the mobile phone 1. Further, the following embodiment (hereinafter referred to as a seventh embodiment) may also use determination conditions to determine whether the touched area corresponds to the H/F changeover button on the uniquely generated screen image and whether the mobile phone 1 enters the incoming call state.

The following describes the seventh embodiment with reference to the appended drawings. Members having the same functions as the members illustrated in the drawings used to describe the first embodiment are depicted by the same reference numerals and a description is omitted for simplicity.

Similarly to the sixth embodiment, the instrument coordination system 100 according to the seventh embodiment includes the mobile phone 1 and the vehicular apparatus 2. The seventh embodiment equals the sixth embodiment except partial differences in the handsfree phone call changeover process of the control circuit 29 in the vehicular apparatus 2.

Figure 18:
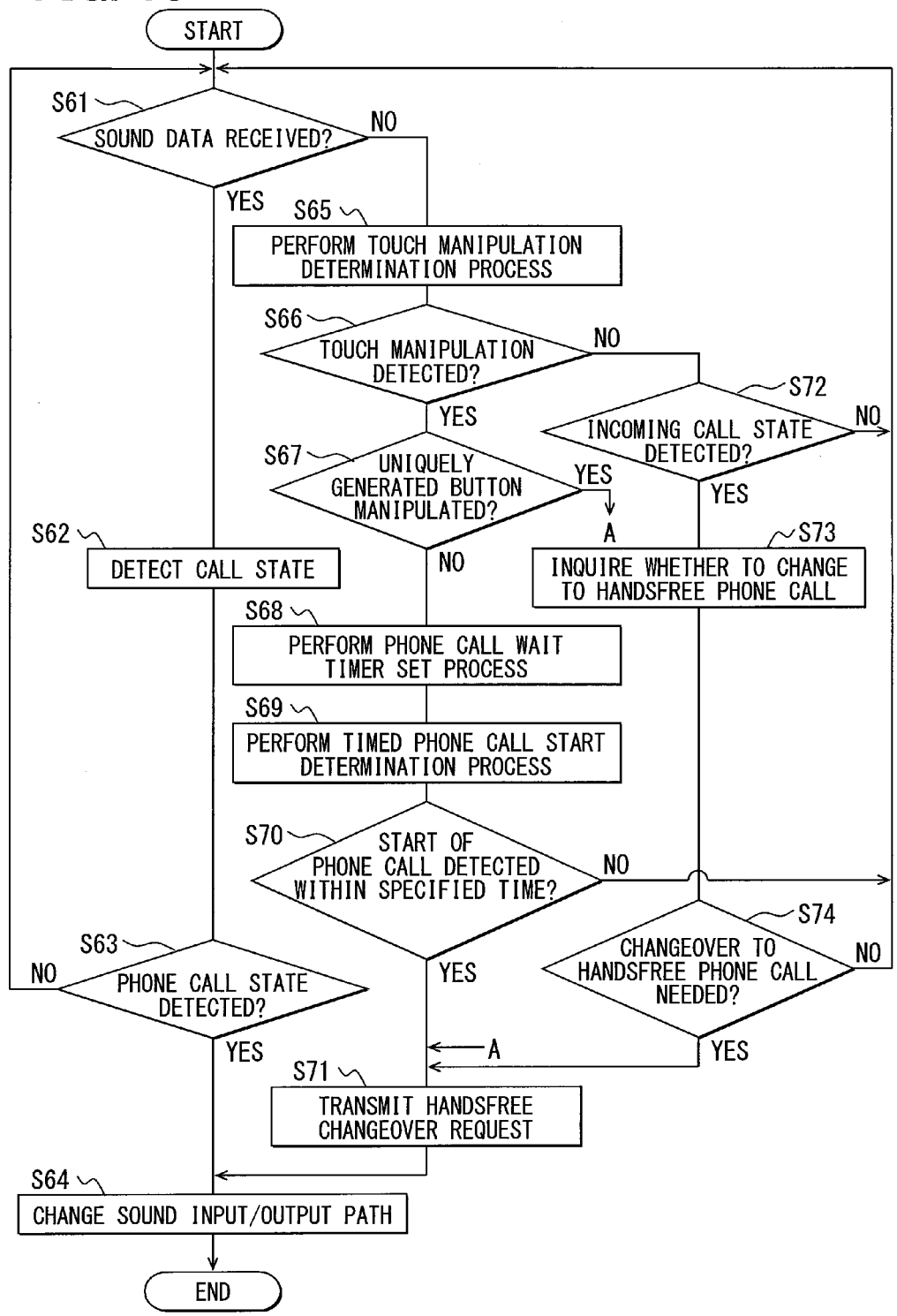
FIG. 18 is a flowchart illustrating a flow of the handsfree phone call changeover process in a control circuit according to a seventh embodiment.

The following describes the handsfree phone call changeover process in the control circuit 29 (hereinafter referred to as the control circuit 29e for convenience sake) according to the seventh embodiment with reference to the flowchart in FIG. 18. The process flow starts when the vehicular apparatus 2 connects with the mobile phone 1 in the terminal mode, for example.

The process from step S61 to step S64 equals the process from step S51 to step S54 according to the sixth embodiment. To summarize the process, the control circuit 29e determines at step S61 whether sound data is received from the mobile phone 1. The control circuit 29e proceeds to step S62 when determining that sound data is received (YES at step S61). The control circuit 29e proceeds to step S65 when determining that sound data is not received (NO at step S61).

At step S62, the control circuit 29e detects the call state of the mobile phone 1 and proceeds to step S63. At step S63, the control circuit 29e may detect the phone call state (YES at step S63). In this case, the control circuit 29e determines that the sound data received from the mobile phone is phone call sound data. The control circuit 29e proceeds to step S64. The control circuit 29e may not detect the phone call state (NO at step S63). In this case, the control circuit 29e determines that the sound data received from the mobile phone is not phone call sound data. The control circuit 29e returns to step S61 and repeats the process flow.

At step S64, the control circuit 29e changes an input/output path for the speaker or the microphone of the vehicular apparatus 2. The control circuit 29e thereby changes the use of the speaker or the microphone of the vehicular apparatus 2 to the use for the handsfree phone call from the use not for the handsfree phone call.

The process at step S65 and step S66, and step S68 through step S71 equals the process at step S55 through step S60 according to the sixth embodiment and follows the process at step S61 determining that no sound data is received.

To summarize the process, the control circuit 29e performs the touch manipulation determination process at step S65 and proceeds to step S66. If the touch manipulation is detected at step S66 (YES at step S66), the control circuit 29e proceeds to step S67. If no touch manipulation is detected at step S66 (NO at step S66), the control circuit 29e returns to step S61 and repeats the process flow.

At step S67, as described in the second embodiment, the control circuit 29e allows the vehicular apparatus 2 itself to generate a uniquely generated screen image in addition to the mobile screen image. The control circuit 29e displays the uniquely generated screen image on an area other than the area to display the mobile screen image of the vehicular display portion 24. The control circuit 29e allows the uniquely generated screen image to display also the H/F changeover button.

The control circuit 29e performs a process similar to the H/F changeover button manipulation determination process according to the second embodiment and may determine that the H/F changeover button (i.e., a uniquely generated button) is manipulated on the uniquely generated screen image (YES at step S67). In this case, the control circuit 29e proceeds to step S71. The control circuit 29e may determine that the H/F changeover button is not manipulated on the uniquely generated screen image (NO at step S67). In this case, the control circuit 29e proceeds to step S68.

According to the embodiment, the uniquely generated screen image displays the H/F changeover button. The control circuit 29e determines whether the H/F changeover button on the uniquely generated screen image is manipulated. However, the configuration is not limited thereto. For example, the uniquely generated screen image may display a phone call start button whose icon is designed differently from the H/F changeover button. The phone call start button may just enable changeover to the handsfree phone call from the handset phone call. The phone call start button may be displayed instead of the H/F changeover button that alternates the handsfree phone call and the handset phone call. The phone call start button may be displayed simultaneously with the H/F changeover button. Moreover, the phone call start button may have the same function as the H/F changeover button may only use a differently designed icon.

At step S68, the control circuit 29e performs the phone call wait timer set process and then proceeds to step S69. At step S69, the control circuit 29e performs the timed phone call start determination process and then proceeds to step S70. At step S70, the control circuit 29e may detect the phone call started within the specified time (YES at step S70). In this case, the control circuit 29e proceeds to step S71. The control circuit 29e may not detect the phone call started within the specified time (NO at step S70). In this case, the control circuit 29e returns to step S61 and repeats the process flow.

At step S71, the control circuit 29e allows the BT communication portion 21 to transmit a handsfree changeover request for handsfree phone call to the mobile phone 1, and then proceeds to step S64.

According to the embodiment, the manipulatory input portion 25 accepts user's manipulation input to control changeover to the handsfree phone call. The manipulatory input portion 25 is available as the touch switch that is integrated with an image displayed on the vehicular display portion 24. However, the configuration is not limited thereto. The manipulatory input portion 25 may use the mechanical switch, the voice recognition apparatus, the proximity switch, or the camera as described in the third embodiment. In other words, the touch switch is generated from an H/F changeover button image.

As described in the sixth embodiment, some mobile phones do not conform to the specification that opens a sound path simultaneously with the start of phone call during HFP connection and transmits sound data to a vehicular apparatus. Performing the process from step S67 to step S71 on such mobile phones allows the vehicular apparatus to determine the need for handsfree phone call and enable the handsfree phone call when the H/F changeover button is touched on the uniquely generated screen image.

If the mobile phone 1 enters the incoming call state at step S72 (YES at step S72), the control circuit 29e proceeds to step S73. If the mobile phone 1 does not enter the incoming call state (NO at step S72), the control circuit 29e returns to step S61 and repeats the process flow.

At step S73, the control circuit 29e inquires of the user whether to change to the handsfree phone call. For example, the control circuit 29e may inquire of the user whether to change to the handsfree phone call by displaying the H/F changeover button superimposed on the mobile screen image of the vehicular touch panel.

In this case, the control circuit 29e may determine the need for changeover to the handsfree phone call if the manipulatory input portion 25 detects touch manipulation onto an area displaying the H/F changeover button within a specified time. Otherwise, the control circuit 29e may not determine the need for changeover to the handsfree phone call.

The control circuit 29e may inquire of the user whether to change to the handsfree phone call by displaying a button icon (hereinafter referred to as an H/F selection button) superimposed on the mobile screen image of the vehicular touch panel. The H/F selection button selects whether to change to the handsfree phone call.

Also in this case, the control circuit 29e may determine the need for changeover to the handsfree phone call if the manipulatory input portion 25 detects touch manipulation onto an area displaying the H/F selection button within a specified time. Otherwise, the control circuit 29e may not determine the need for changeover to the handsfree phone call.

The H/F selection button may be displayed as two buttons such as a "select button" to enable the changeover and a "deselect button" to disable the changeover. In this case, the control circuit 29e may determine that the changeover is needed when detecting touch manipulation onto an area to display the select button. The control circuit 29e may determine that the changeover is unneeded when detecting touch manipulation onto an area to display the deselect button.

Further, the uniquely generated screen image may display the H/F changeover button or the H/F selection button. The embodiment describes an example of displaying the H/F selection button superimposed on the mobile screen image. The control circuit 29e is also referred to as an instruction button image display section or means. The H/F changeover button or the H/F selection button is also referred to as an instruction button.

The manipulatory input portion 25 accepts user's manipulation input to control changeover to the handsfree phone call and may be available as the mechanical switch, the voice recognition apparatus, the proximity switch, or the camera as described in the third embodiment.

At step S74, the control circuit 29e may determine that changeover to the handsfree phone call is needed (YES at step S74). In this case, the control circuit 29e proceeds to step S71. The control circuit 29e may determine that changeover to the handsfree phone call is unneeded (NO at step S74). The control circuit 29e waits until the phone call state is disconnected or enters standby mode, that is, until the incoming call state or the phone call state terminates. The control circuit 29e then returns to step S61 and repeats the process flow.

Some mobile phones do not conform to the specification that opens a sound path simultaneously with the start of phone call during HFP connection and transmits sound data to a vehicular apparatus (refer to the description of the sixth embodiment). Performing the process from step S72 to step S74 and step S71 on such mobile phones allows the vehicular apparatus to determine the need for handsfree phone call and enable the handsfree phone call when the mobile phone 1 enters the incoming call state.

Figure 19:
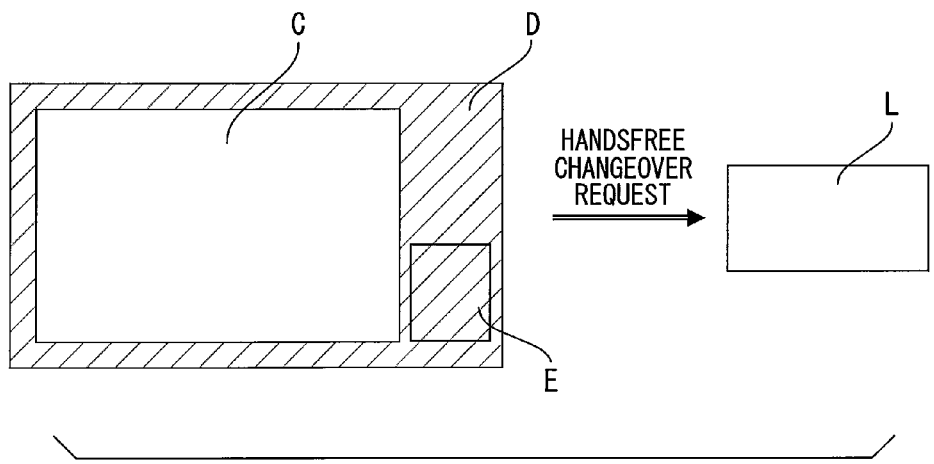
FIGS. 19(a) and 19(b) are schematic diagrams illustrating an overview of the handsfree phone call changeover process according to the seventh embodiment.
Figure 19:
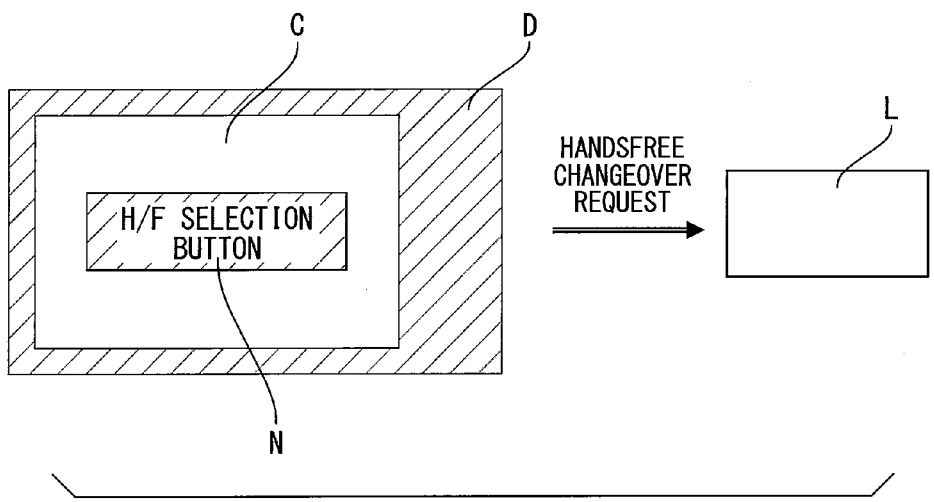

With reference to FIGS. 17(a), 17(b), 19(a), and 19(b), the following describes an outline of the handsfree phone call changeover process according to the seventh embodiment. In FIGS. 19(a) and 19(b), reference symbol C denotes the mobile screen image on the vehicular touch panel. Reference symbol D denotes the uniquely generated screen image. Reference symbol L denotes the mobile screen image of the mobile phone 1. Reference symbol E in FIG. 19(a) denotes the H/F changeover button in the uniquely generated screen image. Reference symbol N in FIG. 19(b) denotes the H/F selection button displayed superimposed on the mobile screen image.

If the mobile phone 1 transmits phone call sound data, the vehicular apparatus 2 performs a handsfree phone call without determining whether the vehicular touch panel is touched (see FIG. 17(a)).

The mobile phone 1 may not transmit phone call sound data and the H/F changeover button may not be manipulated on the uniquely generated screen image. In such a case, the vehicular apparatus 2 performs a handsfree phone call when the phone call starts within a specified time from touch manipulation onto the vehicular touch panel. In this case, the vehicular apparatus 2 transmits a handsfree changeover request to the mobile phone 1 (see FIG. 17(b)).

FIG. 19(a) illustrates that the mobile phone 1 does not transmit phone call sound data and the H/F changeover button is manipulated on the uniquely generated screen image. In this case, the vehicular apparatus 2 performs a handsfree phone call when the H/F changeover button is manipulated on the uniquely generated screen image. The vehicular apparatus 2 transmits a handsfree changeover request to the mobile phone 1.

FIG. 19(b) illustrates that the mobile phone 1 does not transmit phone call sound data, touch manipulation onto the vehicular touch panel is not detected, and the incoming call state of the mobile phone 1 is detected. In this case, the vehicular apparatus 2 performs a handsfree phone call in response to manipulation of the H/F selection button displayed superimposed on the mobile screen image of the vehicular touch panel. The vehicular apparatus 2 transmits a handsfree changeover request to the mobile phone 1.

Eighth Embodiment

The first embodiment described the process that assumes the start of phone call within a specified time from touch manipulation onto the vehicular touch panel to be the determination condition to enable the handsfree phone call. Further, the following embodiment (hereinafter referred to as an eighth embodiment) may perform different processes depending on whether the mobile phone 1 is processing an incoming call or an outgoing call (or calling in progress).

If the mobile phone 1 is processing an incoming call, for example, an incoming call process is performed to enable the handsfree phone call based on a determination condition to start the phone call within a specified time from touch manipulation onto the vehicular touch panel during the incoming call. If the mobile phone 1 is not processing an incoming call, an outgoing call process is performed to await the phone call state after the start of outgoing call within a specified time subsequent to touch manipulation and then perform changeover to the handsfree phone call.

The following describes the eighth embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the eighth embodiment includes the mobile phone 1 and the vehicular apparatus 2. The eighth embodiment equals the first embodiment except partial differences in the handsfree phone call changeover process of the control circuit 29 in the vehicular apparatus 2.

Figure 20:
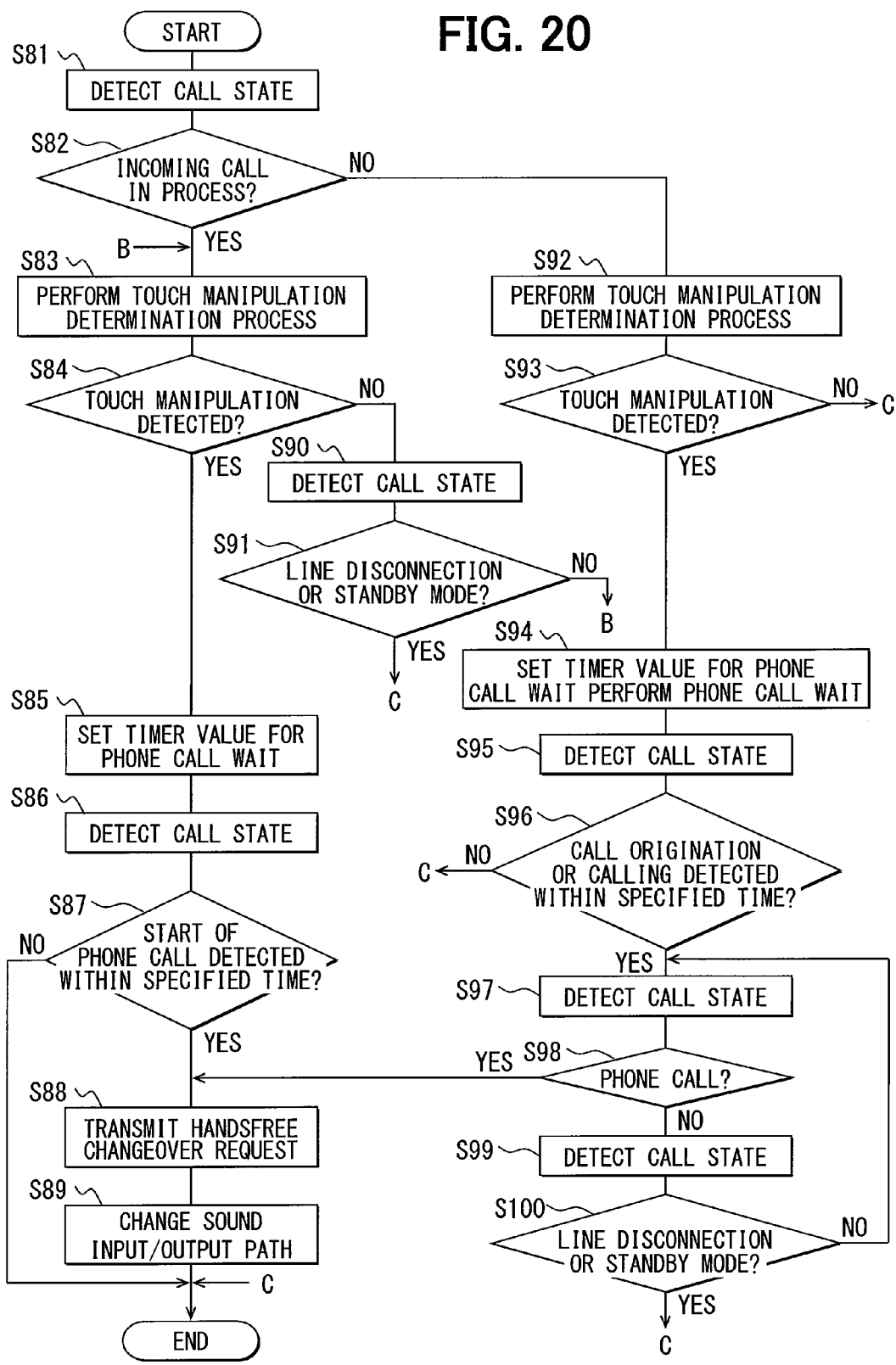
FIG. 20 is a flowchart illustrating a flow of the handsfree phone call changeover process in a control circuit according to an eighth embodiment.

The following describes the handsfree phone call changeover process in the control circuit 29 (hereinafter referred to as the control circuit 29f for convenience sake) according to the eighth embodiment with reference to the flowchart in FIG. 20. The process flow starts when the vehicular apparatus 2 connects with the mobile phone 1 in the terminal mode, for example.

At step S81, the control circuit 29f detects the call state of the mobile phone 1 and then proceeds to step S82. The control circuit 29f detects the call state in a manner similar to that described in the sixth embodiment, for example. The same applies to the subsequent process in the process flow.

At step S82, the detected call state may indicate an active incoming call (YES at step S82). In this case, the control circuit 29f proceeds to step S83. The detected call state may not indicate an active incoming call (NO at step S82). In this case, the control circuit 29f proceeds to step S92. Therefore, the control circuit 29*f* is also referred to as an active incoming call detection section or means.

At step S83, the control circuit 29*f* performs the touch manipulation determination process similarly to step S1 and proceeds to step S84. If touch manipulation is detected at step S84 (YES at step S84), the control circuit 29*f* proceeds to step S85. If no touch manipulation is detected (NO at step S84), the control circuit 29*f* proceeds to step S90.

At step S85, the control circuit 29*f* sets a timer value for phone call wait and proceeds to step S86. The control circuit 29*f* sets the timer value to three seconds, for example. Based on the timer value, the control circuit 29*f* monitors if the phone call starts within three seconds from the touch manipulation. At step S86, the control circuit 29*f* detects the call state of the mobile phone 1 and performs the above-mentioned monitoring.

At step S87, as a monitoring result, the control circuit 29*f* may detect that the call state of the mobile phone 1 enters a phone call state within the specified time corresponding to the timer value. In this case, the control circuit 29*f* determines that the phone call started within the specified time (YES at step S87). The control circuit 29*f* proceeds to step S88. On the other hand, the control circuit 29*f* may not detect that the call state of the mobile phone 1 enters a phone call state within the specified time. In this case, the control circuit 29*f* determines that the phone call did not start within the specified time (NO at step S87). The control circuit 29*f* terminates the process flow.

The process at step S85 and step S86 may be replaced by the process at step S5 and step S6. If the control circuit 29*f* detects that the phone call started within the specified time, the control circuit 29*f* may proceed to step S88. If the control circuit 29*f* does not detect that the phone call started within the specified time, the control circuit 29*f* may return to step S81 and repeat the process flow.

At step S88, the control circuit 29*f* allows the BT communication portion 21 to transmit the above-mentioned handsfree changeover request to the mobile phone 1 and proceeds to step S89. At step S89, similarly to step S54, the control circuit 29*f* performs a process that changes the sound input/output path in the vehicular apparatus 2 to the use for the handsfree phone call from the use not for the handsfree phone call.

At step S90, the control circuit 29*f* detects the call state of the mobile phone 1 after determining at step S84 that no touch manipulation is detected. The control circuit 29*f* then proceeds to step S91. At step S91, the control circuit 29*f* may determine that the call state of the mobile phone 1 is equal to line disconnection or standby mode, that is, the incoming call state becomes inactive (YES at step S91). In this case, the control circuit 29*f* terminates the process flow. On the other hand, the control circuit 29*f* may determine that the call state of the mobile phone 1 does not equal line disconnection or standby mode (NO at step S91). In this case, the control circuit 29*f* returns to step S83 and repeats the process flow. The control circuit 29*f* is also referred to as a disconnection state detection section or means.

The process from step S82 to step S91 corresponds to the above-mentioned incoming call process to determine whether to perform the handsfree phone call at the time of receiving an incoming call on the mobile phone 1. As described above, the control circuit 29*f* terminates the incoming call process without enabling the handsfree phone call if the call state of the mobile phone 1 turns to line disconnection or standby mode in the middle of the incoming call process.

At step S92, the control circuit 29*f* performs the touch manipulation determination process similarly to step S1 after determining that the call state does not indicate an active incoming call at step S82. The control circuit 29*f* then proceeds to step S93. If touch manipulation is detected at step S93 (YES at step S93), the control circuit 29*f* proceeds to step S94. If no touch manipulation is detected (NO at step S93), the control circuit 29*f* terminates the process flow.

At step S94, the control circuit 29*f* sets a timer value for phone call wait and proceeds to step S95. The control circuit 29*f* sets the timer value to three seconds, for example. Based on the timer value, the control circuit 29*f* monitors if an active outgoing call state or an active calling state occurred within three seconds from the touch manipulation. At step S95, the control circuit 29*f* detects the call state of the mobile phone 1 and performs the above-mentioned monitoring. Therefore, the control circuit 29*f* is also referred to as an outgoing call state detection section or means.

At step S96, as a monitoring result, the call state of the mobile phone 1 may turn to an active outgoing call state or an active calling state within the specified time corresponding to the timer value. In this case, the control circuit 29*f* determines that an outgoing call state or a calling state started within the specified time (YES at step S96). The control circuit 29*f* proceeds to step S97. On the other hand, the call state of the mobile phone 1 may not turn to an active outgoing call state or an active calling state within the specified time corresponding to the timer value. In this case, the control circuit 29*f* determines that an outgoing call state or a calling state did not start within the specified time (NO at step S96). The control circuit 29*f* returns to step S81 and repeats the process flow.

At step S97, the control circuit 29*f* detects the call state of the mobile phone 1 and proceeds to step S98. At step S98, the detected call state may be a phone call state (YES at step S98). In this case, the control circuit 29*f* proceeds to step S88. On the other hand, the detected call state may not be a phone call state (NO at step S98). In this case, the control circuit 29*f* proceeds to step S99.

At step S99, the control circuit 29*f* detects the call state of the mobile phone 1 and proceeds to step S100. At step S100, the call state of the mobile phone 1 may be line disconnection or standby mode, that is, may turn to neither the active outgoing call state nor the active calling state (YES at step S100). In this case, the control circuit 29*f* terminates the process flow. On the other hand, the call state of the mobile phone 1 may not be line disconnection or standby mode (NO at step S100). In this case, the control circuit 29*f* returns to step S97 and repeats the process flow.

The process from step S92 to step S100, step S88, and step S89 corresponds to the above-mentioned outgoing call process to determine whether to perform the handsfree phone call when the mobile phone 1 enters the outgoing call state or the calling state. As described above, the control circuit 29*f* terminates the outgoing call process without enabling the handsfree phone call if the call state of the mobile phone 1 turns to line disconnection or standby mode in the middle of the incoming call process.

The embodiment can appropriately determine changeover to the handsfree phone call according to features of the outgoing call state and the incoming call state of the mobile phone 1. The detail is as follows. The user cannot always promptly start the phone call in the incoming call state. Particularly, while driving a car, the user may need to park the car at a safe place in order to start the phone call by manipulating the vehicular touch panel. In the incoming call state, the embodiment performs monitoring until the incoming call state becomes inactive. The embodiment starts the handsfree phone call under the determination condition that the phone call starts within a specified time after the touch manipulation.

A phone call party does not always promptly respond to an outgoing call or calling. The user cannot always promptly start the phone call. For this reason, the embodiment always monitors if the vehicular touch panel is touched. The embodiment starts the handsfree phone call under the determination condition that the outgoing call state or the calling state starts within a specified time after the touch manipulation and then the phone call party responds to start the phone call.

As described in the sixth embodiment, the eighth embodiment may use a determination condition that determines whether phone call sound data is received from the mobile phone 1. Specifically, prior to the process at step S81, the control circuit 29f, similarly to step S51, determines whether sound data is received from the mobile phone 1.

If it is determined that sound data is received, the control circuit 29f, similarly to step S53, determines whether the sound data received from the mobile phone 1 is phone call sound data. If it is determined that the phone call sound data is received, the control circuit 29f, similarly to step S54, starts the handsfree phone call by performing the process that changes the sound input/output path in the vehicular apparatus 2 to the use for the handsfree phone call from the use not for the handsfree phone call. If it is determined that no sound data is received, the control circuit 29f proceeds to step S81 to perform the incoming call process or the outgoing call process as described above.

Ninth Embodiment

The first embodiment described the process that assumes the start of phone call within a specified time from touch manipulation onto the vehicular touch panel to be the determination condition to enable the handsfree phone call. Further, the following embodiment (hereinafter referred to as a ninth embodiment) may perform a process to record a time (clock time) of the most recent "touch manipulation" (hereinafter referred to as the most recent touch time) and assume a specific call state of the mobile phone 1 to be the determination condition to enable the handsfree phone call.

For example, the incoming call process is performed to enable the handsfree phone call if the call state of the mobile phone 1 is a phone call state (busy) and an interval from the most recent touch time to the current time is within a specified time. On the other hand, a wait occurs until activation of the phone call state and then the outgoing call process is performed to enable the handsfree phone call if the call state of the mobile phone 1 is an active outgoing call state or an active calling state and an interval from the most recent touch time to the current time is within a specified time.

The following describes the ninth embodiment with reference to the appended drawings. Members having the same functions as the members illustrated in the drawings used to describe the first embodiment are depicted by the same reference numerals and a description is omitted for simplicity.

Similarly to the first embodiment, the instrument coordination system 100 according to the ninth embodiment includes the mobile phone 1 and the vehicular apparatus 2. The ninth embodiment equals the first embodiment except partial differences in the handsfree phone call changeover process of the control circuit 29 in the vehicular apparatus 2.

Figure 21:
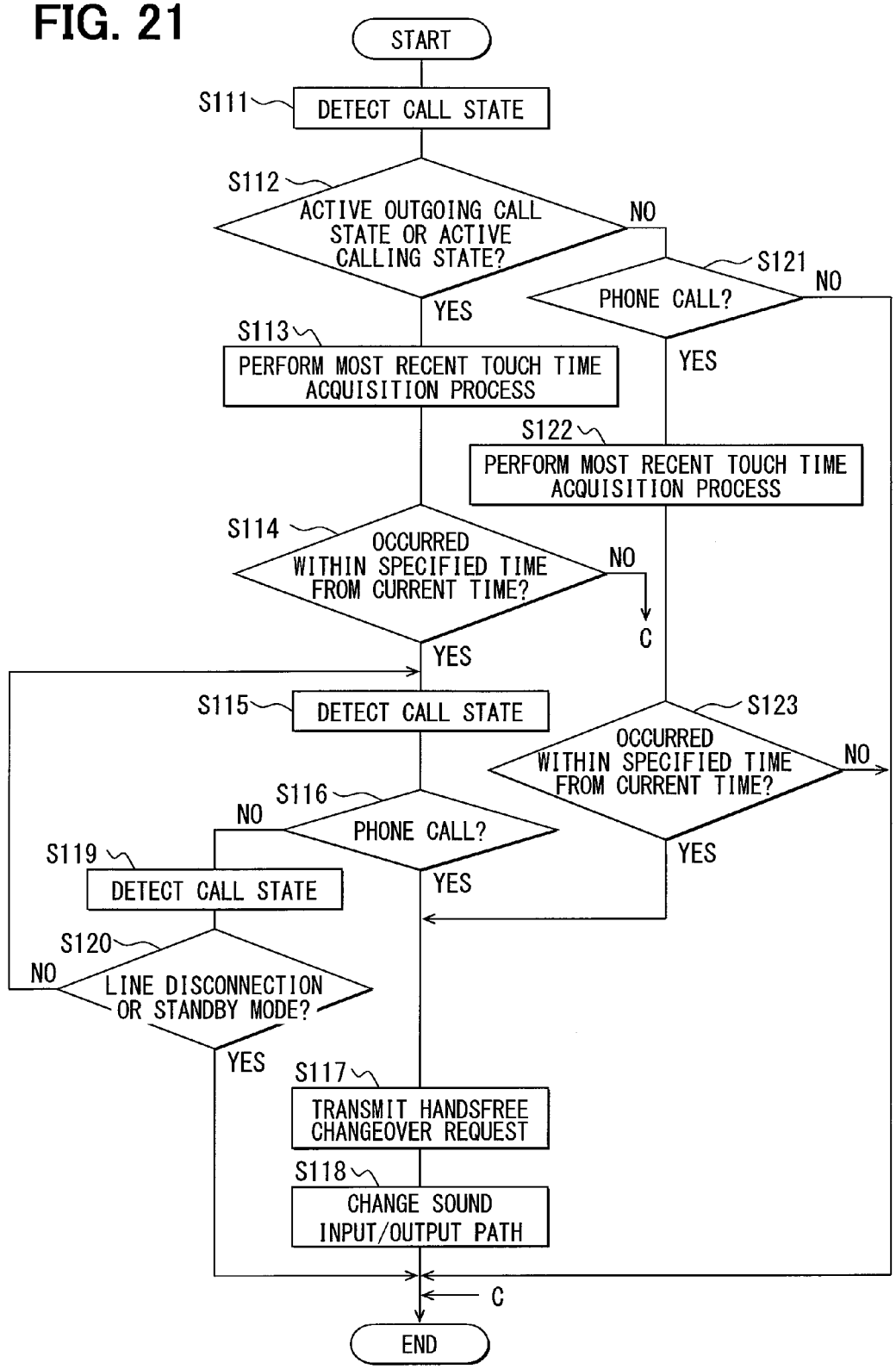
FIG. 21 is a flowchart illustrating a flow of the handsfree phone call changeover process in a control circuit according to a ninth embodiment.

The following describes the handsfree phone call changeover process in the control circuit 29 (hereinafter referred to as the control circuit 29g for convenience sake) according to the ninth embodiment with reference to the flowchart in FIG. 21. The process flow starts when the vehicular apparatus 2 connects with the mobile phone 1 in the terminal mode, for example.

At step S111, the control circuit 29g detects the call state of the mobile phone 1 and then proceeds to step S112. Therefore, the control circuit 29g is also referred to as a call state detection section or means. The control circuit 29g detects the call state in a manner similar to that described in the sixth embodiment, for example. The same applies to the subsequent process in the process flow.

Changing the call state of the mobile phone 1 may allow the mobile phone 1 to automatically notify the call state. In this case, the call state of the mobile phone 1 may be detected based on the call state notified from the mobile phone 1. Further, notification of the call state may trigger the process shown in this flowchart.

At step S112, the detected call state may be an active outgoing call state or an active calling state (YES at step S112). In this case, the control circuit 29g proceeds to step S113. On the other hand, the detected call state may be neither an active outgoing call state nor an active calling state (NO at step S112). In this case, the control circuit 29g proceeds to step S121.

At step S113, the control circuit 29g performs a most recent touch time acquisition process and proceeds to step S114. The most recent touch time acquisition process acquires the most recent touch time updated by a most recent touch time recording process (to be described) performed on the control circuit 29g.

Figure 22:
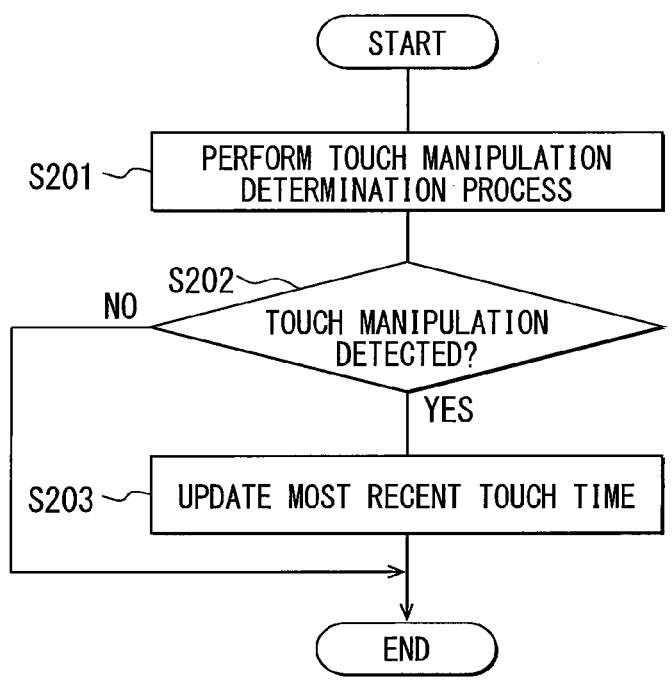
FIG. 22 is a flowchart illustrating an overview of a most recent touch time recording process.

The following describes the most recent touch time recording process with reference to a flowchart in FIG. 22. FIG. 22 is a flowchart illustrating an overview of the most recent touch time recording process. It is assumed that the process flow in FIG. 22 is performed periodically (e.g., every second) during the terminal mode connection between the vehicular apparatus 2 and the mobile phone 1, for example.

At step S201, similarly to step S1, the control circuit 29g performs the touch manipulation determination process and proceeds to step S202. If touch manipulation is detected at step S202 (YES at step S202), the control circuit 29g proceeds to step S203. If no touch manipulation is detected (NO at step S202), the control circuit 29g terminates the process flow.

At step S203, the control circuit 29g records the most recent touch time, that is, the time to detect the touch manipulation, in electrically rewritable memory such as the RAM of the control circuit 29g and terminates the process flow. At step S203, the control circuit 29g records new most recent touch time by overwriting the already recorded data to update the most recent touch time. Therefore, the control circuit 29g is also referred to as a most recent press manipulation recording section or means. A known timer portion or means (not shown) may acquire the time.

Returning to FIG. 21, the control circuit 29g determines at step S114 whether the most recent touch time acquired at step S113 was recorded within the specified time from the current time. The above-mentioned known timer portion or means may acquire the current time.

The control circuit 29g may determine that the most recent touch time was recorded within the specified time from the current time (YES at step S114). In this case, the control circuit 29g proceeds to step S115. On the other hand, the control circuit 29g may determine that the most recent touch time was not recorded within the specified time from the current time (NO at step S114). In this case, the control circuit 29g terminates the process flow. That is, the control circuit 29g does not perform handsfree phone call assuming that the manipulation for an outgoing call was performed on the mobile phone 1, not the vehicular apparatus 2.

At step S115, the control circuit 29g detects the call state of the mobile phone 1 and proceeds to step S116. At step S116, the detected call state may be a phone call state (YES at step S116). In this case, the control circuit 29g proceeds to step S119. The detected call state may not be a phone call state (NO at step S116). In this case, the control circuit 29g proceeds to step S117.

At step S117, the control circuit 29g allows the BT communication portion 21 to transmit the above-mentioned handsfree changeover request to the mobile phone 1 and proceeds to step S118. At step S118, similarly to step S54, the control circuit 29g performs the process that changes the sound input/output path in the vehicular apparatus 2 to the use for the handsfree phone call from the use not for the handsfree phone call.

The control circuit 29g proceeds to step S119 if the detected call state is a phone call state at step S116. At step S119, the control circuit 29g detects the call state of the mobile phone 1 and proceeds to step S120. At step S120, the call state of the mobile phone 1 may be line disconnection or standby mode, that is, may turn to neither the active outgoing call state nor the active calling state (YES at step S120). In this case, the control circuit 29g terminates the process flow. On the other hand, the call state of the mobile phone 1 may not be line disconnection or standby mode (NO at step S120). In this case, the control circuit 29g returns to step S115 and repeats the process flow.

The process from step S112 to step S120 corresponds to the above-mentioned outgoing call process to determine whether to perform the handsfree phone call when the mobile phone 1 enters the outgoing call state or the calling state. As described above, the control circuit 29g terminates the outgoing call process without enabling the handsfree phone call if the call state of the mobile phone 1 turns to line disconnection or standby mode in the middle of the incoming call process.

The control circuit 29g proceeds to step S121 if the detected call state is neither an active outgoing call state nor an active calling state at step S112. At step S121, the detected call state may be a phone call state (YES at step S121). In this case, the control circuit 29g proceeds to step S122. On the other hand, the detected call state may not be a phone call state (NO at step S121). In this case, the control circuit 29g terminates the process flow. The control circuit 29g once terminates the process flow if the incoming call state is active, for example, but the outgoing call state, the calling state, or the phone call state is inactive. Restarting the process flow enables the handsfree phone call when the call state changes from the active incoming state to the phone call state.

At step S122, similarly to step S113, the control circuit 29g performs the most recent touch time acquisition process and proceeds to step S123. At step S123, the control circuit 29g determines whether the most recent touch time acquired at step S122 was recorded within the specified time from the current time.

The control circuit 29g may determine that the most recent touch time was recorded within the specified time from the current time (YES at step S123). In this case, the control circuit 29g proceeds to step S117 and performs the handsfree phone call. On the other hand, the control circuit 29g may determine that the most recent touch time was not recorded within the specified time from the current time (NO at step S123). In this case, the control circuit 29g terminates the process flow. That is, the control circuit 29g does not perform handsfree phone call assuming that the manipulation for an incoming call was performed on the mobile phone 1, not the vehicular apparatus 2.

The process from step S121 to step S123 followed by step S117 and step S118 corresponds to the above-mentioned incoming call process to determine whether to perform the handsfree phone call in the phone call state of the mobile phone 1.

The embodiment determines whether to perform the handsfree phone call only when the mobile phone 1 enters a specific call state. Therefore, the embodiment can suppress processing loads compared to the configuration that determines whether to perform the handsfree phone call regardless of call states.

As described in the sixth embodiment, the ninth embodiment may use a determination condition that determines whether phone call sound data is received from the mobile phone 1. Specifically, prior to the process at step S111, the control circuit 29g, similarly to step S51, determines whether sound data is received from the mobile phone 1.

If it is determined that sound data is received, the control circuit 29g, similarly to step S53, determines whether the sound data received from the mobile phone is phone call sound data. If it is determined that the phone call sound data is received, the control circuit 29g, similarly to step S54, starts the handsfree phone call by performing the process that changes the sound input/output path in the vehicular apparatus 2 to the use for the handsfree phone call from the use not for the handsfree phone call. If it is determined that no sound data is received, the control circuit 29g proceeds to step S111 to perform the incoming call process or the outgoing call process as described above.

The vehicular apparatus 2 according to the embodiment uses the onboard navigation system integrated with the display. The onboard navigation system used as the vehicular apparatus 2 may be combined with a handsfree phone call apparatus such as a headset for handsfree phone call containing a set of the sound input portion and the sound output portion (e.g., a microphone and a speaker). The display audio system used as the vehicular apparatus 2 may be combined with a microphone for sound input.

The handsfree phone call changeover process according to the embodiment may be performed periodically (e.g., every second) while the vehicular apparatus 2 and the mobile phone 1 are connected in the terminal mode. If a preceding process is still in progress, the preceding process may be continued. The handsfree phone call changeover process may not be performed if the handsfree phone call is already performed.

The vehicular apparatus 2 may be able to acquire information about the types of applications running on the mobile phone 1. In such a case, the process may be performed only if the phone function is contained in the types of applications running on the mobile phone 1. That is, the process may be performed only when a phone application is performed. The process may not be performed when a music reproduction application is performed, for example. This can suppress processing loads on the vehicular apparatus 2 compared to a case of always performing the process regardless of the types of active applications.

While there have been described specific preferred embodiments and configurations of the present disclosure, it is to be distinctly understood that the disclosure is not limited thereto but may be otherwise variously embodied within the spirit and scope of the disclosure. The disclosure is supposed to include various modified examples and modifications within the applicable scope. It is also understood that the scope of the disclosure and the general inventive concept thereof cover preferred combinations and forms or the other combinations and forms including only one element or more or less than the same.

The invention claimed is:

1. A vehicular apparatus for a vehicle, comprising:
a communication portion to communicate with a mobile phone having a touch panel;
a vehicular display portion used in the vehicle;
a control circuit which performs
a process which acquires pixel information about a screen of the touch panel of the mobile phone via the communication portion to thereby permit the vehicular display portion to display a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
a phone call state detection section which detects that the mobile phone enters a phone call state; and
a vehicular phone call changeover section which performs changeover to a handsfree phone call that performs a phone call using a speaker and a microphone provided for the vehicular apparatus itself in cases that the phone call state detection section detects a phone call state of the mobile phone within a specified time since when the press manipulation onto the screen of the vehicular display portion is detected.

2. The vehicular apparatus according to claim 1, wherein the phone call state detection section detects a phone call state of the mobile phone based on reception of a phone call state notification that is transmitted from the mobile phone and indicates start of a phone call on the mobile phone.

3. The vehicular apparatus according to claim 1, wherein the phone call state detection section detects a phone call state of the mobile phone based on reception of a sound signal transmitted from the mobile phone.

4. The vehicular apparatus according to claim 1, further comprising:
a phone call screen image feature storage portion that stores an image feature about the screen of the touch panel used during a phone call,
wherein the phone call state detection section
determines whether a match is found between (i) the image feature stored in the phone call screen image feature storage portion and (ii) an image feature indicated by the pixel information acquired from the mobile phone based on the image feature and the pixel information, and,
detects a phone call state of the mobile phone when the match is determined to be found.

5. A vehicular apparatus for a vehicle, comprising:
a communication portion to communicate with a mobile phone having a touch panel;
a vehicular display portion used in the vehicle;
a control circuit which performs
a process which acquires pixel information about a screen of the touch panel of the mobile phone via the communication portion to thereby permit the vehicular display portion to display a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
a touch manipulation detection section which detects a press manipulation onto the screen of the vehicular display portion and specifies a pixel area on the screen of the vehicular display portion receiving the press manipulation;
a phone call area image feature storage portion which stores an image feature about a phone call start display area on the screen of the touch panel to start a phone call on the mobile phone;
a phone call manipulation determination section which determines whether a press manipulation is performed onto a pixel area displaying an image of the phone call start display area on the screen of the vehicular display portion, based on (i) the pixel information acquired from the mobile phone, (ii) the image feature stored in the phone call area image feature storage portion, and (iii) the pixel area specified by the touch manipulation detection section; and
a vehicular phone call changeover section which performs changeover to a handsfree phone call that performs a phone call using a speaker and a microphone provided for the vehicular apparatus itself when the phone call manipulation determination section determines that the press manipulation is performed onto the pixel area displaying the image of the phone call start display area.

6. The vehicular apparatus according to claim 5, wherein the phone call manipulation determination section
specifies a pixel area to display an image of the phone call start display area on the screen of the vehicular display portion, based on the pixel information acquired from the mobile phone and the image feature stored in the phone call area image feature storage portion,
determines whether a match is found between (i) the specified pixel area by the phone call manipulation determination section and (ii) the pixel area specified by the touch manipulation detection section, and
determines that the press manipulation is performed onto a pixel area on the screen of the vehicular display portion to display the image of the phone call start display area when the match is determined to be found.

7. The vehicular apparatus according to claim 5, wherein the phone call manipulation determination section
uses the pixel information acquired from the mobile phone and the pixel area specified by the touch manipulation detection section,
specifies, based on the pixel information and the pixel area, an image feature of the pixel area, determines whether a match is found between (i) the specified image feature and (ii) the image feature stored in the phone call area image feature storage portion, and determines that the press manipulation is performed onto a pixel area on the screen of the vehicular display portion to display the image of the phone call start display area when the match is determined to be found.

8. The vehicular apparatus according to claim 5, wherein color is used as an index for the image feature.

9. The vehicular apparatus according to claim 5, wherein a shape is used as an index for the image feature.

10. The vehicular apparatus according to claim 5, wherein a chronological change cycle of pixel information about an identical pixel is used as an index for the image feature.

11. A vehicular apparatus for a vehicle, comprising:

a communication portion to communicate with a mobile phone having a touch panel;

a vehicular display portion used in the vehicle;

a control circuit which performs a process which acquires pixel information about a screen of the touch panel of the mobile phone via the communication portion to thereby permit the vehicular display portion to display, as a mobile screen image, a screen image that is displayed on the touch panel of the mobile phone, and a process which specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and transmits a signal indicating the manipulation target area to the mobile phone via the communication portion;

a changeover instruction acceptance portion which accepts an input manipulation by a user to instruct either changing to a handsfree phone call or starting a phone call; and a vehicular phone call changeover section which performs changeover to a handsfree phone call that performs a phone call using a speaker and a microphone provided for the vehicular apparatus itself when the changeover instruction acceptance portion accepts the input manipulation, wherein the changeover instruction acceptance portion includes either a touch switch or a manipulation input apparatus that is different from the touch switch, the touch switch being generated from an image on a unique screen image area that is included in a display area of the vehicular display portion, the unique screen image area being different from a mobile screen image area displaying the mobile screen image, the unique screen image area displaying an image uniquely generated in the vehicular apparatus itself.

12. The vehicular apparatus according to claim 11, wherein the changeover instruction acceptance portion accepts an input manipulation to instruct changeover between a handsfree phone call and a handset phone call that uses only the mobile phone for phone call; and wherein the vehicular phone call changeover section changes between the handsfree phone call and the handset phone call each time the changeover instruction acceptance portion accepts the input manipulation.

13. The vehicular apparatus according to claim 12, wherein the vehicular phone call changeover section connects with the mobile phone to start a handsfree phone call using a handsfree phone call protocol that permits a handsfree phone call using the mobile phone; and wherein the vehicular phone call changeover section changes the handsfree phone call to the handset phone call by changing a sound input/output path without terminating the handsfree phone call protocol.

14. The vehicular apparatus according to claim 11, wherein a responsive action is able to be predetermined, the responsive action being taken when the changeover instruction acceptance portion accepts the input manipulation.

15. The vehicular apparatus according to claim 14, wherein the responsive action performs changeover to a handsfree phone call without causing the vehicular display portion to display an inquiring screen image that inquires of a user whether to start the handsfree phone call.

16. The vehicular apparatus according to claim 14, wherein the responsive action causes the vehicular display portion to display an inquiring screen image that inquires of a user whether to change to a handsfree phone call, and performs changeover to the handsfree phone call when accepting an input manipulation by a user, the input manipulation signifying that the handsfree phone call is needed.

17. The vehicular apparatus according to claim 11, further comprising:

a changeover button image display section, wherein the changeover button image display section displays the mobile screen image at part of a display area in the vehicular display portion that is configured to display the mobile screen image;

wherein the changeover button image display section permits the unique screen image area to display a changeover button image to instruct either a changeover to a handsfree phone call or a start of a phone call; and wherein the changeover instruction acceptance portion is a touch switch generated from the changeover button image displayed by the changeover button image display section.

18. The vehicular apparatus according to claim 17, wherein the changeover button image is continuously displayed in the unique screen image area.

19. The vehicular apparatus according to claim 17, wherein the changeover button image is distinguishable from a phone call start button image that is displayed on the mobile screen image, the phone call start button instructing a start of a handset phone call on the mobile phone.

20. The vehicular apparatus according to claim 19, wherein the changeover button image differs from the phone call start button image in at least one of character, color, or shape.

21. The vehicular apparatus according to claim 17, wherein the input manipulation received by the touch switch is different from an input manipulation, which instructs a start of a handset phone call on the mobile phone, in respect of a manipulation procedure.

22. The vehicular apparatus according to claim 17,
wherein the mobile screen image that is the screen image displayed on the touch panel is displayed on part of a display area of the vehicular display portion;
wherein the changeover button image display section displays a changeover button image inside the display area of the vehicular display portion and outside the mobile screen image area, the changeover button image being used to instruct changeover between a handsfree phone call and a handset phone call; and
wherein the changeover button image display section displays the changeover button image regardless of whether a connected mobile phone has a function to change between a handsfree phone call and a handset phone call during a phone call.

23. The vehicular apparatus according to claim 17, further comprising:
a phone call state detection section that detects a phone call state of the mobile phone,
wherein the changeover button image display section continues to display the changeover button image while the phone call state detection section detects the phone call state of the mobile phone.

24. The vehicular apparatus according to claim 17,
wherein the vehicular apparatus is able to connect with a plurality of mobile phones using a handsfree communication procedure to perform a handsfree phone call; and
wherein, when the handsfree communication procedure is used to connect with the plurality of mobile phones, the changeover button image display section displays the changeover button image only for a mobile phone whose mobile screen image is displayed on the vehicular display portion.

25. The vehicular apparatus according to claim 17,
wherein the vehicular apparatus is able to connect with a plurality of mobile phones using a handsfree communication procedure to perform a handsfree phone call; and
wherein, when the handsfree communication procedure is used to connect with the plurality of mobile phones, the changeover button image display section displays the changeover button image for not only a mobile phone whose mobile screen image is displayed on the vehicular display portion, but also each of the other mobile phones connected through the handsfree communication procedure.

26. The vehicular apparatus according to claim 11,
wherein the changeover instruction acceptance portion is a mechanical switch.

27. The vehicular apparatus according to claim 11,
wherein the changeover instruction acceptance portion accepts the input manipulation by recognizing voice uttered from a user.

28. The vehicular apparatus according to claim 11,
wherein the changeover instruction acceptance portion accepts the input manipulation by detecting a gesture manipulation by a user.

29. A vehicular apparatus for a vehicle, comprising:
a communication portion to communicate with a mobile phone having a touch panel;
a vehicular display portion used in the vehicle;
a control circuit which performs
a process that acquires pixel information about a screen of the touch panel via the communication portion to thereby permit the vehicular display portion to display, as a mobile screen image, a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
an incoming call state detection section which detects an incoming call state of the mobile phone;
a vehicle-generated screen display section which uniquely generates and displays a handsfree changeover screen image independently of the mobile screen image so that the handsfree changeover screen image includes a handsfree changeover button image to permit a handsfree phone call using a speaker and a microphone of the vehicular apparatus itself for phone call when the incoming call state detection section detects the incoming call state of the mobile phone;
a handsfree changeover manipulation detection section which detects an input manipulation by a user onto an area for the handsfree changeover button image in the handsfree changeover screen image; and
a vehicular phone call changeover section which performs changeover to a handsfree phone call when the handsfree changeover manipulation detection section detects the input manipulation.

30. The vehicular apparatus according to claim 29, further comprising:
a superimposition display section; and
a handset changeover manipulation detection section,
wherein, when a handsfree phone call is enabled, the superimposition display section displays a handset changeover button image to be superimposed on either the mobile screen image or the handsfree changeover screen image, the handset changeover button image thereby permitting a handset phone call using the mobile phone only;
wherein the handset changeover manipulation detection section detects an input manipulation by a user onto an area for the handset changeover button image displayed by the superimposition display section; and
wherein, when the handset changeover manipulation detection section detects the input manipulation, the vehicular phone call changeover section performs changeover to a handset phone call.

31. The vehicular apparatus according to claim 29,
wherein the vehicular apparatus is able to connect with a plurality of mobile phones using a handsfree communication procedure to perform a handsfree phone call; and
wherein, when the handsfree communication procedure is used to connect with the plurality of mobile phones, the vehicle-generated screen display section displays the handsfree changeover screen image not only when the incoming call state detection section detects an incoming call state of a mobile phone whose mobile screen image is displayed in the vehicular display portion, but also when the incoming call state detection section detects an incoming call state of another mobile phone connected through the handsfree communication procedure.

32. The vehicular apparatus according to claim 29,
wherein the vehicular apparatus is able to connect with a plurality of mobile phones using a handsfree communication procedure to perform a handsfree phone call; and
wherein, when the handsfree communication procedure is used to connect with the plurality of mobile phones, the vehicle-generated screen display section displays the handsfree changeover screen image when the incoming call state detection section detects an incoming call state of a mobile phone whose mobile screen image is displayed in the vehicular display portion, but does not display the handsfree changeover screen image when the incoming call state detection section detects an incoming call state of another mobile phone connected through the handsfree communication procedure.

33. The vehicular apparatus according to claim 31, further comprising:
a specification section; and
a notification section,
wherein the specification section specifies each of the mobile phones connected through the handsfree communication procedure; and
wherein, based on a specification result from the specification section, the notification section reports which mobile phone among the mobile phones connected through the handsfree communication procedure is a mobile phone whose incoming call state is detected by the incoming call state detection section.

34. A vehicular apparatus for a vehicle, comprising:
a communication portion to communicate with a mobile phone having a touch panel;
a vehicular display portion used in the vehicle;
a control circuit which performs
a process that acquires pixel information about a screen of the touch panel via the communication portion and to permit the vehicular display portion to display, as a mobile screen image, a screen image that is displayed on the touch panel of the mobile phone, based on the pixel information, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
a phone call state detection section which detects that the mobile phone enters a phone call state;
a vehicle-generated screen display section which uniquely generates and displays a handsfree changeover screen image independently of the mobile screen image so that the handsfree changeover screen image includes a handsfree changeover button image to enable a handsfree phone call using a speaker and a microphone of the vehicular apparatus itself for phone call when the phone call state detection section detects the phone call state of the mobile phone;
a handsfree changeover manipulation detection section which detects user's input manipulation onto an area for the handsfree changeover button image in the handsfree changeover screen image; and
a vehicular phone call changeover section which performs changeover to a handsfree phone call when the handsfree changeover manipulation detection section detects the input manipulation.

35. The vehicular apparatus according to claim 34,
wherein the vehicle-generated screen display section displays the handsfree changeover screen image in at least part of an area on the vehicular display portion where the mobile screen image was displayed.

36. The vehicular apparatus according to claim 35,
wherein the vehicle-generated screen display section displays the handsfree changeover screen image in at least specific part of an area on the vehicular display portion where the mobile screen image was displayed.

37. The vehicular apparatus according to claim 35,
wherein the vehicle-generated screen display section erases the mobile screen image and then displays the handsfree changeover screen image.

38. The vehicular apparatus according to claim 34, further comprising:
a phone call state detection section that detects a phone call state of the mobile phone,
wherein the handsfree changeover screen image is erased when the phone call state detection section does not detect a phone call state of the mobile phone within a specified time since when the handsfree changeover screen image was displayed.

39. The vehicular apparatus according to claim 37, further comprising:
a mobile screen image changeover section that displays the mobile screen image instead of the handsfree changeover screen image when the changeover to the handsfree phone call is performed.

40. The vehicular apparatus according to claim 35,
wherein the vehicle-generated screen display section displays the handsfree changeover screen image superimposed on a partial area of the mobile screen image.

41. The vehicular apparatus according to claim 40,
wherein the handsfree changeover screen image is capable of at least one of movement, enlargement, or reduction according to user's input manipulation.

42. A vehicular apparatus in a vehicle, comprising:
a communication portion to communicate with a mobile phone having a touch panel;
a vehicular display portion used in the vehicle;
a control circuit which performs
a process that acquires pixel information about a screen of the touch panel via the communication portion to thereby permit the vehicular display portion to display a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
a phone call state detection section which detects that the mobile phone enters a phone call state; and
a vehicular phone call changeover section which performs changeover to a handsfree phone call using a speaker and a microphone of the vehicular apparatus itself for phone call when the phone call state detection section detects a phone call state of the mobile phone.

43. The vehicular apparatus according to claim 42, wherein a responsive action is able to be predetermined, the responsive action being taken when the phone call state detection section detects a phone call state of the mobile phone.

44. The vehicular apparatus according to claim 43, wherein the responsive action performs changeover to a handsfree phone call without causing the vehicular display portion to display an inquiring screen image that inquires of a user whether to start the handsfree phone call.

45. The vehicular apparatus according to claim 43, wherein the responsive action
causes the vehicular display portion to display an inquiring screen image that inquires of a user whether to change to a handsfree phone call, and performs changeover to the handsfree phone call when accepting user's input manipulation signifying that handsfree phone call is needed.

46. The vehicular apparatus according to claim 42, wherein the vehicular apparatus is able to connect with a plurality of mobile phones using a handsfree communication procedure to perform a handsfree phone call; and
wherein, when the handsfree communication procedure is used to connect with the plurality of mobile phones, the vehicular phone call changeover section performs changeover to the handsfree phone call only when a mobile phone whose mobile screen image is displayed on the vehicular display portion matches a mobile phone whose phone call state is detected by the phone call state detection section.

47. The vehicular apparatus according to claim 42, further comprising:
an inquiry section; and
an instruction acceptance portion,
wherein the vehicular apparatus is able to connect with a plurality of mobile phones using a handsfree communication procedure to perform handsfree phone call;
wherein, when the handsfree communication procedure is used to connect with the plurality of mobile phones, the inquiry section inquires need for changeover to a handsfree phone call when a mobile phone whose mobile screen image is displayed on the vehicular display portion does not match a mobile phone whose phone call state is detected by the phone call state detection section;
wherein the instruction acceptance portion accepts user's manipulation input to control need for changeover to the handsfree phone call in response to an inquiry from the inquiry section;
wherein, when the handsfree communication procedure is used to connect with the plurality of mobile phones, the vehicular phone call changeover section performs changeover to a handsfree phone call if a mobile phone whose mobile screen image is displayed on the vehicular display portion matches a mobile phone whose phone call state is detected by the phone call state detection section; and
wherein, when a mobile phone whose mobile screen image is displayed on the vehicular display portion does not match a mobile phone whose phone call state is detected by the phone call state detection section, the vehicular phone call changeover section
performs changeover to a handsfree phone call, provided that the instruction acceptance portion accepts an input manipulation to indicate an intention to require changeover, and
does not perform changeover to a handsfree phone call, provided that the instruction acceptance portion accepts input manipulation to indicate no intention to require changeover.

48. A vehicular apparatus for a vehicle, comprising:
a communication portion to communicate with a mobile phone having a touch panel;
a vehicular display portion used in the vehicle;
a control circuit which performs
a process that acquires pixel information about a screen of the touch panel via the communication portion to thereby permit the vehicular display portion to display a screen image that is displayed on the touch panel, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion; and
a vehicular phone call changeover section,
wherein, when phone call sound data is received from the mobile phone, the vehicular phone call changeover section performs changeover to a handsfree phone call using a speaker and a microphone of the vehicular apparatus itself for phone call; and
wherein, when no phone call sound data is received from the mobile phone, the vehicular phone call changeover section performs changeover to a handsfree phone call when the mobile phone enters a phone call state.

49. The vehicular apparatus according to claim 48, wherein, when phone call sound data is received from the mobile phone, the vehicular phone call changeover section performs changeover to a handsfree phone call by changing a sound input/output path in the vehicular apparatus itself to a path that outputs sound, which is supplied from the mobile phone, from the vehicular apparatus, the path also outputting sound, which is supplied to the vehicular apparatus, to the mobile phone.

50. The vehicular apparatus according to claim 48, wherein, when no phone call sound data is received from the mobile phone, the vehicular phone call changeover section performs changeover to a handsfree phone call when the mobile phone enters a phone call state within a specified time since detection of a press manipulation onto the vehicular display portion.

51. The vehicular apparatus according to claim 48, wherein, when no phone call sound data is received from the mobile phone, the vehicular phone call changeover section performs changeover to a handsfree phone call, if needed, by (i) transmitting a signal requesting changeover to a handsfree phone call to the mobile phone and (ii) changing a sound input/output path in the vehicular apparatus itself to a path that outputs sound, which is supplied from the mobile phone, from the vehicular apparatus, the path also outputting sound, which is supplied to the vehicular apparatus, to the mobile phone.

52. A vehicular apparatus for a vehicle, comprising:
a communication portion to communicate with a mobile phone having a touch panel;
a vehicular display portion used in the vehicle;
a control circuit which performs
a process that acquires pixel information about a screen of the touch panel via the communication portion to thereby permit the vehicular display portion to display, as a mobile screen image, a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
a phone call state detection section which detects that the mobile phone enters a phone call state; and
a vehicular phone call changeover section,
wherein, when phone call sound data is received from the mobile phone, the vehicular phone call changeover section performs changeover to a handsfree phone call using a speaker and a microphone of the vehicular apparatus itself for phone call; and
wherein, when no phone call sound data is received from the mobile phone, the vehicular phone call changeover section performs changeover to the handsfree phone call based on either a first detection or a second detection,
the first detection being detection of a press manipulation onto a phone call start display area in the mobile screen image displayed on the vehicular display portion in order to start a phone call on the mobile phone,
the second detection being detection of a press manipulation onto a changeover button image area in a unique screen image area in order to instruct changeover to the handsfree phone call or start of phone call, the unique screen image area being provided for a display area of the vehicular display portion to display screen images uniquely generated in the vehicular apparatus itself.

53. The vehicular apparatus according to claim 52, wherein, when phone call sound data is received from the mobile phone, the vehicular phone call changeover section performs changeover to a handsfree phone call by changing a sound input/output path in the vehicular apparatus itself to a path that outputs sound, which is supplied from the mobile phone, from the vehicular apparatus, the path also outputting sound, which is supplied to the vehicular apparatus, to the mobile phone.

54. The vehicular apparatus according to claim 52, wherein the vehicular phone call changeover section performs changeover to a handsfree phone call when the phone call state detection section detects a phone call state of the mobile phone within a specified time since detection of the press manipulation onto the mobile screen image in cases that no phone call sound data is received from the mobile phone.

55. The vehicular apparatus according to claim 52, wherein the vehicular phone call changeover section performs changeover to a handsfree phone call when the press manipulation onto the unique screen image area is detected in cases that no phone call sound data is received from the mobile phone.

56. The vehicular apparatus according to claim 52, further comprising:
an incoming call state detection section to detect an incoming call state of the mobile phone; and
an instruction button image display section to permit the unique screen image area to display an instruction button image that controls need for changeover to a handsfree phone call;
wherein the vehicular phone call changeover section permits the instruction button image display section to display the instruction button image on the unique screen image area when no press manipulation is detected onto the vehicular display portion and, simultaneously, the incoming call state detection section detects an incoming call state on the mobile phone, in cases that no phone call sound data is received from the mobile phone.

57. The vehicular apparatus according to claim 56, wherein the vehicular phone call changeover section performs changeover to a handsfree phone call when detecting input manipulation at an area for the instruction button image on the unique screen image area to indicate that changeover to handsfree phone call is needed.

58. The vehicular apparatus according to claim 52, wherein, when no phone call sound data is received from the mobile phone, the vehicular phone call changeover section performs changeover to a handsfree phone call by (i) transmitting a signal requesting changeover to handsfree phone call, if needed, to the mobile phone and (ii) changing a sound input/output path in the vehicular apparatus itself to a path that outputs sound, which is supplied from the mobile phone, from the vehicular apparatus, the path also outputting sound, which is supplied to the vehicular apparatus, to the mobile phone.

59. A vehicular apparatus for a vehicle, comprising:
a communication portion to communicate with a mobile phone having a touch panel;
a vehicular display portion used in the vehicle;
a control circuit which performs
a process that acquires pixel information about a screen of the touch panel via the communication portion to thereby permit the vehicular display portion to display a screen image that is displayed on the touch panel of the mobile phone, and
a process which
specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
transmits a signal indicating the manipulation target area to the mobile phone via the communication portion;
an active incoming call detection section which detects an incoming call state of the mobile phone;
a phone call state detection section which detects a phone call state of the mobile phone; and
a vehicular phone call changeover section which performs an incoming call process to perform changeover to a handsfree phone call using a speaker and a microphone of the vehicular apparatus itself for phone call when the phone call state detection section detects a phone call state of the mobile phone within a specified time since detection of the press manipulation onto the vehicular display portion while the active incoming call detection section detects an incoming call state of the mobile phone.

60. A vehicular apparatus for a vehicle, comprising:
a communication portion to communicate with a mobile phone having a touch panel;
a vehicular display portion used in the vehicle;
a control circuit which performs
   a process that acquires pixel information about a screen of the touch panel via the communication portion to thereby permit the vehicular display portion to display a screen image that is displayed on the touch panel of the mobile phone, and
   a process which
      specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
      transmits a signal indicating the manipulation target area to the mobile phone via the communication portion;
an outgoing call state detection section which detects that the mobile phone enters either an outgoing call state or a calling state;
a phone call state detection section which detects a phone call state of the mobile phone; and
a vehicular phone call changeover section which performs an outgoing call process to perform changeover to a handsfree phone call using a speaker and a microphone of the vehicular apparatus itself for phone call when the phone call state detection section detects a phone call state of the mobile phone after the outgoing call state detection section detects either an outgoing call state or a calling state of the mobile phone within a specified time since detection of the press manipulation onto the vehicular display portion.

61. The vehicular apparatus according to claim 59, further comprising:
an outgoing call state detection section to detect that the mobile phone enters an outgoing call state or a calling state,
wherein the vehicular phone call changeover section performs
   an incoming call process to perform changeover to a handsfree phone call when the phone call state detection section detects a phone call state of the mobile phone within a specified time since detection of the press manipulation onto the vehicular display portion while the active incoming call detection section detects an incoming call state of the mobile phone, or
   an outgoing call process to perform changeover to a handsfree phone call when the phone call state detection section detects a phone call state of the mobile phone within a specified time since the outgoing call state detection section detects the outgoing call state or the calling state of the mobile phone within a specified time since detection of the press manipulation onto the vehicular display portion while the active incoming call detection section does not detect an incoming call state of the mobile phone.

62. The vehicular apparatus according to claim 59, further comprising:
a disconnection state detection section to detect that the mobile phone enters a line disconnection state or a standby state,
wherein the vehicular phone call changeover section does not perform changeover to a handsfree phone call when the disconnection state detection section detects that the mobile phone enters the line disconnection state or the standby state during the incoming call process.

63. The vehicular apparatus according to claim 60, further comprising:
a disconnection state detection section to detect that the mobile phone enters a line disconnection state or a standby state,
wherein the vehicular phone call changeover section does not perform changeover to a handsfree phone call when the disconnection state detection section detects that the mobile phone enters the line disconnection state or the standby state during the outgoing call process.

64. The vehicular apparatus according to claim 61, further comprising:
a disconnection state detection section to detect that the mobile phone enters a line disconnection state or a standby state,
wherein the vehicular phone call changeover section does not perform changeover to a handsfree phone call when the disconnection state detection section detects that the mobile phone enters the line disconnection state or the standby state during the incoming call process or the outgoing call process.

65. The vehicular apparatus according to claim 59,
wherein the vehicular phone call changeover section performs changeover to a handsfree phone call when phone call sound data is received from the mobile phone; and
wherein the vehicular phone call changeover section performs the incoming call process or the outgoing call process to perform changeover to a handsfree phone call when no phone call sound data is received from the mobile phone.

66. A vehicular apparatus for a vehicle, comprising:
a communication portion to communicate with a mobile phone having a touch panel;
a vehicular display portion used in the vehicle;
a control circuit which performs
   a process that acquires pixel information about a screen of the touch panel via the communication portion to permit the vehicular display portion to display a screen image that is displayed on the touch panel of the mobile phone, and
   a process which
      specifies, as a manipulation target area, a pixel area on the screen of the touch panel when a user performs a press manipulation onto a pixel area on a screen of the vehicular display portion, the pixel area on the screen of the touch panel of the mobile phone corresponding to the pixel area on the screen of the vehicular display portion receiving the press manipulation, and
      transmits a signal indicating the manipulation target area to the mobile phone via the communication portion;
a call state detection section which detects any of a plurality of predetermined call states indicating states of call control provided by the mobile phone;

a most recent press manipulation recording section which records time of most recent press manipulation onto the vehicular touch panel; and a vehicular phone call changeover section to perform changeover to a handsfree phone call using a speaker and a microphone of the vehicular apparatus itself for phone call based on the time of most recent press manipulation recorded by the most recent press manipulation recording section and the mobile phone call state detected by the call state detection section, wherein the vehicular phone call changeover section performs changeover to a handsfree phone call when a call state of the mobile phone detected by the call state detection section enters a specific call state and a difference between the time of most recent press manipulation recorded by the most recent press manipulation recording section and a current time is within a specified time.

67. The vehicular apparatus according to claim 66,
wherein the vehicular phone call changeover section performs an incoming call process to perform changeover to changed to a handsfree phone call when the call state detection section detects a call state of the mobile phone to be a phone call state and a difference between the time of most recent press manipulation recorded by the most recent press manipulation recording section and a current time is within a specified time.

68. The vehicular apparatus according to claim 66,
wherein the vehicular phone call changeover section performs an outgoing call process to perform changeover to a handsfree phone call when the call state detection section detects a call state of the mobile phone to be either an active outgoing call state or an active calling state and the call state detection section detects a call state of the mobile phone to be a phone call state in cases that a difference between the time of most recent press manipulation recorded by the most recent press manipulation recording section and a current time is within a specified time.

69. The vehicular apparatus according to claim 68,
wherein the call state detection section also detects, as the call state, a line disconnection and a standby state; and
wherein the vehicular phone call changeover section does not perform changeover to a handsfree phone call when the call state detection section detects that the mobile phone enters the line disconnection state or the standby state during the outgoing call process.

70. The vehicular apparatus according to claim 66,
wherein, when phone call sound data is received from the mobile phone, the vehicular phone call changeover section performs changeover to a handsfree phone call; and
wherein, when no phone call sound data is received from the mobile phone, the vehicular phone call changeover section performs changeover to a handsfree phone call based on the time of most recent press manipulation recorded by the most recent press manipulation recording section and a mobile phone call state detected by the call state detection section.

71. The vehicular apparatus according to claim 66,
wherein the vehicular phone call changeover section performs changeover to a handsfree phone call by (i) transmitting a signal requesting changeover to the handsfree phone call, if needed, to the mobile phone and (ii) changing a sound input/output path in the vehicular apparatus itself to a path that outputs sound, which is supplied from the mobile phone, from the vehicular apparatus, the path also outputting sound, which is supplied to the vehicular apparatus, to the mobile phone.

72. A mobile phone comprising:
a touch panel;
an identification section; and
a mobile phone call changeover section,
wherein the mobile phone having a touch panel communicates with a vehicular apparatus for a vehicle;
wherein the vehicular apparatus communicates with the mobile phone to acquire pixel information about a screen of the touch panel and thereby permit a vehicular display portion used in the vehicle to display a screen image, which is displayed on the touch panel;
wherein the vehicular apparatus
specifies, as a manipulation target area, a pixel area on the screen of the touch panel when a user performs a press manipulation onto a pixel area on a screen of the vehicular display portion, the pixel area on the screen of the touch panel corresponding to the pixel area on the screen of the vehicular display portion receiving the press manipulation, and
transmits a signal indicating the manipulation target area to the mobile phone via the communication portion;
wherein the identification section identifies whether the mobile phone enters a phone call state due to user's input manipulation onto the mobile phone or due to user's press manipulation onto the vehicular display portion of the vehicular apparatus; and
wherein the mobile phone call changeover section performs changeover to a handsfree phone call using a speaker and a microphone of the vehicular apparatus for phone call when the identification section identifies that the mobile phone entered a phone call state based on the user's press manipulation onto the vehicular display portion of the vehicular apparatus.

73. The mobile phone according to claim 72,
wherein the mobile phone call changeover section transmits a signal requesting changeover to handsfree phone call to the vehicular apparatus.

74. An instrument coordination system comprising:
a mobile phone having a touch panel; and
the vehicular apparatus according to claim 1,
wherein the vehicular apparatus transmits a request signal requesting changeover to handsfree phone call, if needed, to the mobile phone; and
wherein, when receiving the request signal transmitted from the vehicular apparatus, the mobile phone transmits a sound signal received from a public line to the vehicular apparatus.

75. An instrument coordination system comprising:
a mobile phone having a touch panel; and
the vehicular apparatus according to claim 1,
wherein, when receiving a sound signal from the mobile phone, the vehicular apparatus performs changeover to a handsfree phone call.

76. An instrument coordination system comprising:
a mobile phone having a touch panel; and
the vehicular apparatus according to claim 1,
wherein, when receiving a signal indicating the manipulation target area from the vehicular apparatus, the mobile phone is enabled to receive an input similar to an input that is made when an input manipulation is performed onto the manipulation target area on the screen of the touch panel.

* * * * *